US 9,101,973 B2

(12) United States Patent
Ueno et al.

(10) Patent No.: US 9,101,973 B2
(45) Date of Patent: Aug. 11, 2015

(54) LAMINATED WORK PRODUCTION METHOD

(75) Inventors: Kazuto Ueno, Tokyo (JP); Kenji Kanamori, Yokohama (JP); Masaaki Yoshitome, Sagamihara (JP); Tsukasa Morita, Ebina (JP); Manabu Higuchi, Hino (JP); Takeshi Torimoto, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 164 days.

(21) Appl. No.: 13/822,259

(22) PCT Filed: Dec. 7, 2011

(86) PCT No.: PCT/JP2011/078296
§ 371 (c)(1),
(2), (4) Date: Mar. 11, 2013

(87) PCT Pub. No.: WO2012/081467
PCT Pub. Date: Jun. 21, 2012

(65) Prior Publication Data
US 2013/0167696 A1 Jul. 4, 2013

(30) Foreign Application Priority Data

Dec. 15, 2010 (JP) ................ 2010-279663
Oct. 21, 2011 (JP) ................ 2011-231602

(51) Int. Cl.
*H02K 15/00* (2006.01)
*B21D 43/22* (2006.01)
(Continued)

(52) U.S. Cl.
CPC ............. *B21D 43/22* (2013.01); *B21D 28/22* (2013.01); *B21D 45/003* (2013.01); *H02K 15/02* (2013.01); *Y10T 29/49009* (2015.01); *Y10T 29/49069* (2015.01)

(58) Field of Classification Search
CPC .............. Y10T 29/51; Y10T 29/53048; Y10T 29/53091; Y10T 29/53187; Y10T 29/53265; Y10T 29/49009; Y10T 29/49012; Y10T 29/49069; B21D 28/22; B21D 45/003; B22D 17/24; B22D 19/0054
USPC ........ 29/596, 598, 609, 732, 779; 83/90, 149, 83/157, 167, 465
See application file for complete search history.

(56) References Cited

U.S. PATENT DOCUMENTS

| | | | |
|---|---|---|---|
| 6,619,169 B1 * | 9/2003 | Wegener et al. | .......... 83/90 |
| 7,337,531 B2 * | 3/2008 | Neuenschwander et al. | ... 29/609 |
| 2005/0050714 A1 | 3/2005 | Hashimoto et al. | |

FOREIGN PATENT DOCUMENTS

| | | |
|---|---|---|
| JP | 51-7593 Y1 | 3/1976 |
| JP | 59-143538 U | 9/1984 |

(Continued)

OTHER PUBLICATIONS

Chinese Office Action, Jul. 24, 2014, 8 pages.
(Continued)

*Primary Examiner* — Thiem Phan
(74) *Attorney, Agent, or Firm* — Foley & Lardner LLP

(57) ABSTRACT

A laminated work production apparatus for producing a laminated work by punching a plate-like metal material into a plate-like work of a predetermined shape and stacking a plurality of the plate-like works includes a mold for punching the metal material, a stacking jig moving mechanism for moving a stacking jig to a stacking position where the plate-like works are stacked, a retention mechanism for retaining the punched plate-like works at a retaining position different from the stacking position until a preset number is reached, and a knockout mechanism for knocking out a plurality of plate-like works in a punching direction and stacking the plate-like works on the stacking jig arranged at the stacking position when the preset number of plate-like works are retained in the retention mechanism.

4 Claims, 40 Drawing Sheets

(51) Int. Cl.
  *B21D 28/22* (2006.01)
  *B21D 45/00* (2006.01)
  *H02K 15/02* (2006.01)

(56) References Cited

FOREIGN PATENT DOCUMENTS

| JP | 2002-078296 A | 3/2002 |
| JP | 2005-103638 A | 4/2005 |
| JP | 2005-229779 A | 8/2005 |
| JP | 2005-229781 A | 8/2005 |

OTHER PUBLICATIONS

Chinese Office Action, Jul. 24, 2014, 9 pages.

* cited by examiner

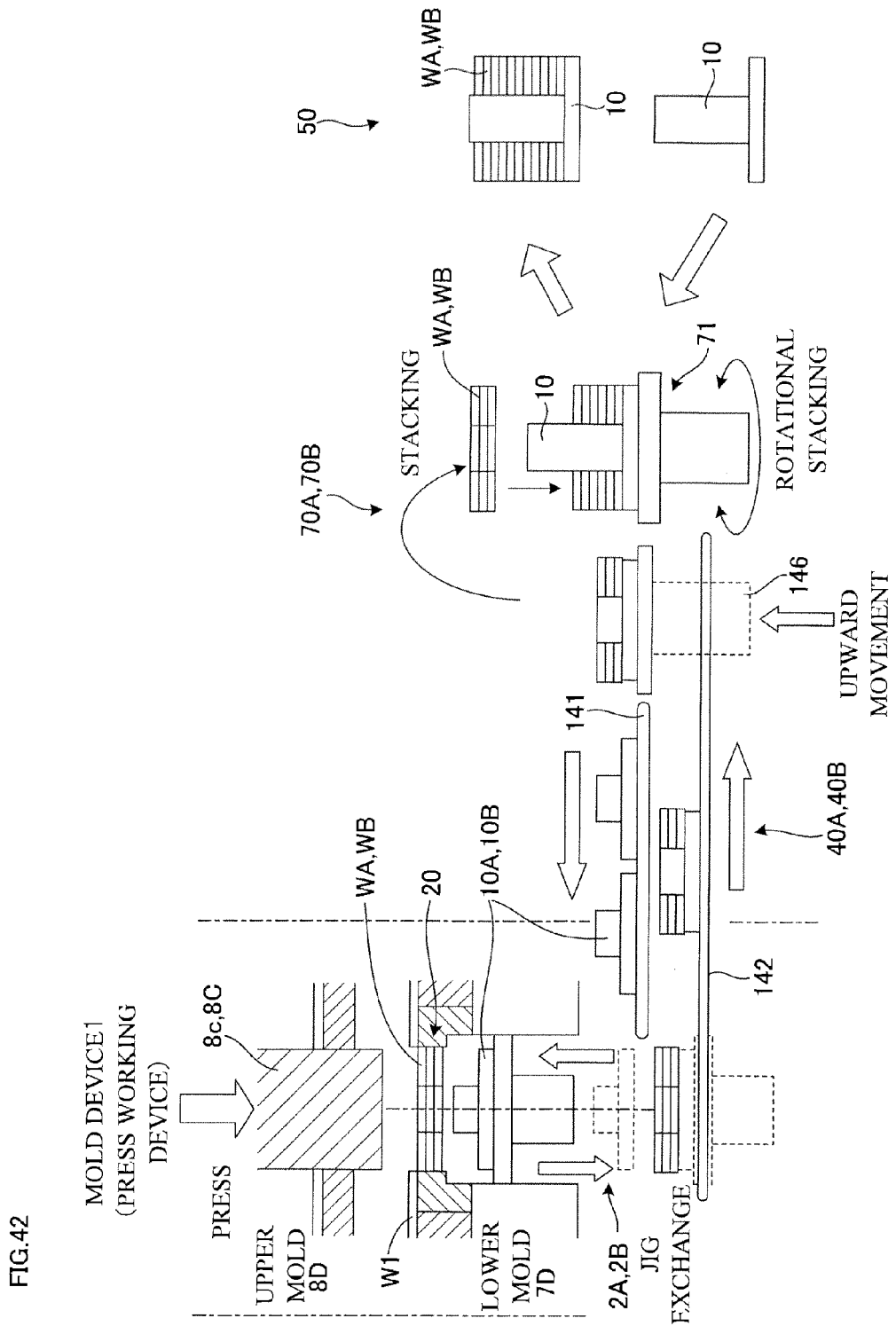

LAMINATED WORK PRODUCTION METHOD

TECHNICAL FIELD

The present invention relates to a production apparatus and a method for a laminated work formed by successively stacking plate-like works punched into a predetermined shape on a stacking jig, for example, such as a laminated core for motor.

BACKGROUND ART

A production apparatus has been conventionally proposed which forms a laminated work by successively stacking plate-like works punched into a predetermined shape on a stacking jig.

For example, in JP2005-229779A, plate-like works successively punched by a press facility are rotationally stacked on a stacking jig in a lower part of the press facility until a predetermined number is reached. After the predetermined number of plate-like works are stacked, this stacking jig is unloaded from the lower part of the press facility and a new stacking jig is loaded into the lower part of the press facility.

SUMMARY OF INVENTION

However, in the above conventional example, the punched plate-like works are stacked one by one on the stacking jig every time being punched. Thus, while the stacking jig is loaded into and unloaded from the lower part of the press facility, no stacking jig for receiving punched plate-like works is present at a predetermined stacking position and punching of plate-like works needs to be stopped during that time. As a result, the press facility is intermittently operated, thereby causing a problem of reducing productivity.

Accordingly, the present invention was developed in view of the above problem and aims to provide a laminated work production apparatus and a method suitable for production by continuously operating a press facility.

In the present invention, punched plate-like works retained in a retention mechanism are intermittently stacked on a stacking jig by a knockout mechanism every time the number thereof reaches a preset number. Thus, even if punching of a mold is continued, the stacking jig can be moved from the stacking position and the exchange of the stacking jig and the like can be performed while the knockout mechanism is not in operation. As a result, continuous operation is possible without stopping punching of the mold and productivity can be improved.

Embodiments and advantages of the present invention are described in detail below with reference to the accompanying drawings.

BRIEF DESCRIPTION OF DRAWINGS

FIG. 42 is a schematic diagram of handling of plate-like works.

DESCRIPTION OF EMBODIMENTS

First Embodiment

Figure 1:
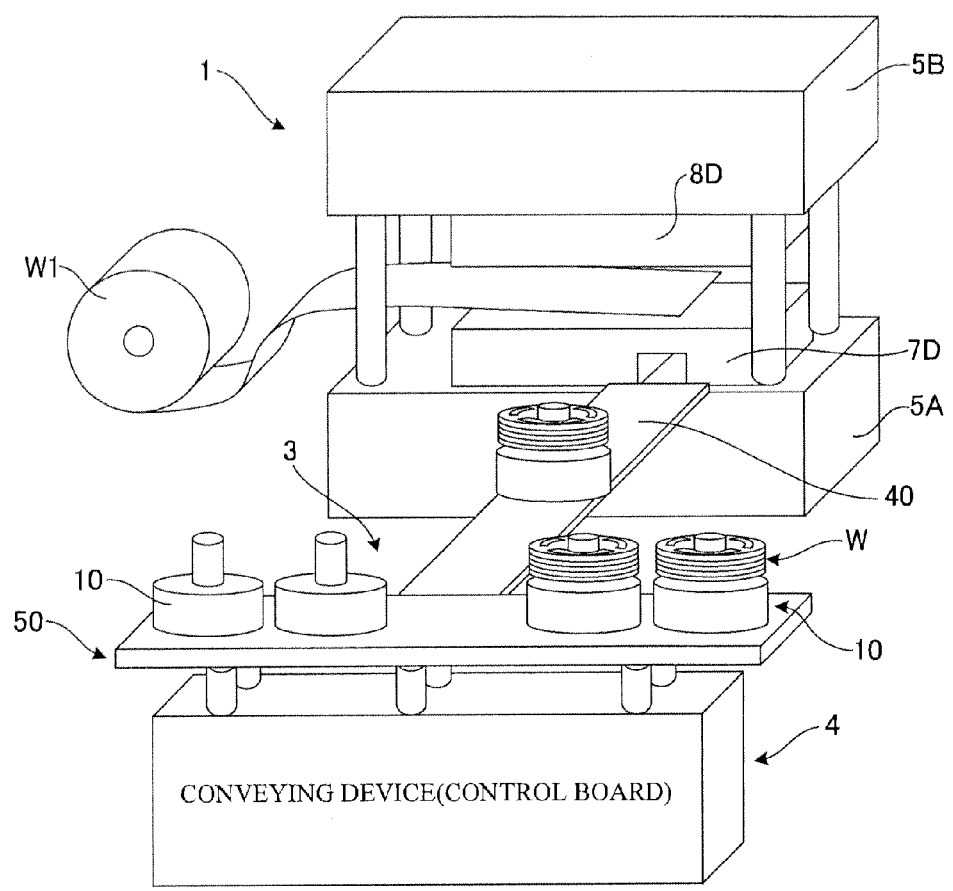
FIG. 1 is a schematic configuration view showing a laminated work production apparatus of a first example in one embodiment of the present invention.
Figure 2:
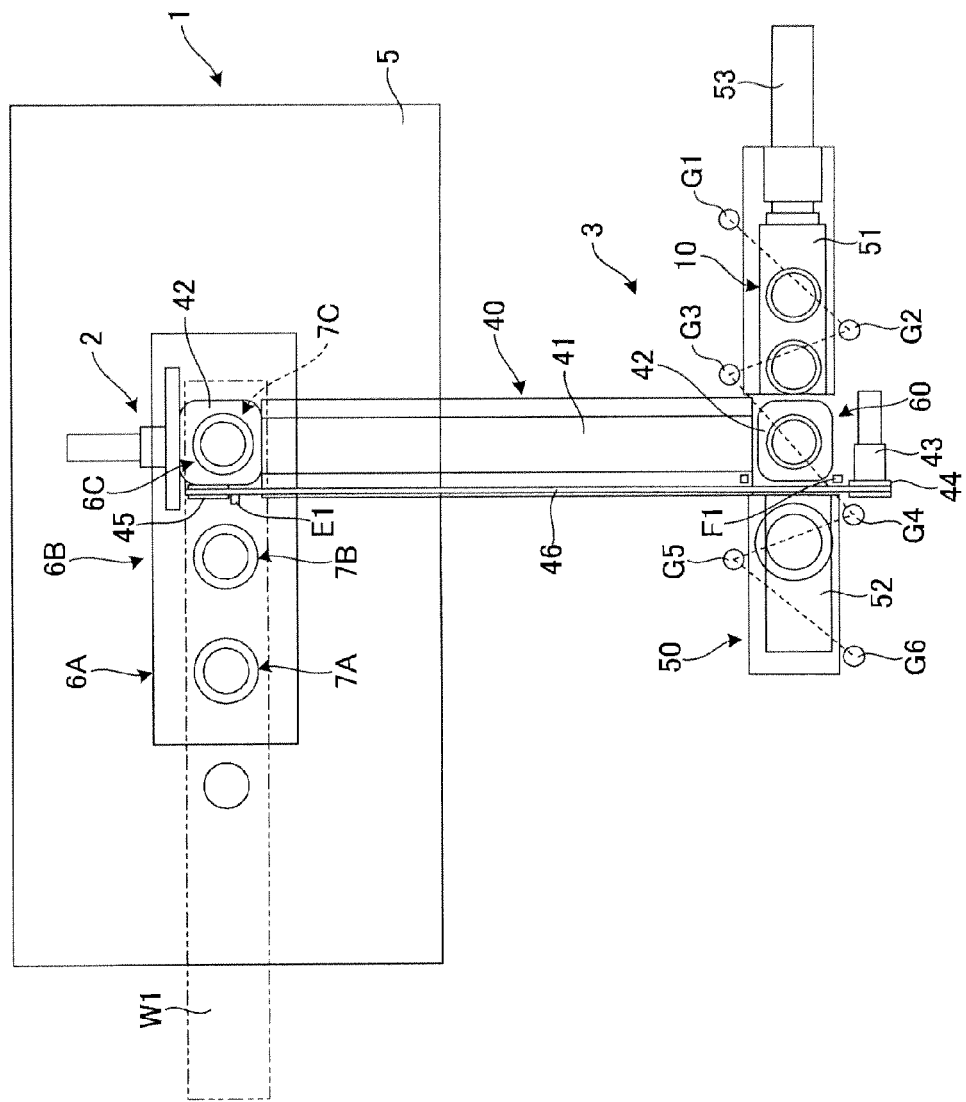
FIG. 2 is a schematic plan view likewise showing the laminated work production apparatus of the first example.

FIGS. 1 and 2 are schematic configuration views showing a first example of a laminated work production apparatus to which the present invention is applied.

In FIGS. 1 and 2, the laminated work production apparatus includes a progressive press working device 1 (referred to also as a "mold device 1" in the following description) for punching plate-like works W of a laminated core for motor, an elevating device 2 for loading and unloading a stacking jig 10, on which plate-like works W are to be stacked, into and from the press working device 1 and a conveying device 3. The elevating device 2 elevates the stacking jig 10 for stacking the plate-like works W between a stacking position A of the press working device 1 and a loading/unloading position B below the stacking position A to be described later. The conveying device 3 conveys an empty stacking jig 10 to the loading/unloading position B of the press working device 1 from the outside and conveys the stacking jig 10, on which the plate-like works W are stacked, from the loading/unloading position B of the press working device 1 to the outside. These press working device 1, elevating device 2 and conveying device 3 are controlled by a control device 4.

Figure 3:
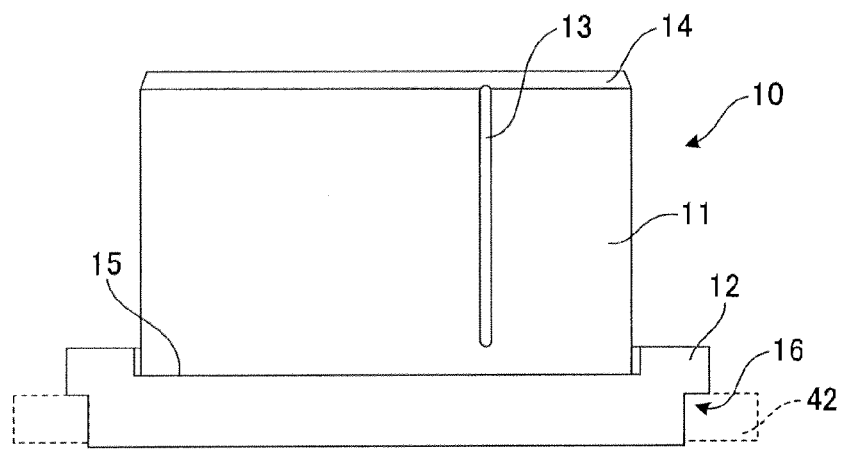
FIG. 3 is a side view of a stacking jig.

The stacking jig 10 on which the plate-like works W are to be stacked is configured to include a cylindrical portion 11 and a base 12 supporting the cylindrical portion 11 from below as shown in FIG. 3. The cylindrical portion 11 is in the form of a cylinder having such an outer diameter as to be loosely fittable into inner peripheral holes of the plate-like works W punched by the press working device 1. It should be noted that the plate-like works W here are stacked to form a stator core of a motor or a generator. Keys 13 radially projecting from the outer peripheral surface and extending in an axial direction are arranged at equal angular intervals on the outer periphery of the cylindrical portion 11. These keys 13 are engaged with inner peripheral openings of slots of the plate-like works W to position the plate-like works W in a rotating direction. Further, a tapered bevel 14 narrowed toward an upper side is formed on an upper end side of the outer periphery of the cylindrical portion 11. This tapered bevel 14 guides the plate-like works W punched by the press working device 1 so that the plate-like works W smoothly move onto the outer periphery of the cylindrical portion 11. It should be noted that a plurality of bores are formed to extend in a vertical direction inside the cylindrical portion 11 for weight saving.

The base 12 is in the form of a disk having an outer diameter slightly smaller than the outer diameter of the plate-like works W, and a receiving hole 15 formed to have a slightly larger outer diameter than the cylindrical portion 11 is formed in the upper surface. The lower end of the cylindrical portion 11 is inserted into this receiving hole 15 and the base 12 and the cylindrical portion 11 are integrally conveyed and raised and lowered. Further, the cylindrical portion 11 is movable in a lateral direction relative to the base 12 within the range of the receiving hole 15 by making the inner diameter of the receiving hole 15 slightly larger than the outer diameter of the cylindrical portion 11. A stepped portion 16 having a smaller diameter is provided on a lower side of the outer periphery of the base 12. A slider 42 of the conveying device 3 is engaged with this stepped portion 16 from below and the stacking jig 10 composed of the cylindrical portion 11 and the base 12 is conveyed by the slider 42.

Figure 4:
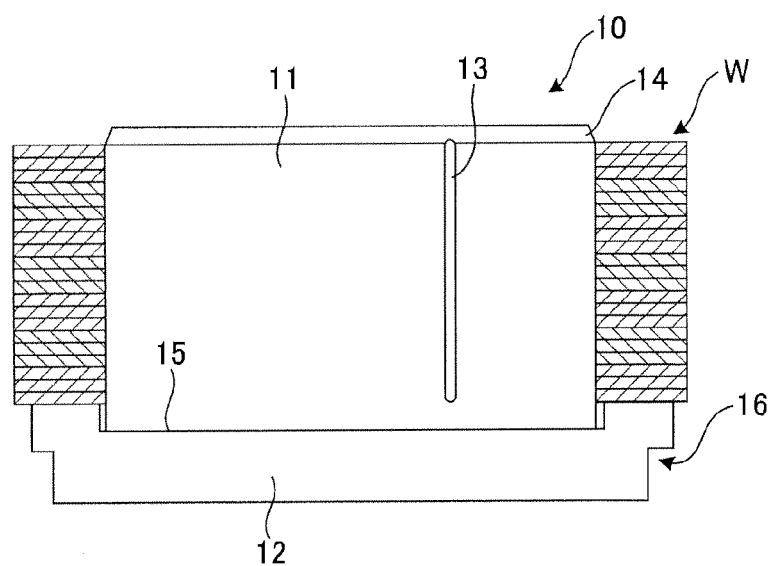
FIG. 4 is a side view of the stacking jig in a state where plate-like works are stacked.

FIG. 4 shows a state where the plate-like works W are stacked on the stacking jig 10. As shown in FIG. 4, the plate-like works W are stacked on the upper surface of the base 12 in such a state as to project out from the outer periphery of the base 12 and be aligned by being fitted on the outer periphery of the cylindrical portion 11. The plate-like works W are stacked with rotational positions changed by a predetermined angle, e.g. 90° every predetermined numbers of plate-like works W.

Figure 5:
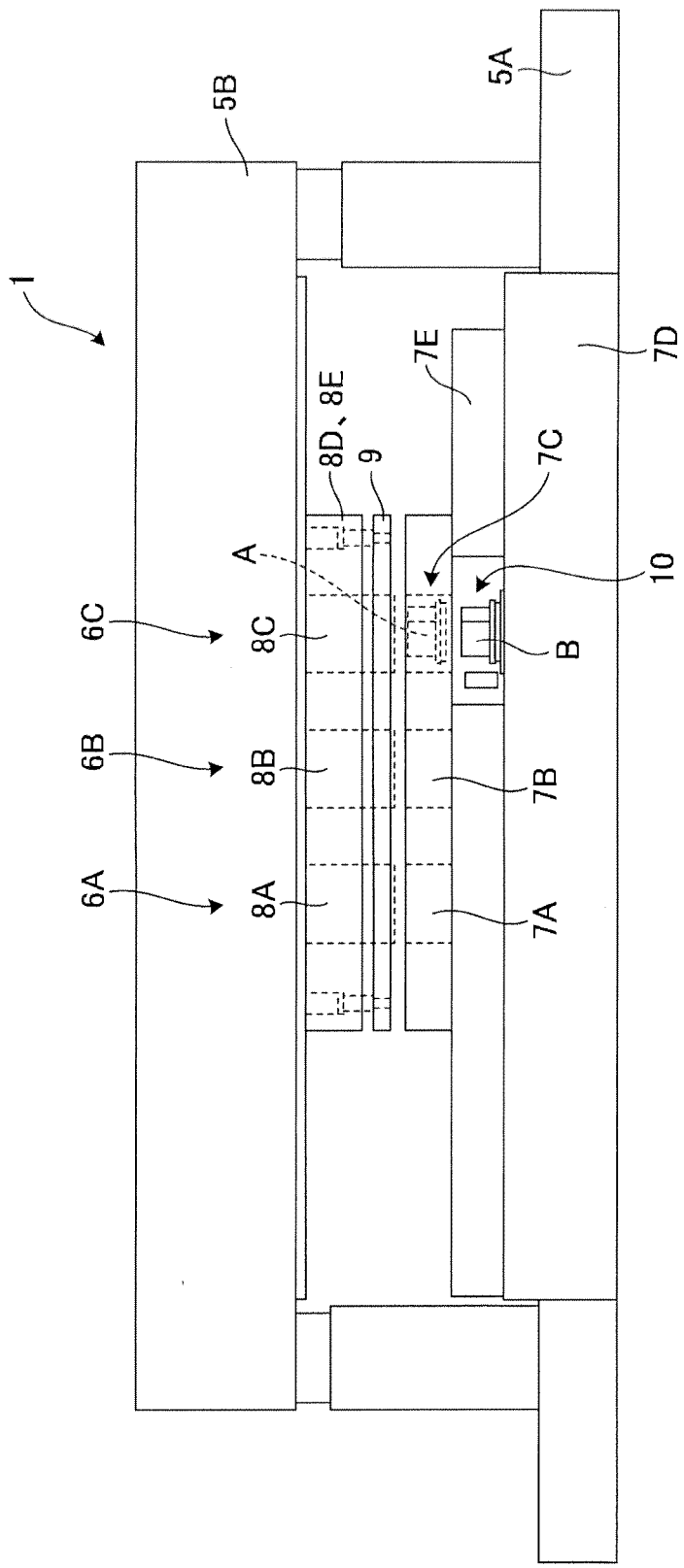
FIG. 5 is a schematic side view of a press facility.
Figure 6:
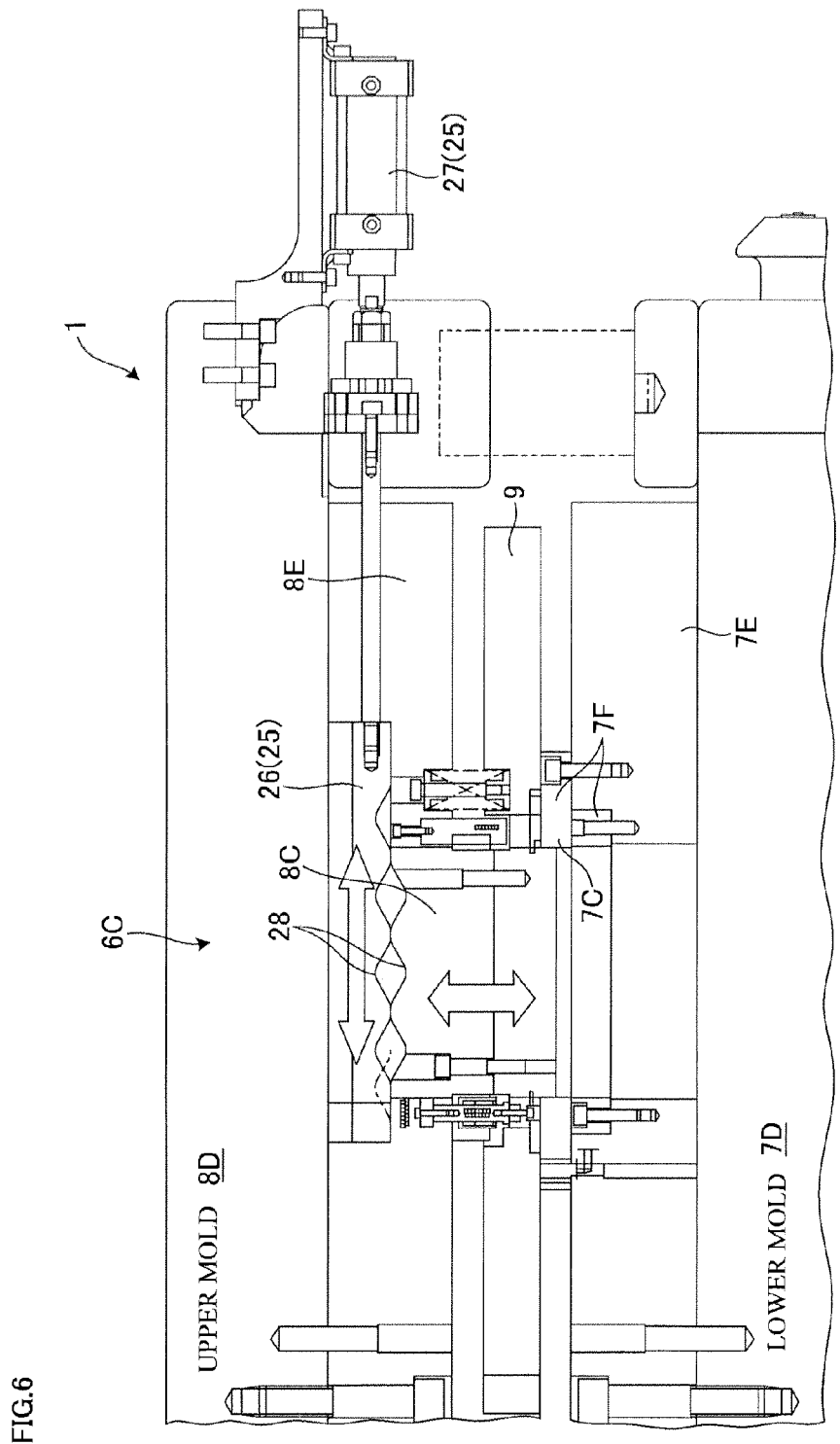
FIG. 6 is a sectional view showing an essential part of the press facility.

The progressive press working device 1 for punching the plate-like works W is such that a plurality of (three in this embodiment) processing units 6A, 6B and 6C are successively arranged side by side in a predetermined direction (lateral direction in FIGS. 2, 5) on a bolster 5A as shown in FIGS. 2 and 5. Each processing unit 6A to 6C basically has a substantially identical configuration. Each die (female mold for punching) 7A to 7C is mounted and fixed to the bolster 5A via a lower mold 7D, a die holder 7E, a die retainer 7F and the like as shown in FIGS. 5 and 6. Each punch (male mold for punching) 8A to 8C is mounted and fixed to a vertically movable slide 5B via an upper mold 8D, a punch retainer 8E and the like. Further, a stripper 9 for pressing a metal material W1 in the form of a long and thin plate to be punched against each die 7A to 7C is arranged to surround each punch 8A to 8C.

When the progressive press working device 1 operates, the metal material W1 in the form of a long and thin plate is arranged between each die 7A to 7C and each punch 8A to 8C. Then, the metal material W1 is intermittently fed forward from an upstream side to a downstream side (left side to right side in FIGS. 2, 5) between two adjacent ones of the processing unit 6A to 6C. Predetermined press-working is applied to the metal material W1 by each die 7A to 7C and each punch 8A to 8C in each processing unit 6A to 6C. Specifically, slot parts of a stator core are punched as leftover unnecessary for product shape in the first and second processing units 6A, 6B from the upstream side, and a plate-like work W having a product shape for stator core is punched in the third processing unit 6C.

Figure 7:
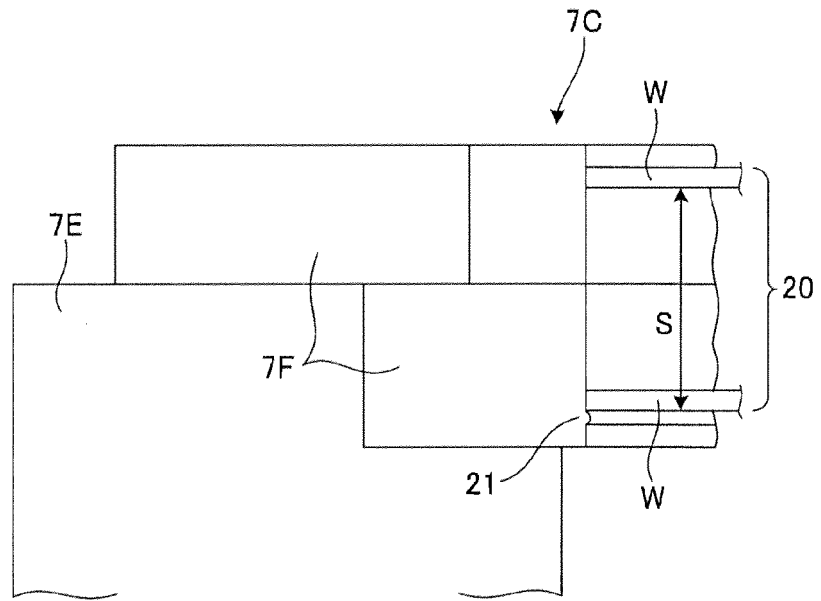
FIG. 7 is an enlarged view showing a specific example 1 of a retention mechanism.
Figure 8:
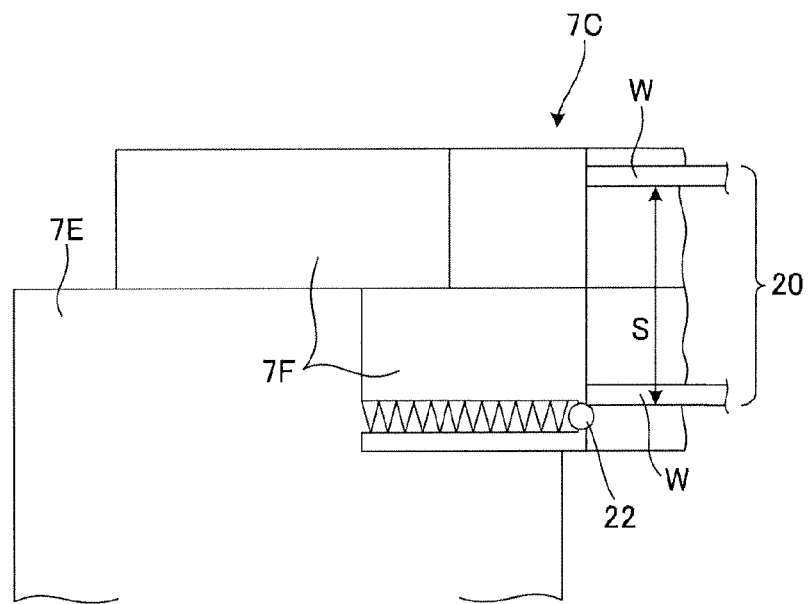
FIG. 8 is an enlarged view showing a specific example 2 of the retention mechanism.

As shown in FIG. 6, the lower mold 7D of the third processing unit 6C includes the die 7C having a circular punch hole, the die retainer 7F for retaining the die 7C and the die holder 7E for supporting them. The die 7C includes a retention mechanism 20 for retaining plate-like works W punched by the punch 8C in an inner diameter hole. As shown in FIG. 7, the retention mechanism 20 can be formed by providing a small-diameter portion 21 having an inner peripheral diameter smaller than the outer diameter of the plate-like work W by a tiny dimension, e.g. 10 µm on a bottom surface side of the inner diameter hole of the die 7C or the die retainer 7F. Further, as shown in FIG. 8, the punched plate-like works W may be held in the inner diameter hole of the die 7C by a check ball 22 whose leading end projects from the inner surface of the inner diameter hole of the die 7C or the die retainer 7F by a biasing force of a spring provided on the rear surface.

A maximum number of plate-like works W retained in the inner diameter hole of the die 7C by the retention mechanism 20 can be set by an axial dimension S of a retaining part. Specifically, a numerical value obtained by dividing the axial dimension S of the retaining part by the thickness of the punched plate-like works W is a maximum retaining number. The axial dimension S of the retaining part is an axial dimension between the lower end of the plate-like work W punched by the punch 8C and pushed into the die 7C and the small diameter portion 21 in the former and an axial dimension between the lower end of the plate-like work W, likewise, and the upper end of the check ball 22 in the latter.

As shown in FIG. 6, the upper mold 8D of the third processing unit 6C includes the punch 8C for punching the plate-like works W out from a coiled material, the punch retainer 8E for holding the punch 8C on the upper mold and the stripper 9 supported on the punch retainer 8E and adapted to press the coiled material W1 against the lower mold 7D. Further, the upper mold 8D includes a knockout mechanism 25 for pushing out the plate-like works W retained in the die 7C to the stacking jig 10 by means of the punch 8C.

The knockout mechanism 25 includes a cam plate 26 arranged between the rear surface of the punch 8C and the upper mold and an air cylinder 27 as an actuator for moving the cam plate 26 between a standby position and an operating position. Wavy cams 28 are respectively formed on the cam plate 26 and the rear surface of the punch 8C to position the punch 8C at a normal position by engaging peaks and troughs with each other when the cam plate 26 is positioned at the standby position. When the cam plate 26 is pushed out to the operating position by the operation of the air cylinder, the peaks of the wavy cams 28 are engaged to push out the punch 8C from the normal position by a cam stroke (dimension equivalent to the axial dimension S of the retaining part, e.g. 16 mm). The air cylinder 27 of the knockout mechanism 25 is operated when the upper mold 8D having passed a bottom dead center starts moving upward to a top dead center and moves the cam plate 26 from the standby position to the operating position to advance the punch 8C until the upper mold 8D starts moving downward after passing the top dead center. Further, the air cylinder 27 of the knockout mechanism 25 moves the cam plate 26 from the operating position to the standby position to return the punch 8C to the normal position when the upper mold 8D passes the bottom dead center.

Thus, the punch 8C is located at the normal position when the cam plate 26 is located at the standby position, and directly moves upward after the plate-like work W is punched out from the coiled material W1, i.e. after the amount of insertion of the punch 8C into the die 7C at the time of punching reaches a specified value when a press facility is operated to the bottom dead center. Accordingly, the punched plate-like work W is retained in the inner diameter hole of the die 7C by the retention mechanism 20. Specifically, if the amount of insertion of the punch 8C into the die 7C at the time of punching is, for example, 0.5 mm, the punched plate-Like work W is retained at a position 0.5 mm from the upper end of the die 7C. In this ease, if there is/are previously punched and retained plate-like work(s) W, the newly punched plate-like work W is retained in the die 7C while pushing down the retained plate-like work(s) W in the inner diameter hole of the die 7C.

Further, when the cam plate 26 is pushed out to the operating position by the operation of the air cylinder 27, the punch 8C is pushed more downwardly by the cam stroke than the punches 8A, 8B of the first and second processing units 6A, 6B. Thus, when the press facility is operated to the bottom dead center, the punch 8C is further inserted into the die 7C from a state where the plate-like work W is punched out from the coiled material W1 and pushes the plate-like works W retained in the inner diameter hole of the die 7C by the retention mechanism 20 downwardly of the die 7C. Simultaneously, piercing is performed in each of the first and second processing units 6A, 6B. The pushed-out plate-like works W are stacked and held on the stacking jig 10. The knockout mechanism 25 operates every time a preset number of plate-like works W are retained in the retention mechanism 20, thereby transferring the plate-like works W from the retention mechanism 20 to the stacking jig 10.

The press working device 1 described above includes the retention mechanism 20 for successively retaining the punched plate-like works W on an extension of a punching direction. Further, the press working device 1 includes the knockout mechanism 25 for knocking out a plurality of plate-like works W when a preset number of plate-like works W are retained and stacking the plate-like works W on the stacking jig 10 at the stacking position A on the extension of the punching direction. Specifically, the punched plate-like works W retained in the retention mechanism 20 are intermittently stacked on the stacking jig 10 by the knockout mechanism 25 every time the preset number is reached. Thus, even if punching by the press working device (mold device) 1 is continued, the stacking jig 10 can be moved from the stacking position A and the exchange of the stacking jig 10 and the like can be performed while the knockout mechanism 25 is not in operation.

Figure 9:
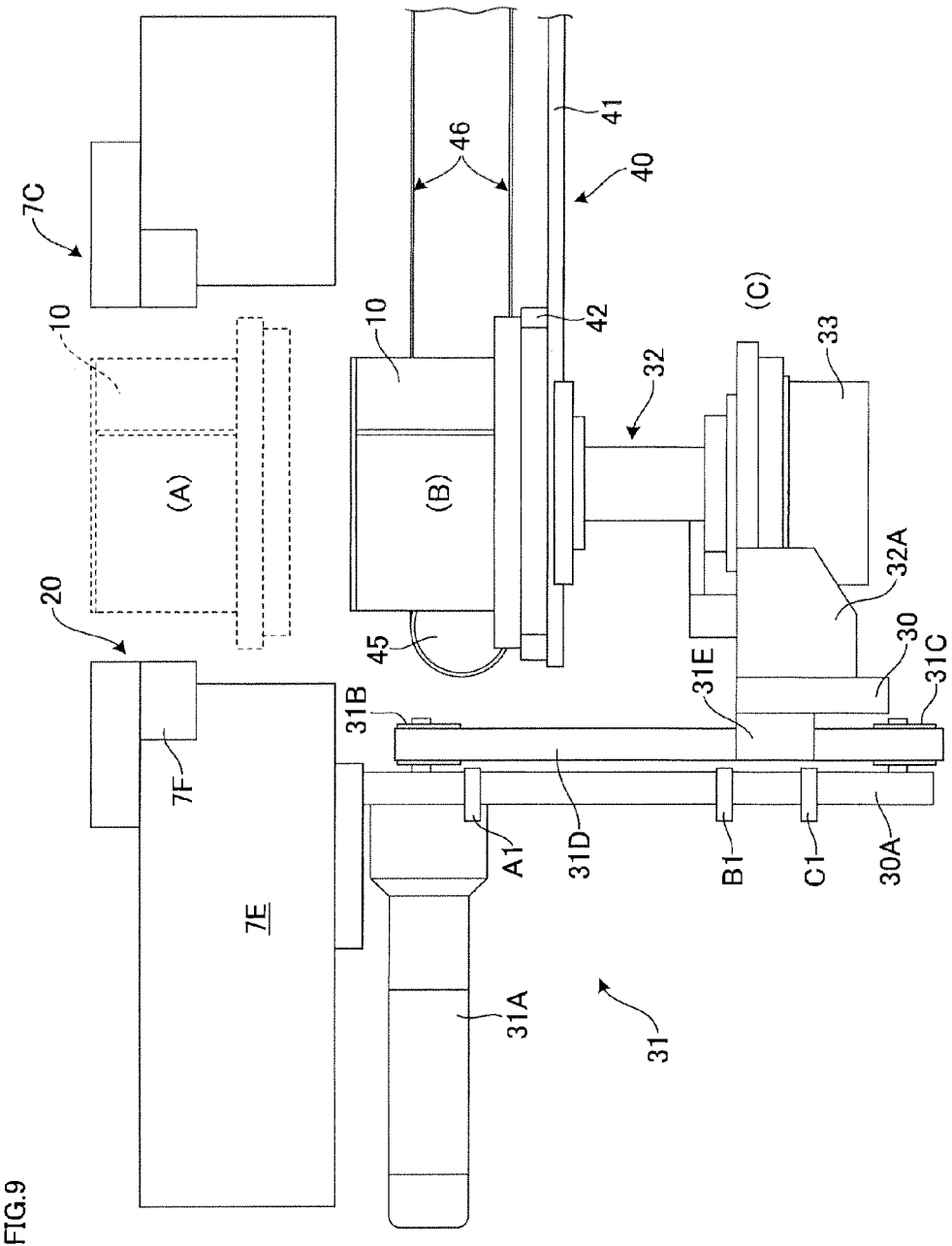
FIG. 9 is a schematic configuration view showing an elevating device at a standby position.
Figure 10:
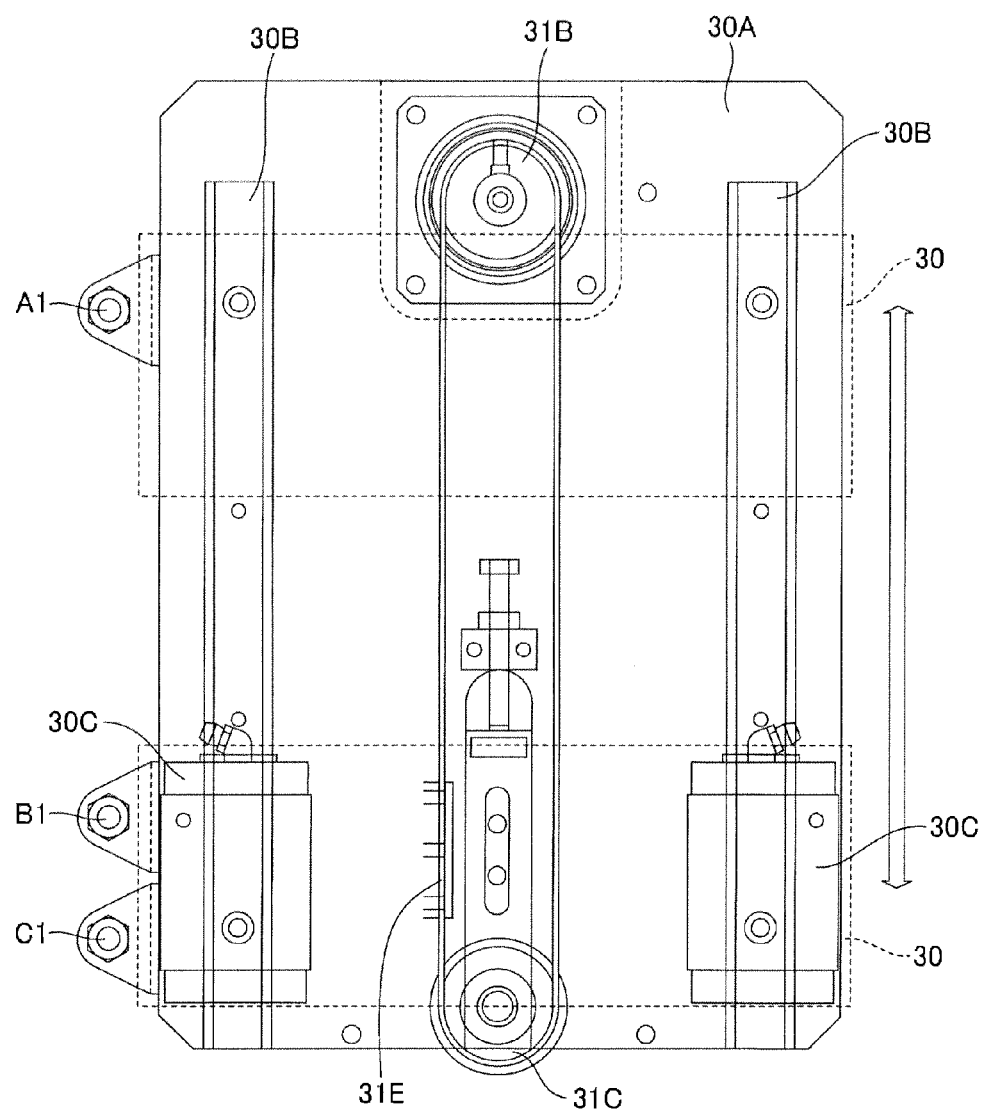
FIG. 10 is a schematic front view showing the elevating device at the standby position.

The elevating device 2 for raising and lowering the stacking jig 10 is configured as shown in FIGS. 9, 10. Specifically, the elevating device 2 includes an elevating base 30 capable of moving upward and downward, an elevation drive mechanism 31 for vertically raising and lowering the elevating base 30, and an elevating table 32 attached to the elevating base 30 and configured to raise and lower the stacking jig 10 while holding it from below.

The elevating base 30 is fixed to an elevating slider 30C. Since the elevating slider is movable upward and downward along elevating rails 30B arranged in a vertical direction of a base plate 30A, the elevating base 30 is similarly movable upward and downward.

The elevation drive mechanism 31 includes a belt 31D mounted on a drive pulley 31B driven by a servo motor 31A arranged on the rear surface of the base plate 30A and a driven pulley 31C rotatably provided on the base plate 30A, and a bracket 31E fixed to the elevating base 30 is coupled to a part of the belt 31D. The elevation drive mechanism 31 moves and stops the belt 31D by driving the drive pulley 31B by the servo motor 31A and vertically raises and lowers the elevating base 30 and positions it in the vertical direction via the belt 31D that is moved and stopped.

The elevating table 32 has a base part thereof fixed to the elevating base 30 via a bracket 32A and is configured to be rotatable by standing from the base part. A shaft center of the elevating table 32 is arranged concentrically with that of the third processing unit 6C. The elevating table 32 is vertically raised and lowered together with the elevating base 30, comes into contact with a lower part of the base 12 of the stacking jig 10 when moving upward from a lower end position, has the stacking jig 10 transferred thereto from the conveying device 3, and can move the stacking jig 10 upward and downward along the shaft center of the third processing unit 6C.

Further, a rotary servo motor 33 is arranged on the base part of the elevating table 32. The elevating table 32 is rotated by driving the rotary servo motor 33 and positioned at a predetermined rotational angle by stopping the rotary servo motor 33. The stacking jig 10 is placed on the elevating table 32, raised and lowered and vertically positioned at the same time as the elevating table 32 is raised and lowered and vertically positioned, and is rotated and has the rotational angle positioned at the same time as the elevating table 32 is rotated and has the rotational angle positioned.

Figure 11:
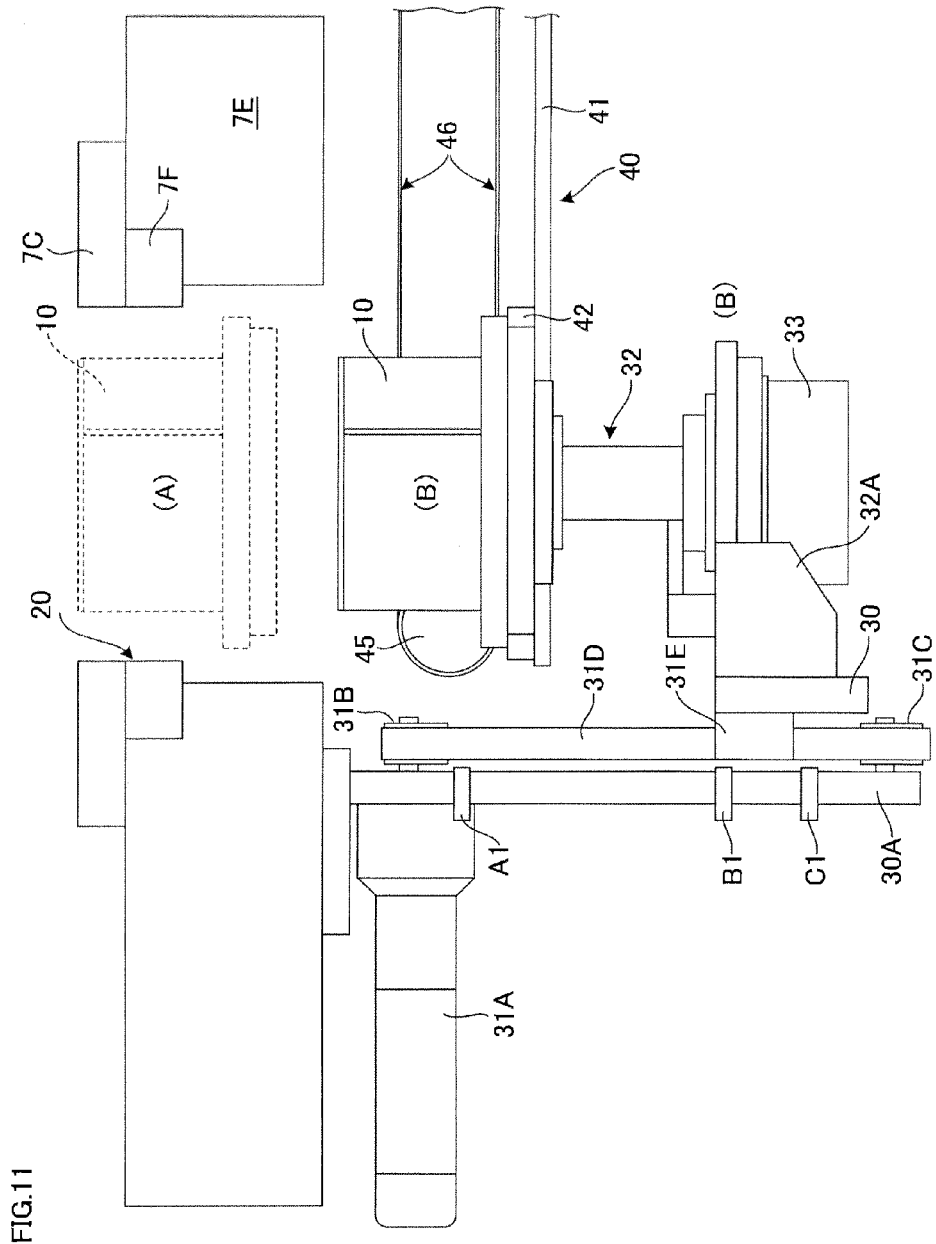
FIG. 11 is a schematic configuration view showing the elevating device at a loading/unloading position.
Figure 12:
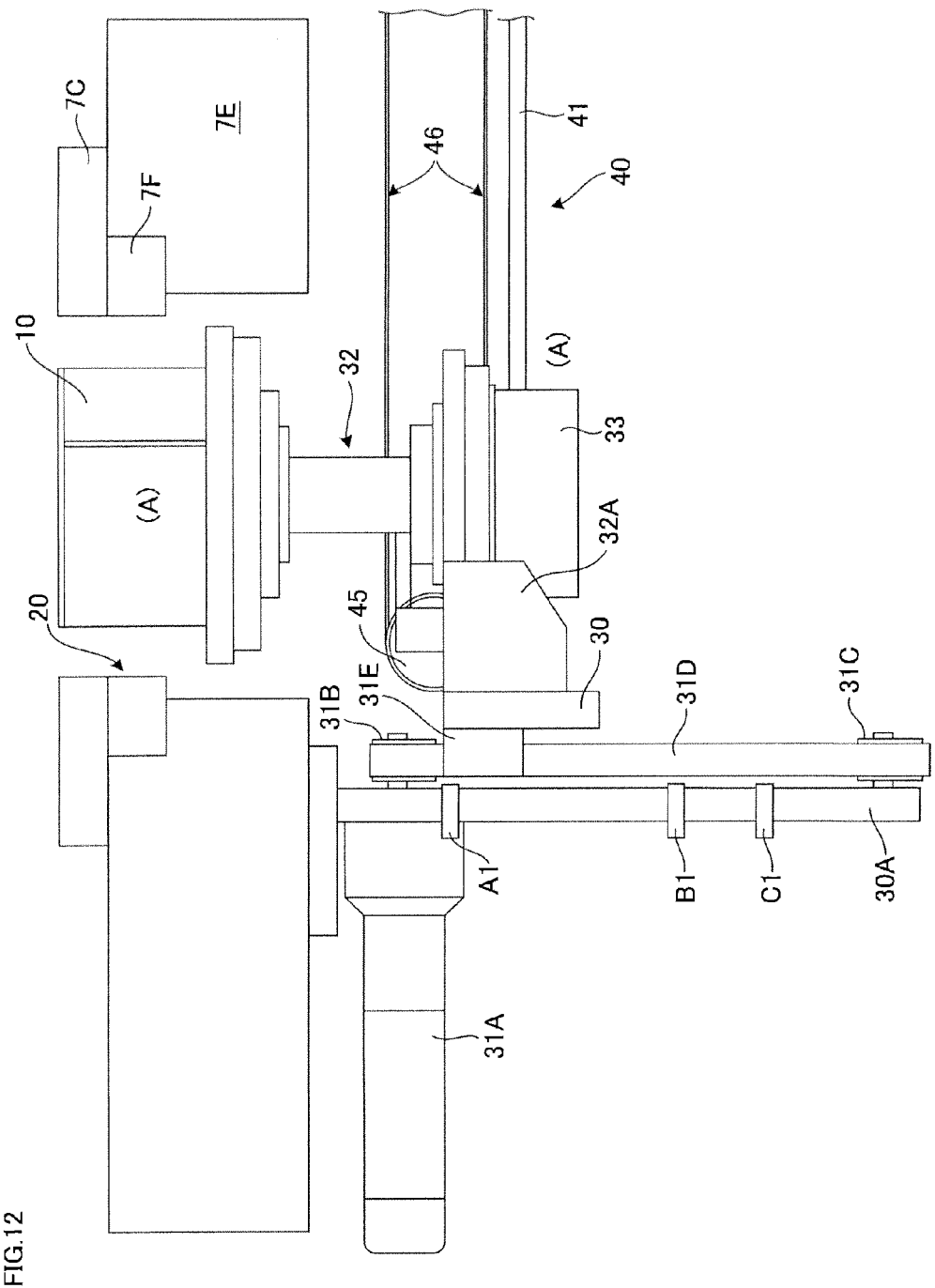
FIG. 12 is a schematic configuration view showing the elevating device at a stacking position.

The elevating device 2 includes proximity sensors A1 to C1 for respectively detecting the standby position C where the elevating table 32 is lowered to the bottommost end (FIG. 9), the loading/unloading position B where the stacking jig 10 is transferred between the elevating device 2 and the conveying device 3 (FIG. 11) and the stacking position A where the elevating table 32 is raised to the uppermost end to receive the punched plate-like work W (FIG. 12).

Specifically, when the elevating table 32 detected by the proximity sensor C1 is at the standby position C (FIG. 9), the upper end of the elevating table 32 is distanced downward from the stacking jig 10 at the loading/unloading position B above the conveying device 3.

Further, when the elevating table 32 is moved upward from the standby position C and the arrival at the loading/unloading position B (FIG. 11) is detected by the proximity sensor B1, the upper surface of the elevating table 32 and the lower surface of the stacking jig 10 above the conveying device 3 come into contact. Thus, the stacking jig 10 can be loaded and unloaded between the conveying device 3 and the elevating table 32.

Furthermore, when the elevating table 32 is moved upward and detected by the proximity sensor A1, the stacking jig 10 is located at the stacking position A (shown by broken line in FIGS. 12, 9) where the stacking jig 10 is raised into the die 7C of the lower mold 7D of the third processing unit 6C.

Figure 13:
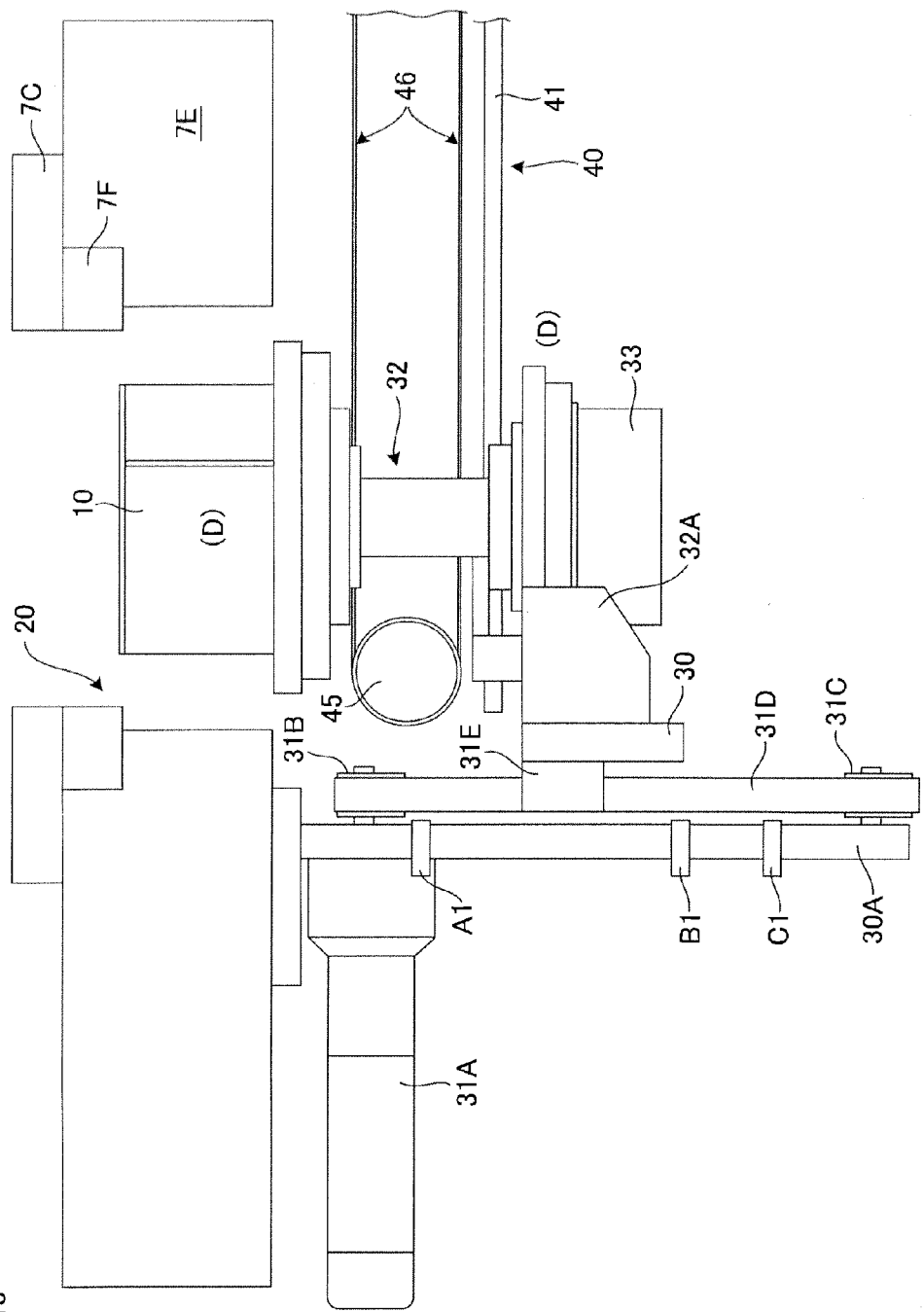
FIG. 13 is a schematic configuration view showing the elevating device at a rotational stacking position.

The elevating table 32 is lowered every time the preset number of plate-like works W are pushed out toward the stacking jig 10 from the retention mechanism 20 by the knockout mechanism 25, and the stacking jig 10 is lowered to a rotational stacking position D as shown in FIG. 13. At the rotational stacking position D where the plate-like works pushed out downwardly from the retention mechanism 20 are located, the upper end of the stacking jig 10 is at a position away from the lower end of the retention mechanism 20. At this rotational stacking position D, the rotary servo motor 33 rotates the stacking jig 10 together with the elevating table 32. Then, the rotary servo motor 33 stops after a rotation of, e.g. 90°. Thereafter, the stacking jig 10 is raised again to the stacking position A of FIG. 12 by the elevating table 32.

The conveying device 3 unloads the stacking jig 10, on which the plate-like works W are stacked, from the loading/unloading position B of the elevating device 2 as shown in FIGS. 2, 5 and, subsequently, operates to load an empty stacking jig 10 to the loading/unloading position B of the elevating device 2 located in a lower part of the progressive press working device 1.

To this end, a longitudinally conveying device 40 is provided which is arranged in a longitudinal direction so that one end thereof is arranged in the lower part of the progressive press working device 1 and the other end thereof projects from the lower part of the progressive press working device 1. Further, a laterally conveying device 50 is provided which loads an empty stacking jig 10 to the longitudinally conveying device 40 and unloads the stacking jig 10, on which plate-like works W are stacked, from the longitudinally conveying device 40. The laterally conveying device 50 operates to receive the empty stacking jig 10 from the previous process and unload the stacking jig 10, on which plate-like works W are stacked in this process, to the next process. Further, since the longitudinally conveying device 40 and the laterally conveying device 50 are arranged at different vertical heights, a vertically conveying device 60 is provided which is arranged to vertically operate and transfer the stacking jig 10 between the longitudinally conveying device 40 and the laterally conveying device 50.

The configuration of this conveying device 3 is not limited to the above structure and another configuration may be adopted if an empty stacking jig 10 is loaded to the loading/unloading position B of the elevating device 2 and a stacking jig 10, on which punched plate-like works are stacked, is unloaded from the loading/unloading position B of the elevating device 2.

Figure 14:
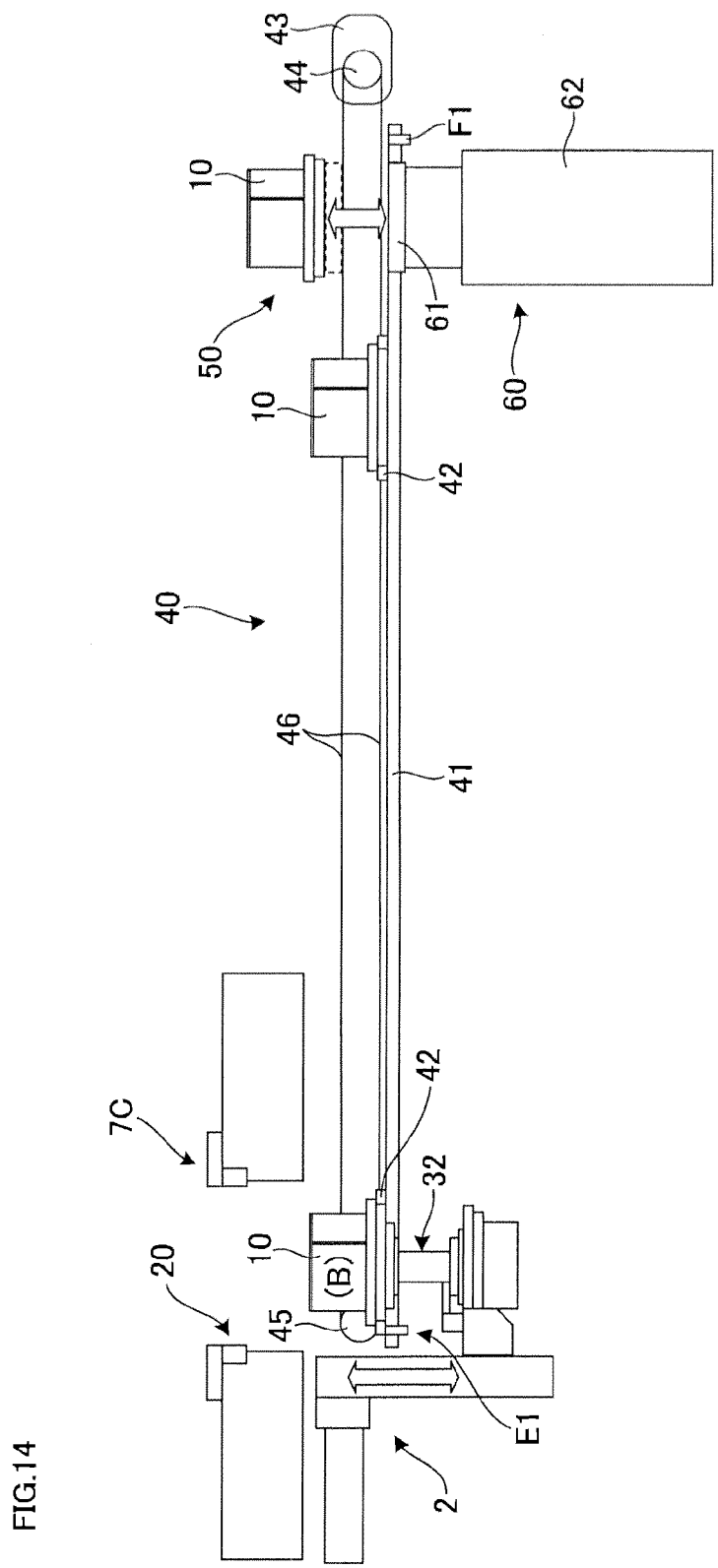
FIG. 14 is a schematic configuration view showing a longitudinally conveying device in a conveying device.

As shown in FIG. 14, the longitudinally conveying device 40 includes the slider 42 which slides on conveyor rails 41 arranged between the elevating device 2 and the vertically conveying device 60. The slider 42 is movable on the rails 41 by a belt 46 mounted between a drive pulley 44 to be driven by a servo motor 43 of the laterally conveying device 50 and a driven pulley 45 of the elevating device 2. Proximity sensors E1, F1 are provided which respectively detect that the slider 42 has reached the loading/unloading position B of the elevating device 2 and the slider 42 is located on an elevating table 61 of the vertically conveying device 60.

The longitudinally conveying device 40 conveys the stacking jig 10, on which the punched plate-like works W are stacked, from the loading/unloading position B of the elevating device 2 onto the elevating table 61 of the vertically conveying device 60. Subsequently, an empty stacking jig 10 is placed on the slider 42 and conveyed from the elevating table 61 of the vertically conveying device 60 to the loading/unloading position B of the elevating device 2.

Figure 15:
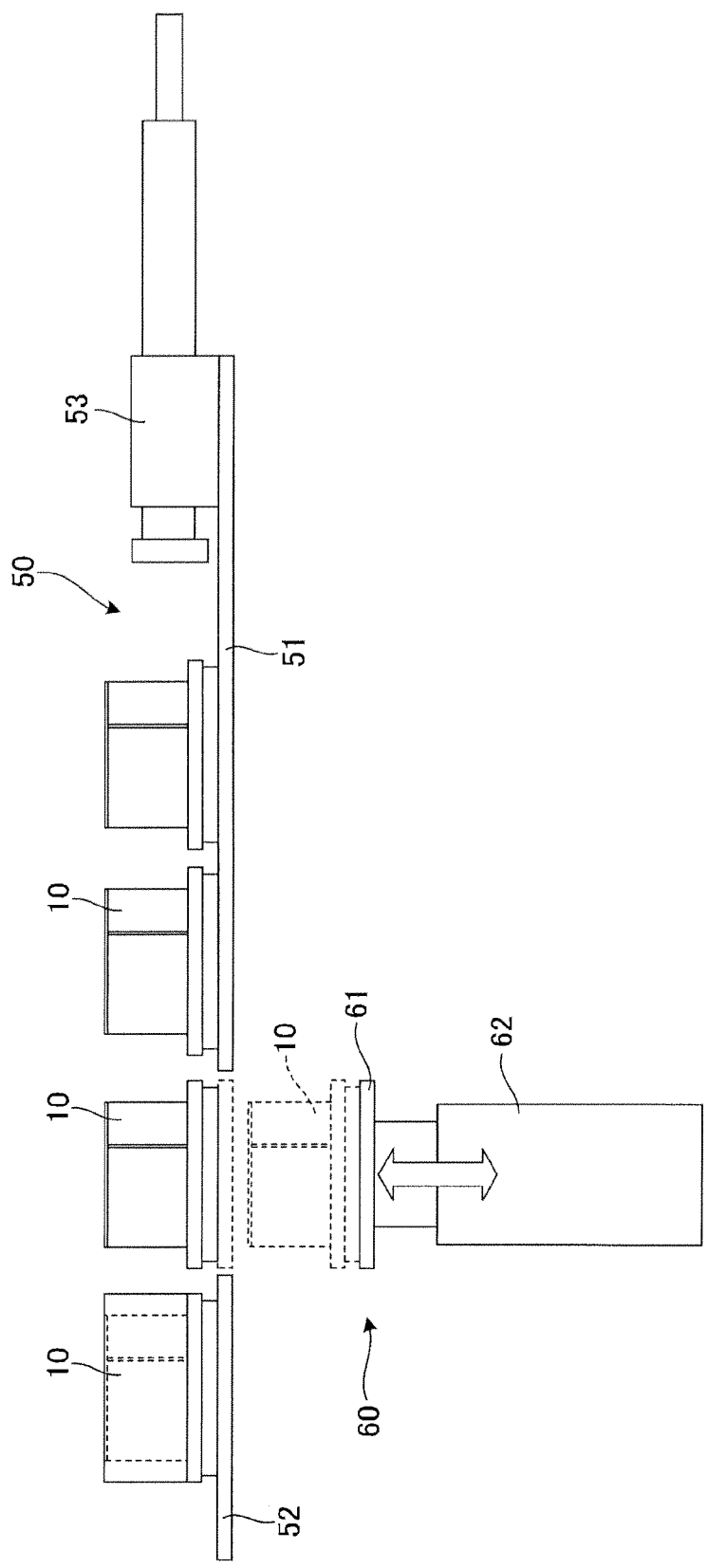
FIG. 15 is a schematic configuration view showing a laterally conveying device in the conveying device.

As shown in FIGS. 14 and 15, the vertically conveying device 60 includes the elevating table 61 which is raised and lowered by a servo motor 62 between the laterally conveying device 50 and the longitudinally conveying device 40. The upper surface of the elevating table 61 is flush with the upper surfaces of conveyor rails 51, 52 of the laterally conveying device 50 at a raised position and flush with the upper surface of the conveyor rails 41 of the longitudinally conveying device 40 at a lowered position.

Thus, the vertically conveying device 60 receives the stacking jig 10 conveyed by the longitudinally conveying device 40 with the punched plate-like works W stacked thereon onto the elevating table 61 at the lowered position and, thereafter, separates the stacking jig 10 from the slider 42 and raises it by raising the elevating table 61. At the raised position, the stacking jig 10 on the elevating table 61 is transferred to the laterally conveying device 50. Subsequently, the vertically conveying device 60 receives an empty stacking jig 10 conveyed by the laterally conveying device 50 onto the elevating table 61 at the raised position, moves the empty stacking jig 10 to the lowered position, and places the empty stacking jig 10 on the elevating table 61 onto the slider 42 of the longitudinally conveying device 40, thereby transferring the empty stacking jig 10 to the longitudinally conveying device 40.

As shown in FIG. 15, the laterally conveying device 50 includes two conveyor rails 51, 52 extending before and after the vertically conveying device 60, and a servo motor 53 for pressing the stacking jig 10, which is a work, pitch by pitch toward a downstream side of the conveyor rail 51 is arranged on the upstream conveyor rail 51. Empty stacking jigs 10 received from the previous process are arranged side by side on the upstream conveyor rail 51, and stacking jigs 10, which are transferred from the vertically conveying device 60 and on which punched plate-like works W are stacked, are arranged side by side on the conveyor rail 52 at a downstream side of the vertically conveying device 60. Whether or not the stacking jig 10, which is a work, has been conveyed pitch by pitch is detected by a plurality of proximity sensors G1 to G6 arranged at sides of the rails as shown in FIG. 2.

This laterally conveying device 50 starts operating when the elevating table 61 of the vertically conveying device 60 is raised to the raised position with the stacking jig 10, on which the punched plate-like works W are stacked, placed thereon. Then, the stacking jig 10 on the elevating table 61 of the vertically conveying device 60 is transferred onto the downstream conveyor rail 52 by pushing out the empty stacking jigs 10 arranged on the upstream conveyor rail 51 toward the downstream side by one pitch by the servo motor 53. Simultaneously, the empty stacking jig 10 on the upstream conveyor rail 51 is transferred onto the elevating table 61 of the vertically conveying device 60.

The above conveying device 3 is activated when the stacking jig 10 on which the punched plate-like works W are stacked is lowered to the loading/unloading position B by the elevating device 2, and this stacking jig 10 is conveyed toward the vertically conveying device 60 by the longitudinally conveying device 40. When being loaded onto the elevating table 61 of the vertically conveying device 60, the stacking jig 10 is loaded to the laterally conveying device 50 by the elevating table 61 of the vertically conveying device 60. The laterally conveying device 50 pushes the stacking jigs 10 on the conveyor rail 51 toward the downstream side by one pitch and the stacking jig 10 on which the plate-like works W are stacked are pushed out onto the downstream conveyor rail 52 and, instead, the empty stacking jig 10 is transferred onto the elevating table 61 of the vertically conveying device 60.

The vertically conveying device 60 lowers the elevating table 61 and transfers the empty stacking jig 10 onto the slider 42 of the longitudinally conveying device 40. The longitudinally conveying device 40 conveys the empty stacking jig 10 and loads the slider 42 to the loading/unloading position B of the elevating device 2. The above operation is repeated every time the stacking jig 10 on which the punched plate-like works W are stacked is lowered to the loading/unloading position B by the elevating device 2.

The press working device 1, the elevating device 2 and the conveying device 3 configured as above are controlled respectively to operate in synchronization by the control device 4. The operation of the laminated work production apparatus and the production method are described below.

The progressive press working device 1 is operated and the metal material W1 in the form of a long and thin plate is arranged between each die 7A to 7C and each punch 8A to 8C. Then, the metal material W1 is intermittently fed forward from the upstream side to the downstream side (left side to right side in FIGS. 2, 5) between two adjacent ones of the processing units 6A to 6C. Then, predetermined press working is performed by each die 7A to 7C and each punch 8A to 8C in each processing unit 6A to 6C. Specifically, slot parts of a stator core are punched as leftover unnecessary for product shape in the first and second processing units 6A, 6B from the upstream side, and a plate-like work W having a product shape for stator core is punched in the third processing unit 6C. Punched plate-like works W are successively retained in the retention mechanism 20 (see FIG. 16).

Then, the conveying device 3 is operated and the laterally conveying device 50 transfers an empty stacking jig 10 onto the elevating table 61 of the vertically conveying device 60 by pushing out stacking jigs 10 on the conveyor rail 51 of the laterally conveying device 50 toward the downstream side by one pitch. The vertically conveying device 60 lowers the elevating table 61 and transfers the empty stacking jig 10 onto the slider 42 of the longitudinally conveying device 40. The longitudinally conveying device 40 conveys the empty stacking jig 10 and loads the slider 42 to the loading/unloading position B of the elevating device 2.

The elevating device 2 raises the elevating table 32 to the loading/unloading position B from the standby position C, brings the upper surface of the elevating table 32 into contact with the lower surface of the empty stacking jig 10 at the loading/unloading position B on the conveying device 3, and receives the empty stacking jig 10 from the conveying device 3 onto the elevating table 32. Then, the stacking jig 10 in the die 7C of the lower mold 7D in the third processing unit 6C is raised to the stacking position A (shown by broken line in FIGS. 12, 9) by raising the elevating table 32. The stacking jig 10 raised toward the die 7C is directly guided and positioned with respect to the inner diameter of the plate-like works W retained by the retention mechanism 20 of the die 7C (see FIG. 16).

Figure 17:
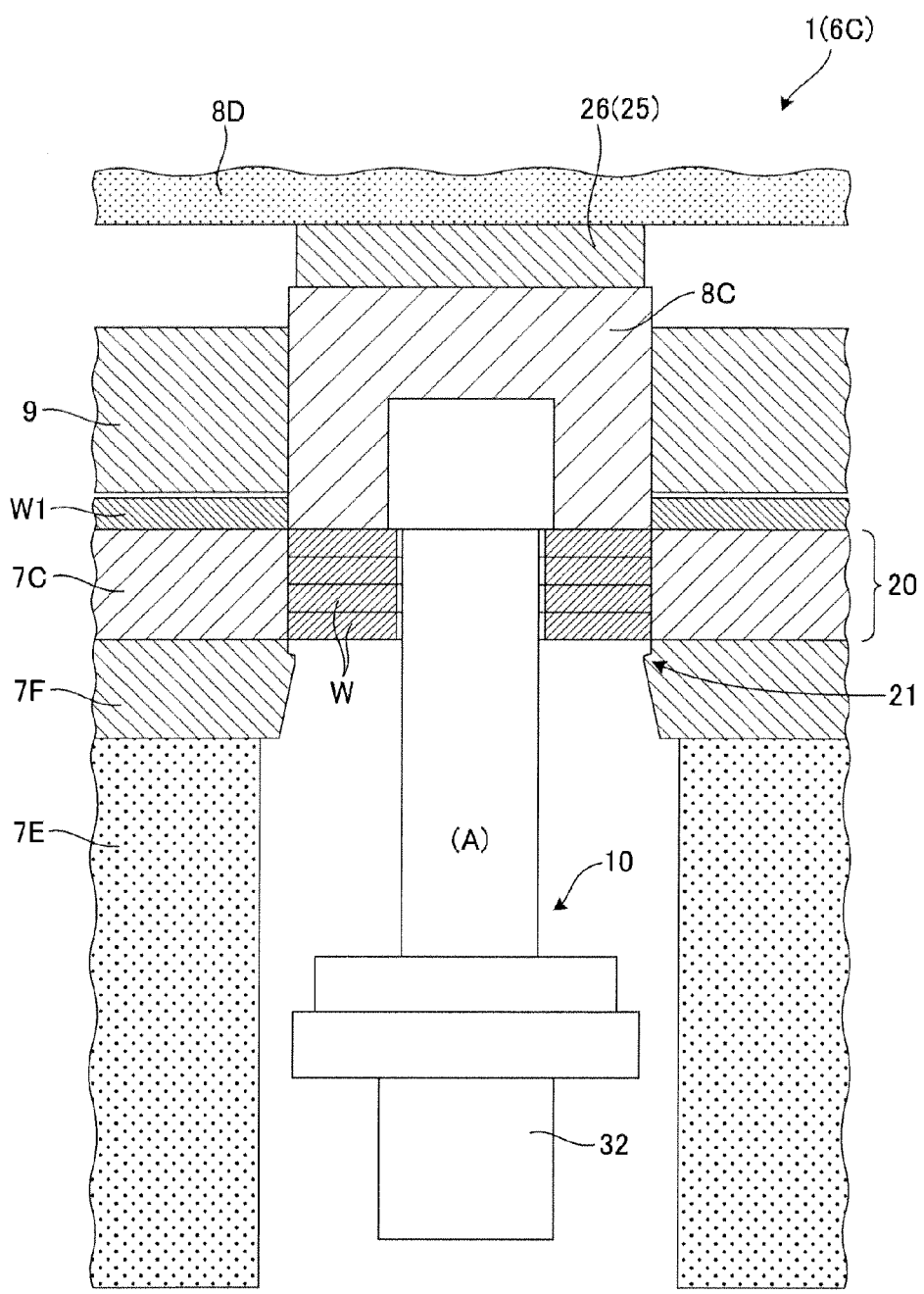
FIG. 17 is an operation diagram showing a state where more plate-like works are retained in the retention mechanism.
Figure 18:
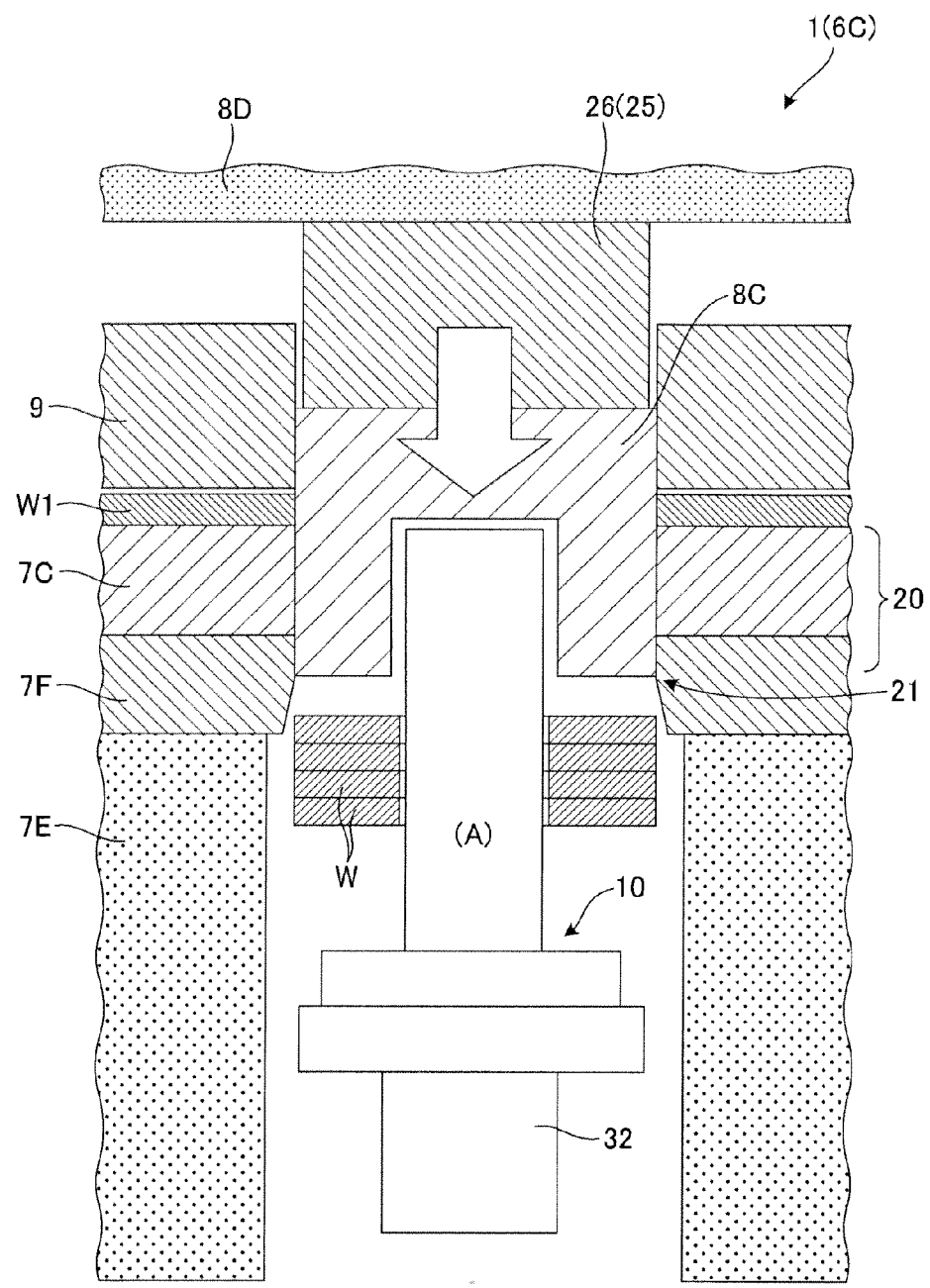
FIG. 18 is a diagram showing a state where the plate-like works are knocked out by the retention mechanism.

Newly punched plate-like works W are engaged with the outer periphery of the cylindrical portion 11 of the positioned stacking jig 10 and the retention mechanism 20 to be successively retained (see FIG. 17). Every time the number of the retained plate-like works W reaches the preset number, the knockout mechanism 25 is operated to transfer the retained plate-like works W to the stacking jig 10 by pushing them to the stacking jig 10 from the retention mechanism 20 as shown in FIG. 18.

Every time the preset number of plate-like works W are pushed out toward the stacking jig 10 from the retention mechanism 20 by the knockout mechanism 25, the elevating table 32 is lowered to lower the stacking jig 10 to the rotational stacking position D as shown in FIG. 13. At this rotational stacking position D, the rotary servo motor 33 rotates the stacking jig 10 together with the elevating table 32. Then, the rotary servo motor 33 stops after a rotation of, e.g. 90°. Thereafter, the stacking jig 10 is raised again to the stacking position A of FIG. 12 by the elevating table 32.

Plate-like works W punched while the stacking jig 10 is lowered to the rotational stacking position D are successively retained in the retention mechanism 20. The stacking jig 10 being raised to the stacking position A is directly guided and positioned with respect to the inner diameter of the plate-like works W retained by the retention mechanism 20 of the die 7C (see FIG. 16).

By repeating punching of the press working device 1, the stacking jig 10 is repeatedly raised and lowered between the stacking position A and the rotational stacking position D. When the number of plate-like works W stacked on the stacking jig 10 reaches a desired number, the elevating device 2 lowers the stacking jig 10 to the loading/unloading position B.

The conveying device 3 receives the stacking jig 10 by transferring it onto the slider 42 of the longitudinally conveying device 40 when the stacking jig 10 on which the punched plate-like works W are stacked is lowered to the loading/unloading position B by the elevating device 2. Then, the elevating device 2 moves to the standby position C.

The longitudinally conveying device 40 conveys the stacking jig 10 on the slider 42 toward the vertically conveying device 60. When the stacking jig 10 is loaded onto the elevating table 61 of the vertically conveying device 60, the stacking jig 10 is loaded to the laterally conveying device 50 by the elevating table 61 of the vertically conveying device 60.

The laterally conveying device 50 pushes out the stacking jigs 10 on the conveyor rail 51 toward the downstream side by one pitch to push out the stacking jig 10, on which the plate-like works W are placed, to the downstream conveyor rail 52 and, instead, transfers an empty stacking jig 10 onto the elevating table 61 of the vertically conveying device 60. The vertically conveying device 60 lowers the elevating table 61 and transfers the empty stacking jig 10 onto the slider 42 of the longitudinally conveying device 40. The longitudinally conveying device 40 conveys the empty stacking jig 10 and loads the slider 42 to the loading/unloading position B of the elevating device 2.

The elevating device 2 raises the elevating table 32 from the standby position C to the loading/unloading position B, brings the upper surface of the elevating table 32 into contact with the lower surface of the empty stacking jig 10 located at the loading/unloading position B on the conveying device 3, and receives the empty stacking jig 10 from the conveying device 3 to the elevating table 32. Then, the elevating table 32 is raised to raise the stacking jig 10 to the stacking position A (shown by broken line in FIGS. 12, 9) into the die 7C of the lower mold 7D in the third processing unit 6C.

Figure 16:
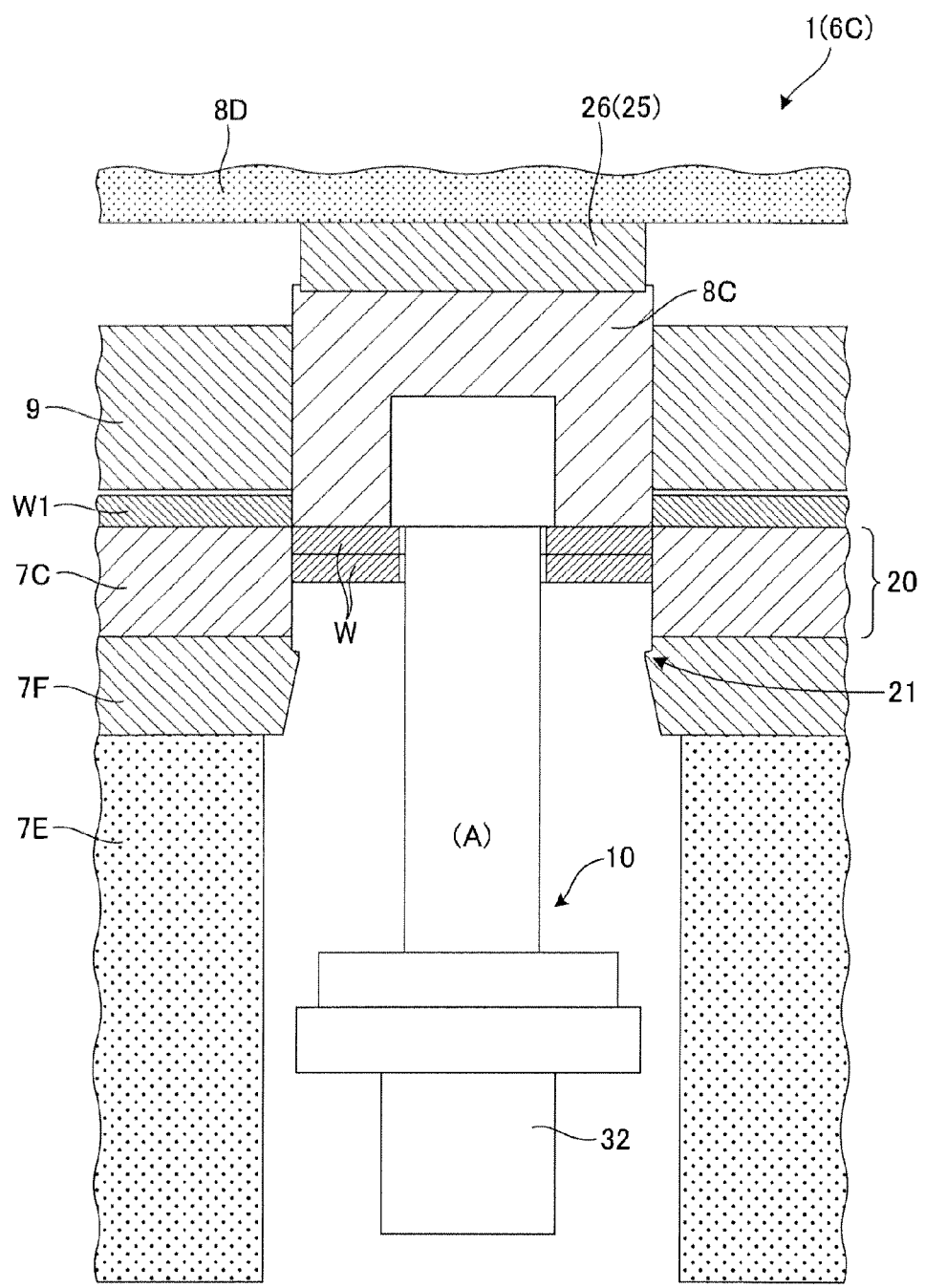
FIG. 16 is an operation diagram showing a state where plate-like works are retained in the retention mechanism.

The stacking jig 10 raised toward the die 7C is directly guided and positioned with respect to the inner diameter of the plate-like works W retained by the retention mechanism 20 of the die 7C (see FIG. 16). Newly punched plate-like works W are engaged with the outer periphery of the cylindrical portion 11 of the positioned stacking jig 10 and the retention mechanism 20 to be successively retained (see FIG. 17).

Retention of successively punched plate-like works W, stacking on the stacking jig 10 by the knockout mechanism 25, recession to the rotational stacking position D for a rotation of a predetermined angle and an upward movement again to the stacking position A are repeated. When the punched plate-like works W on the stacking jig 10 reaches a predetermined amount, the stacking jig 10 is unloaded by the elevating device 2 and the conveying device 3 and an empty stacking jig 10 is loaded by the conveying device 3 and the elevating device 2 again. By repeating the above operation, punching and stacking of plate-like works W are successively performed without stopping the press working device 1.

Figure 19:
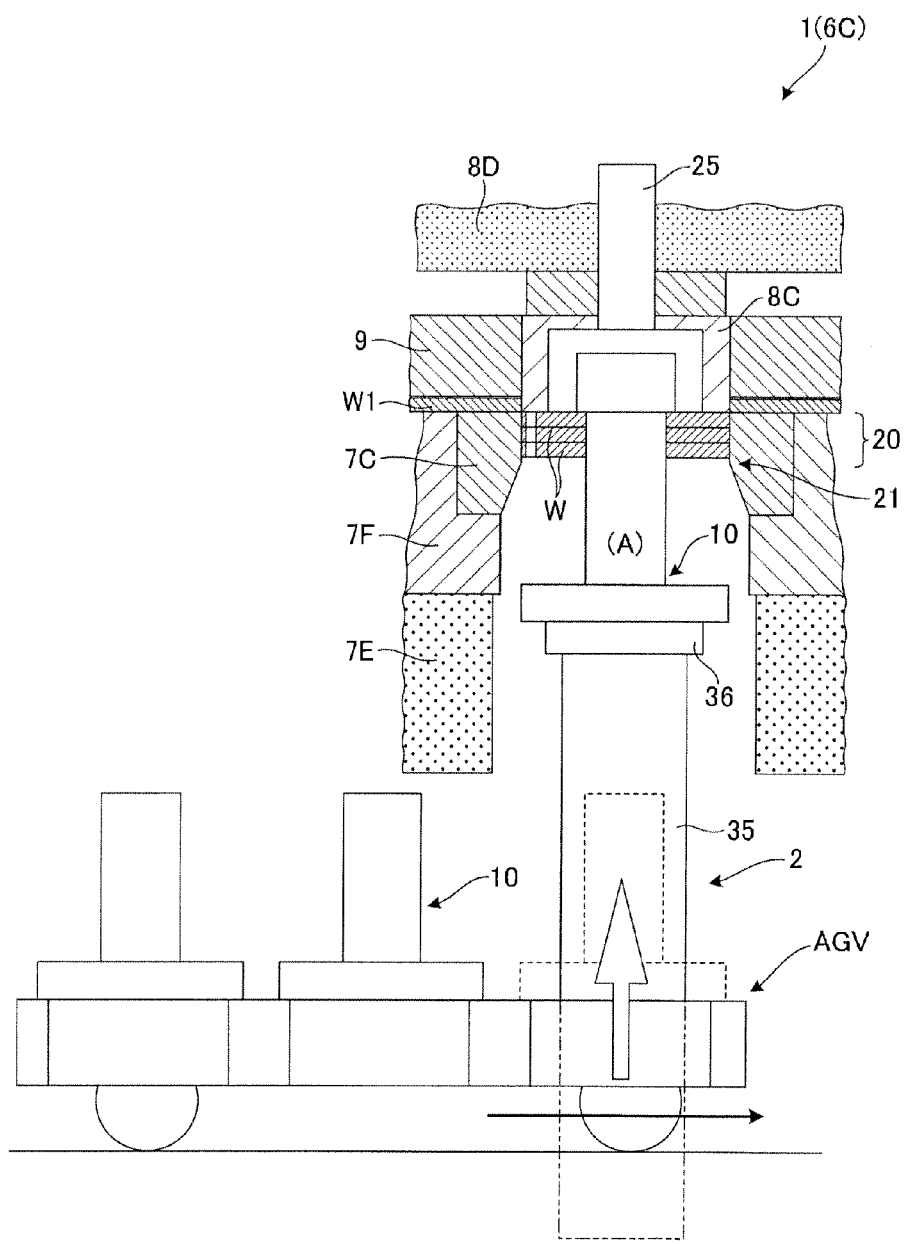
FIG. 19 is a schematic configuration view showing a laminated work production apparatus of a second example.
Figure 20:
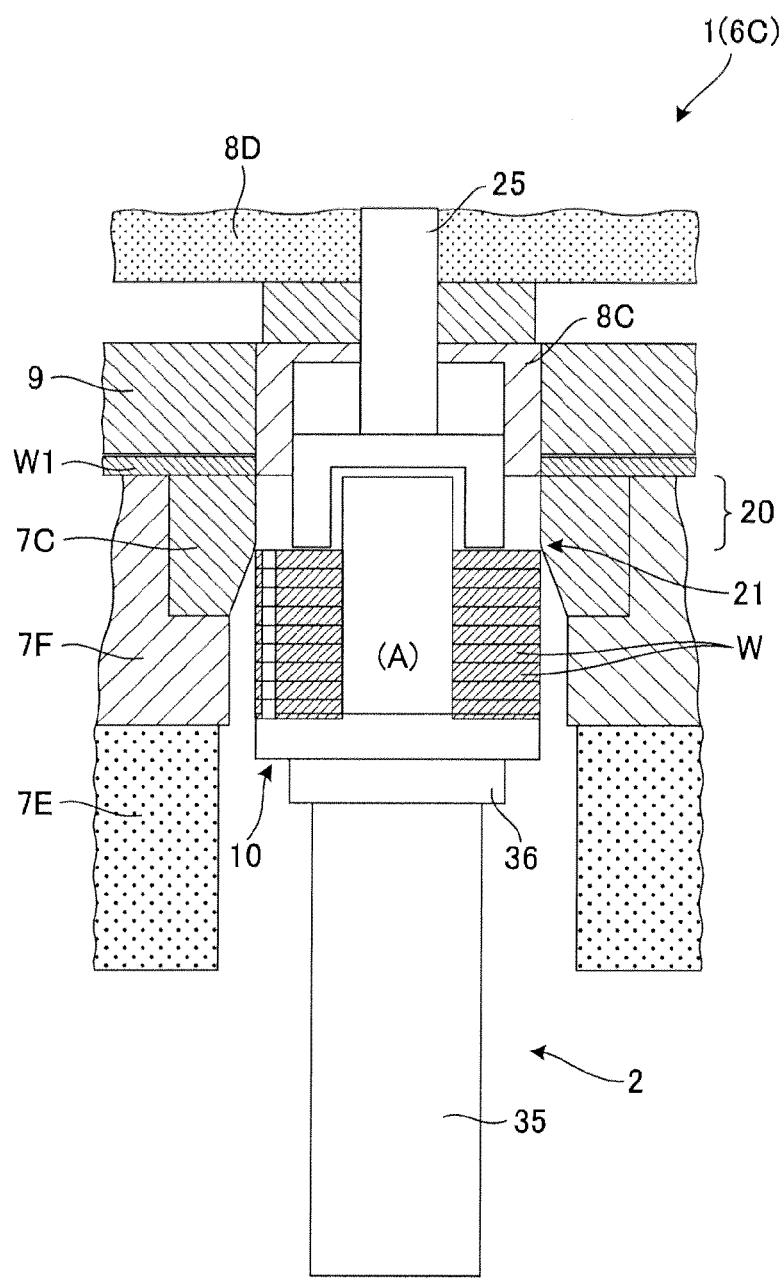
FIG. 20 is a diagram showing a knockout operation of the second example.
Figure 21:
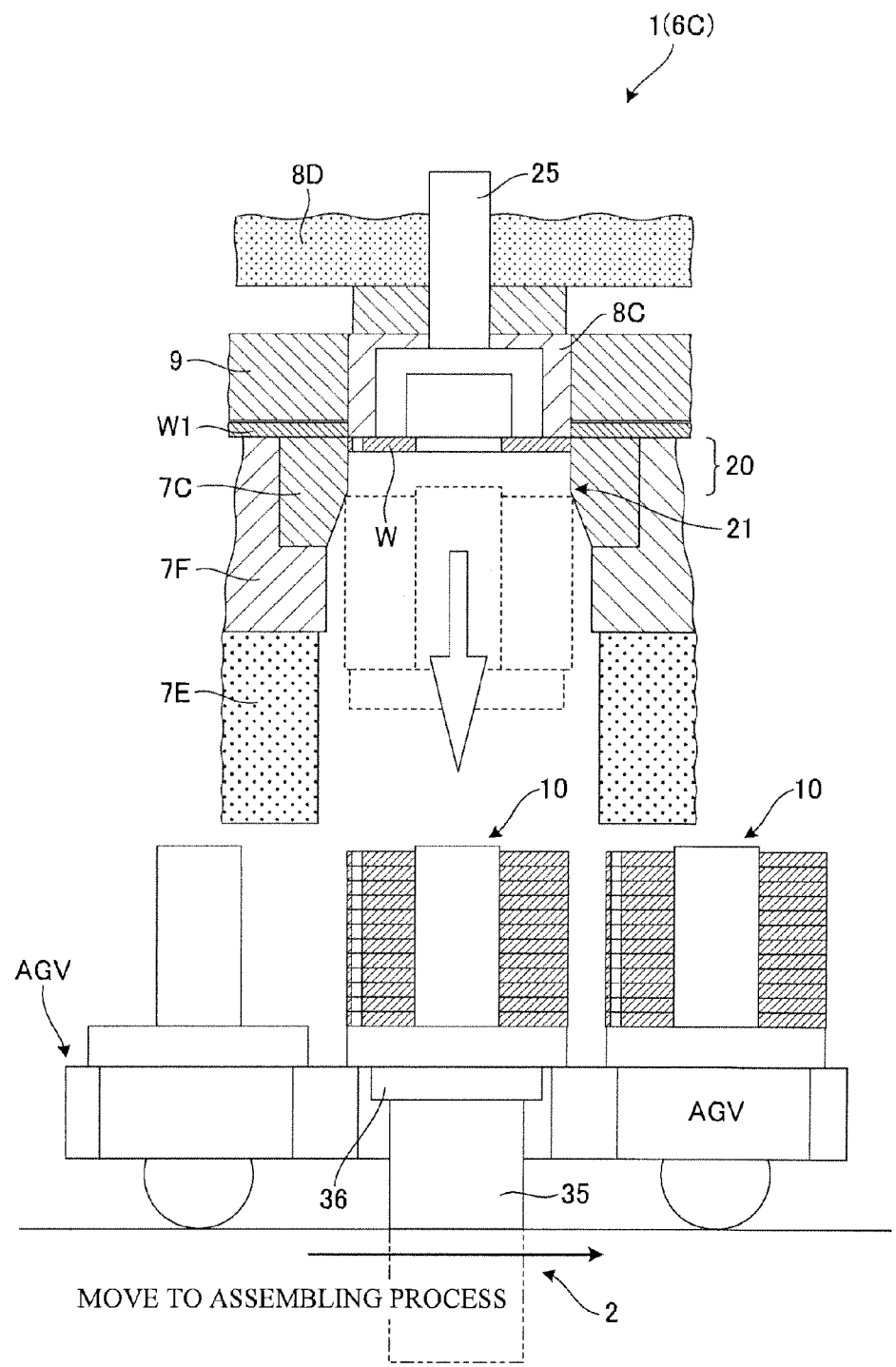
FIG. 21 is a diagram showing a conveying state of stacking jigs of the second example.

FIGS. 19 to 21 are sectional views showing a laminated work production apparatus and a production method of a second example of this embodiment. In this example, the conveying device is arranged to pass a lower part of a third lowering unit of the press working device. It should be noted that the same devices and parts as the first example are denoted by the same reference signs and not described or only briefly described.

In FIG. 19, the conveying device 3 is configured by an automatic guided vehicle AGV which runs along a conveyance path to move to and from a fixed position in the lower part of the third processing unit 6C of the press working device 1. The automatic guided vehicle AGV operates to carry and load an empty stacking jig 10 to the fixed position of the lower part of the processing unit 6C and to transfer and unload the stacking jig 10, on which plate-like works W are stacked, from the fixed position. Further, the elevating device 2 is installed to be able to project into and retract from the conveyance path in the lower part of the third processing unit 6C of the press working device 1. Specifically, the elevating device 2 is composed of an elevating cylinder 35 which projects into and retracts from the conveyance path, has the stacking jig 10 on the automatic guided vehicle AGV transferred thereto and raises and lowers the stacking jig 10, and a rotary table 36 which rotates the stacking jig 10 by being rotated by a servo motor and is provided on the leading end of the elevating cylinder. It should be noted that the knockout mechanism 25 is configured to be activated by an unillustrated actuator independently of the punch 8C. The other configuration is similar to the first example.

In the above laminated work production apparatus of the second example, the automatic guided vehicle AGV carries a plurality of empty stacking jigs 10, moves to the lower part of the third processing unit 6C of the press working device 1 and stops at a position where the first empty stacking jig 10 is on the elevating device 2 as shown in FIG. 19. The carried first empty stacking jig 10 is raised to the stacking position A by being lifted up by the rotary table 36 that is raised and lowered by the elevating cylinder 35 of the elevating device 2 projected to and retracted from the conveyance path. The stacking jig 10 raised toward the die 7C is directly guided and positioned with respect to the inner diameter of plate-like works W retained by the retention mechanism 20 of the die 7C. The punched plate-like works W are engaged with the outer periphery of the cylindrical portion 11 of the positioned stacking jig 10 and the retention mechanism 20 to be successively retained.

Every time the number of the plate-like works W retained in the retention mechanism 20 reaches the preset number, the knockout mechanism 25 is operated to push out the retained plate-like works W from the retention mechanism 20 to the stacking jig 10 and transfer them to the stacking jig 10 as shown in FIG. 20.

Every time the plate-like works W are pushed out toward the stacking jig 10 from the retention mechanism 20 by the knockout mechanism 25, the stacking jig 10 is lowered to the rotational stacking position D by the elevating cylinder 35. The stacking jig 10 is rotated by the servo motor built in the elevating cylinder 35 at this rotational stacking position D. Then, the stacking jig 10 is stopped after a rotation of predetermined angle, e.g. 90° in the rotating direction and, thereafter, raised again to the stacking position A by the elevating cylinder 35.

Plate-like works W punched while the stacking jig 10 is lowered to the rotational stacking position D are successively retained in the retention mechanism 20. The stacking jig 10 raised to the stacking position A is directly guided and positioned with respect to the inner diameter of the plate-like works W retained by the retention mechanism 20 of the die 7C.

By repeating punching of the press working device 1, the stacking jig 10 is repeatedly raised and lowered between the stacking position A and the rotational stacking position D. When the number of the plate-like works W stacked on the stacking jig 10 reaches a desired number, the stacking jig 10 is lowered by the elevating cylinder 35 and transferred to the automatic guided vehicle AGV as shown in FIG. 21.

Subsequently, the automatic guided vehicle AGV runs to and stops at a position where the next one of the carried empty stacking jigs 10 is located above the elevating device 2. The next one of the carried empty stacking jigs 10 is raised to the stacking position A by being lifted up by the rotary table 36 that is raised and lowered by the elevating cylinder 35 of the elevating device 2 projected to and retracted from the conveyance path. The stacking jig 10 being raised toward the die 7C is directly guided and positioned with respect to the inner diameter of plate-like works W retained by the retention mechanism 20 of the die 7C. Punched plate-like works W are engaged with the outer periphery of the cylindrical portion 11 of the positioned stacking jig 10 and the retention mechanism 20 to be successively retained.

By repeating the above operation, the automatic guided vehicle AGV moves forward from the lower part of the third lowering unit of the press working device 1 and runs to the next process when a predetermined number of plate-like works W are stacked on all of the stacking jigs 10 of the automatic guided vehicle AGV. Then, a new automatic guided vehicle AGV carrying a plurality of empty stacking jigs 10 moves to and stops at the lower part of the third lowering unit of the press working device 1, and an operation of stacking plate-like works W is similarly performed on the stacking jigs 10 carried on this automatic guided vehicle AGV.

Figure 22:
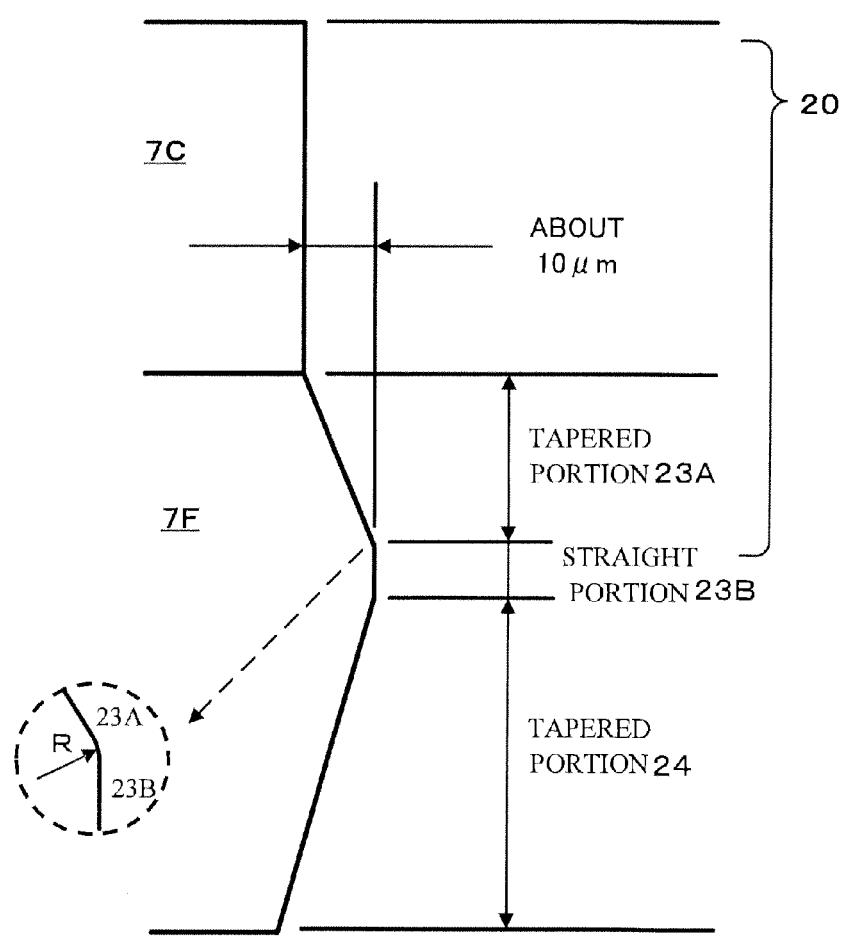
FIG. 22 is an enlarged view showing a retention mechanism of a third example.

FIG. 22 is a sectional view of an essential part of the press facility showing a laminated work production apparatus of a third example of this embodiment. In this example, the configuration of the retention mechanism provided in the third lower mold of the press working device is added to the first and second examples. It should be noted that the same devices and parts as in the first and second examples are denoted by the same reference signs and not described or only briefly described.

In this retention mechanism 20, the inner diameter hole forming the die retainer 7F is formed by an upper tapered portion 23A which is slightly narrowed toward a lower side and a straight portion 23B which has a cylindrical shape connected to the lower end of the tapered portion 23A. An inner diameter difference between an upper end side and a lower end side of the upper tapered portion 23A is set at about 10 μm in radius (20 μm in diameter) when the outer diameter of the plate-like works W is 100ϕ. Further, the upper tapered portion 23A and the straight portion 23B are smoothly connected by a corner R. It should be noted that although a lower tapered portion 24 widened toward the lower side is connected and provided on the lower end of the straight portion 23B because of easy processing, this part may have another shape if the inner diameter of the hole is made larger than the straight portion 23B.

In the thus configured retention mechanism 20, the outer periphery of the bottommost plate-like work W is engaged with the upper tapered portion 23A forming the retention mechanism 20 of the die retainer 7F, whereby the plate-like works W are successively stacked and held on the bottommost one. Every time the number of the plate-like works W stacked and held on the retention mechanism 20 reaches a preset number, the plate-like works W are knocked out in the punching direction from the retention mechanism 20 by the knockout mechanism 25 and transferred to the stacking jig 10 located at the stacking position on the extension of the punching direction.

At the time of this knockout, the plate-like works W stacked and held in the retention mechanism 20 are elastically deformed to be gradually reduce the outer diameter thereof and reach the straight portion 23B while being pressed and centered by the entire outer peripheral area of the upper tapered portion 23A. Thereafter, the plate-like works W pass the lower tapered portion 23B. It should be noted that if the retention mechanism 20 has a stepped shape due to the small-diameter portion 21 shown in FIG. 7 or the like, an external force may act in the axial direction on outer parts of the plate-like works W due to the step of the retention mechanism 20 at the time of knockout and outer peripheral parts of the knocked-out plate-like works W may be slightly warped in the axial direction due to plastic deformation.

However, in the retention mechanism 20 of this example, the plate-like works W are fed to the straight portion 23B while being elastically deformed to gradually reduce the outer diameter thereof by the upper tapered portion 23A. Thus, it is possible to suppress an external force acting in the outer parts of the plate-like works W in the axial direction at the time of knockout and reduce warping of the outer peripheral parts of the knocked-out plate-like works W due to plastic deformation. Further, since the retention mechanism 20 is tapered, the retention mechanism 20 can be easily processed without necessitating the use of a special tool at the time of processing and mold production cost can be reduced.

Figure 23:
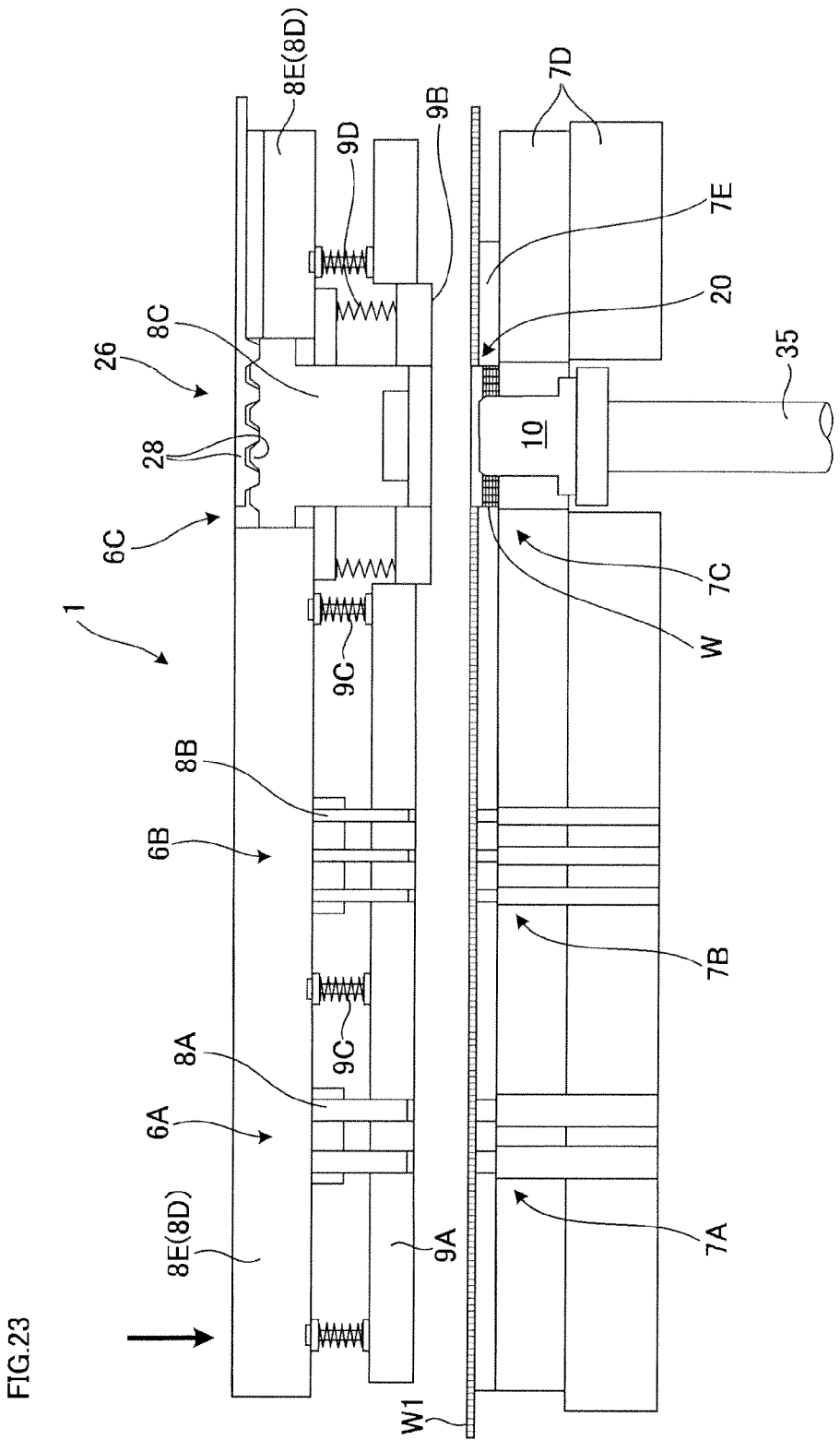
FIG. 23 is a schematic configuration view showing a laminated work production apparatus of a fourth example.

FIG. 23 is a sectional view of a press facility showing a laminated work production apparatus and a production method of a fourth example of this embodiment. FIGS. 24 to 29 are sectional views showing an operating state of the press facility. In this example, a configuration in which a stripper (pad) provided on the third processing unit of the press working device to press a coiled material is arranged independently of strippers of the other first and second processing units is added to the first and second examples. It should be noted that the same devices and parts as in the first and second examples are denoted by the same reference signs and not described or only briefly described.

A stripper (pad) 9B provided in the third processing unit 6C of the press working device 1 of this example and configured to press the coiled material W1 is provided independently of a striper (pad) 9A of the first and second processing units 6A, 6B. This pad 9B is supported on the upper mold 8D via a pad spring 9D different from pad springs 9C of the stripper (pad) 9A of the first and second processing units 6A, 6B. This pad 9B is arranged at a position before and lower than the stripper (pad) 9A of the first and second processing units 6A, 6B.

Thus, the pad 9B operates to come into contact with the coiled material W1 earlier than the stripper (pad) 9A of the first and second processing units 6A, 6B and press the coiled material W1 against the die 7C to constrict it when the upper mold 8D is lowered. Also when the cam plate 26 is pushed out to the operating position by the operation of the air cylinder 27 by operating the knockout mechanism 25 and the punch 8C projects by the cam stroke, the pad 9B presses and constricts the coiled material W1 before the projecting punch 8C comes into contact with the upper surface of the coiled material W1. The other configuration is similar to the first and second examples.

Figure 24:
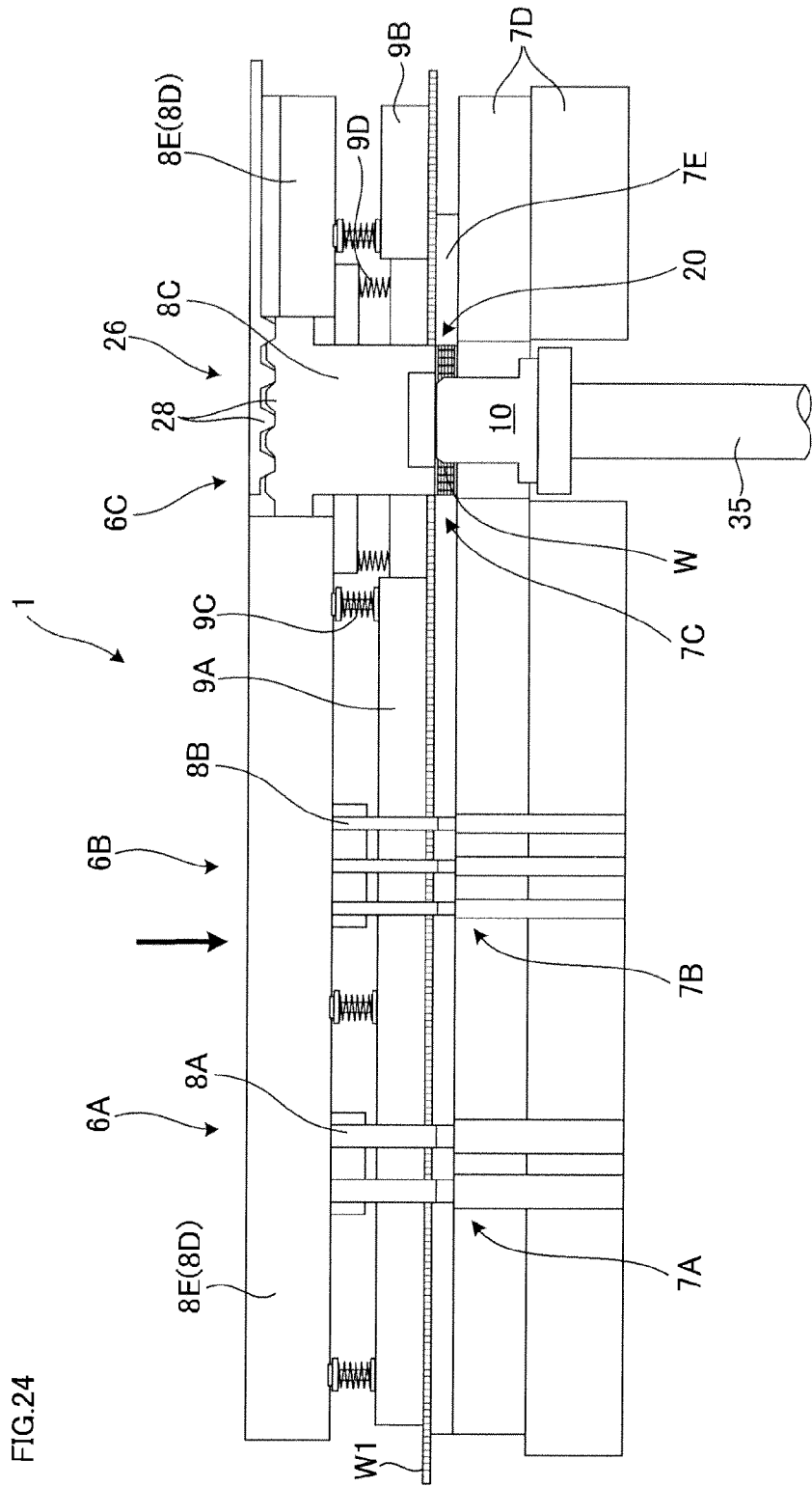
FIG. 24 is a diagram showing a state where a plate-like work of the fourth example is punched.

In the press facility of this example, when the knockout mechanism 25 is not in operation and the cam plate 26 is located at the standby position, the punch 8C is located at the same normal position as the punches 8A, 8B of the first and second processing units 6A, 6B. When the press facility is operated to the bottom dead center, the pad 9B of the third processing unit 6C presses and constricts the coiled material W1 earlier than the other pad 9A and, subsequently, the pad 9A of the first and second processing units 6A, 6B comes into contact with the coiled material W to constrict the coiled material W1. Then, as shown in FIG. 24, the pad 9A comes into contact with the coiled material W1 to constrict the coiled material W1, piercing is performed in each of the first and second processing units 6A, 6B and the punch 8C presses the coiled material W1 to punch a plate-like work W out from the coiled material W1 in the third processing unit 6C. The punch 8C directly moves upward in a state where the plate-like work W is punched out from the coiled material W1, i.e. after the amount of insertion of the punch 8C into the die 7C at the time of punching reaches the predetermined value. Accordingly, the punched plate-like work W is retained in the inner diameter hole of the die 7C by the retention mechanism 20. Specifically, if the amount of insertion of the punch 8C into the die 7C at the time of punching is, for example, 0.5 mm, the punched and retained plate-like work W is retained at a position 0.5 mm from the upper end of the die 7C. In this case, if there is/are previously punched and retained plate-like work(s) W, the newly punched plate-like work W is retained in the die 7C while pushing down the retained plate-like work(s) W in the inner diameter hole of the die 7C.

Figure 25:
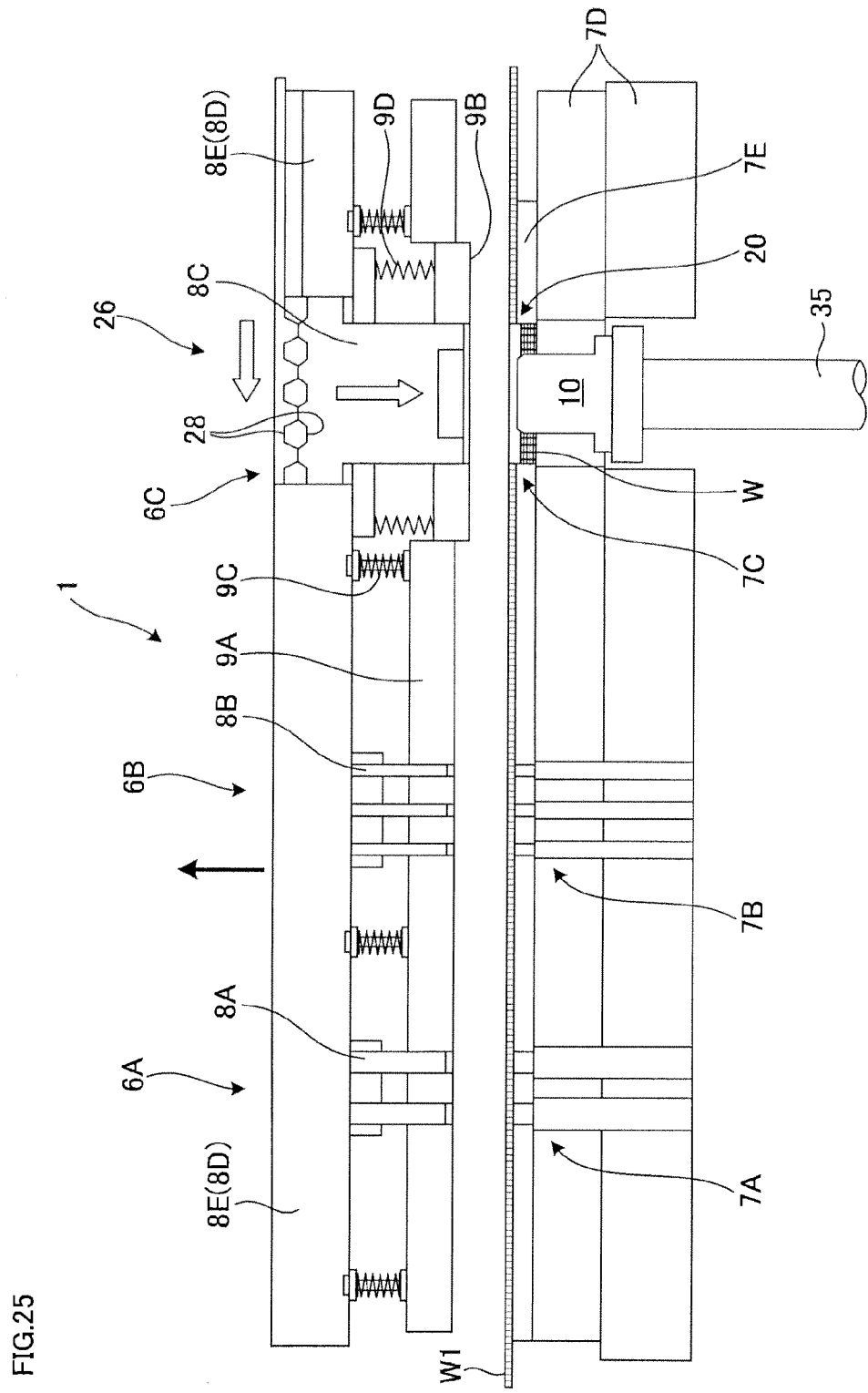
FIG. 25 is a diagram showing an operating state at the time of knockout of the fourth example.
Figure 26:
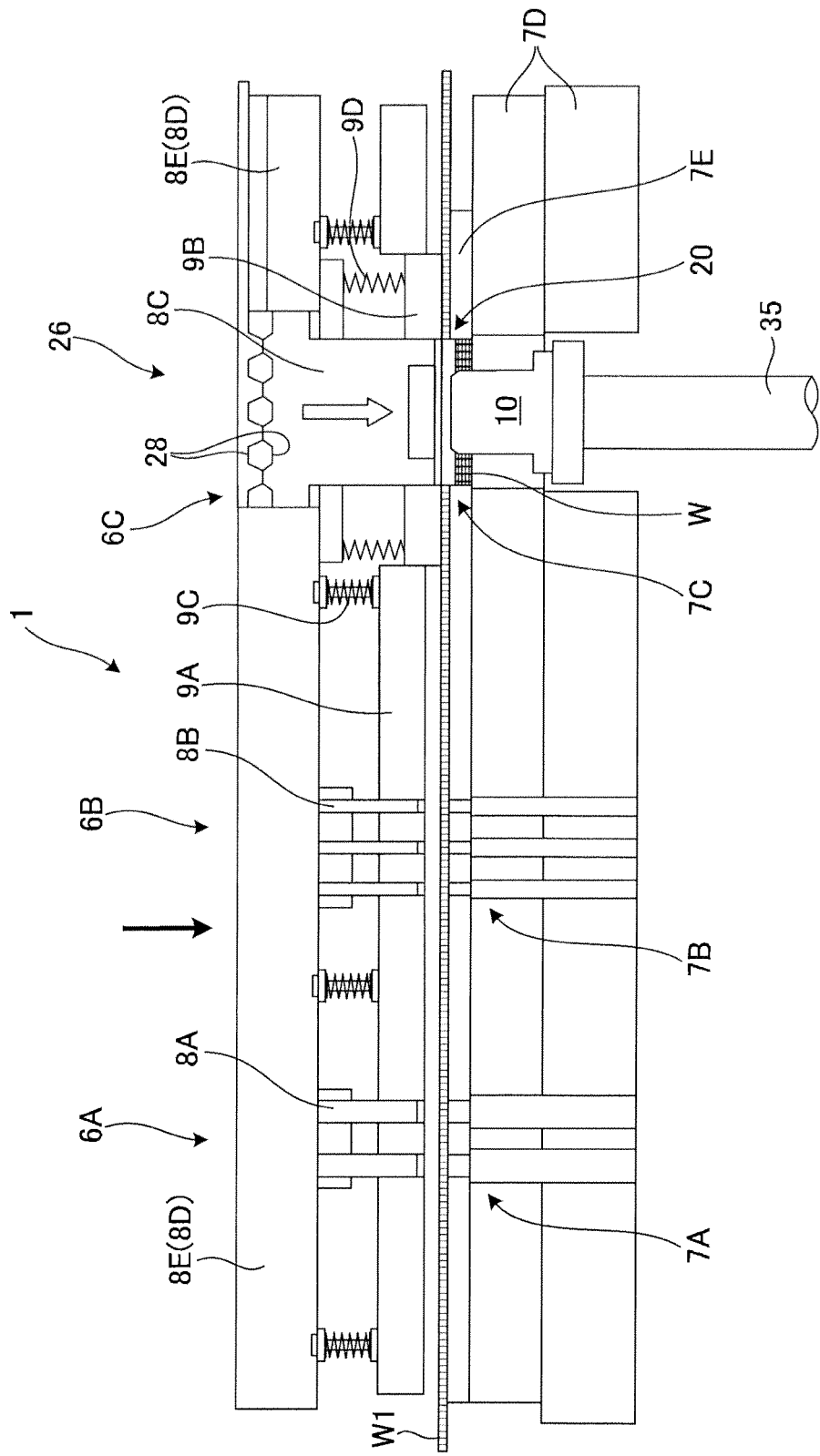
FIG. 26 is a diagram showing an operating state following FIG. 25.
Figure 27:
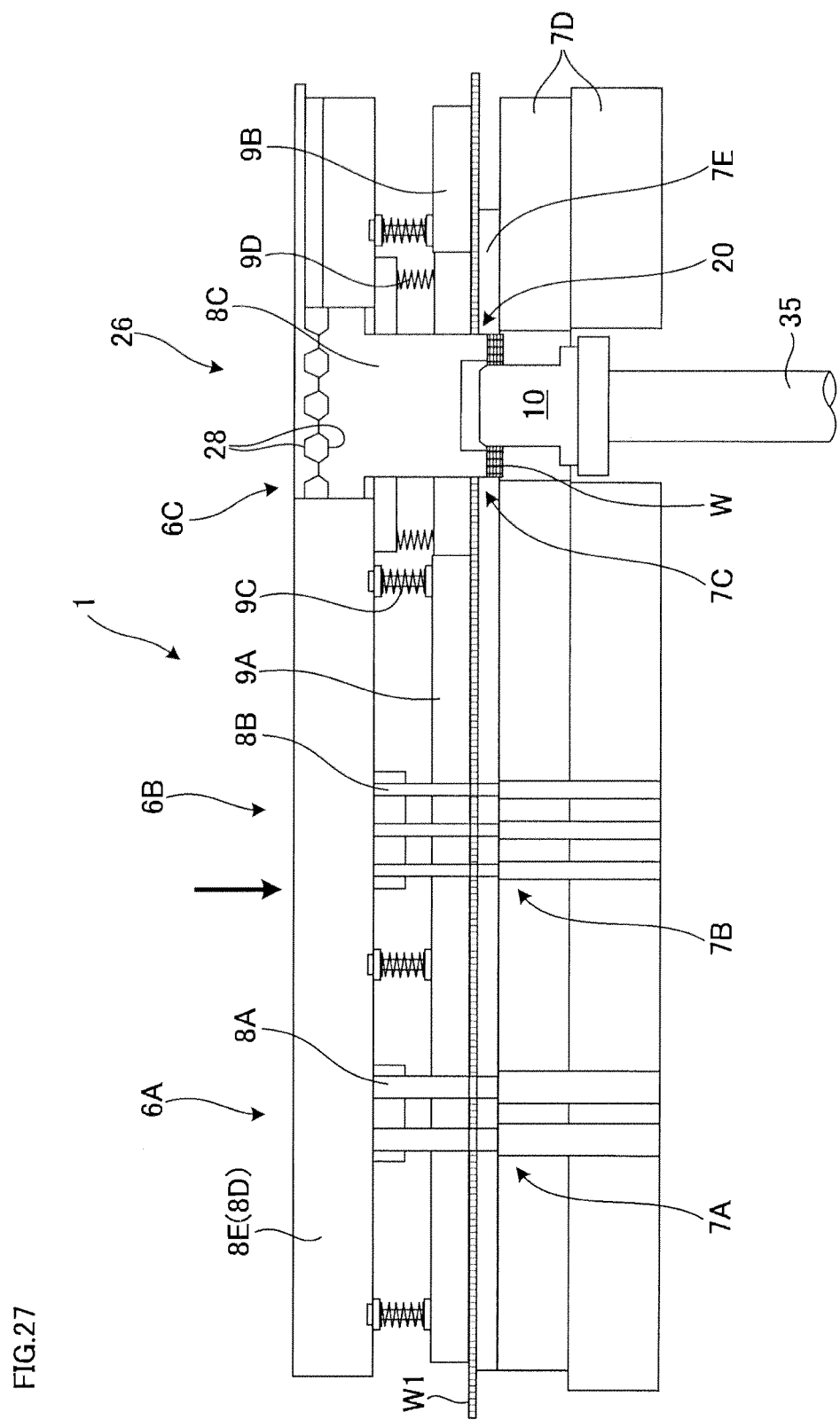
FIG. 27 is a diagram showing an operating state following FIG. 26.

When the knockout mechanism 25 is operated and the cam plate 26 is pushed out to the operating position by the operation of the air cylinder 27, the punch 8C projects by the cam stroke from the punches 8A, 8B of the first and second processing units 6A, 6B as shown in FIG. 25. When the press facility is operated to the bottom dead center, the pad 9B of the third processing unit 6C presses and constricts the coiled material W1 earlier than the other pad 9A and before the punch 8C projecting by the cam stroke comes into contact with the coiled material W1 as shown in FIG. 26. Subsequently, as shown in FIG. 27, the punch 8C projecting by the cam stroke is pressed against the coiled material W1 constricted by the pad 9B and the plate-like work W is punched out from the coiled material W1. Thus, the plate-like work W can be punched out from the coiled material W1 constricted by the pad 9B without being strained.

Figure 28:
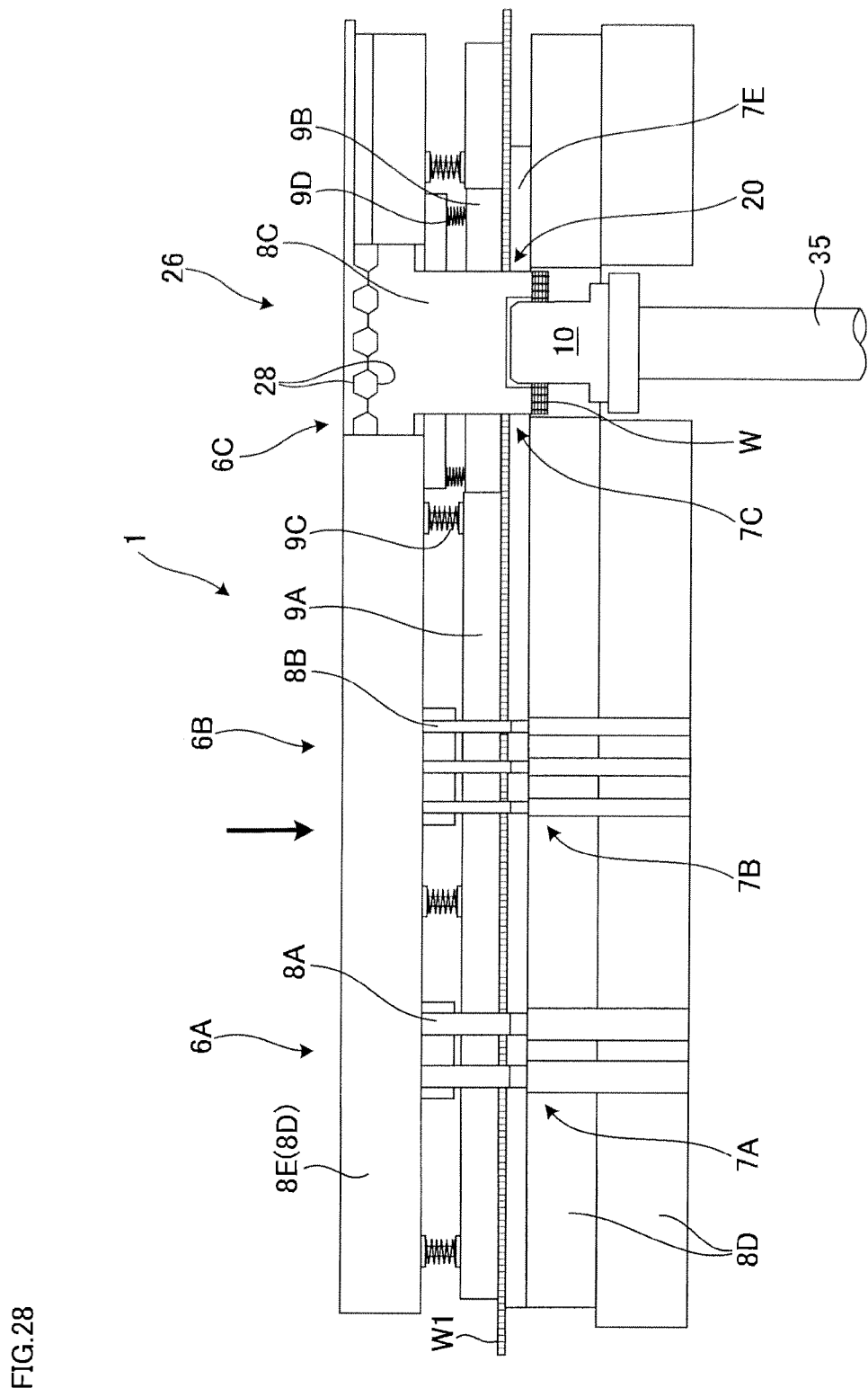
FIG. 28 is a diagram showing an operating state following FIG. 27.

Subsequently, when the upper mold 8D is further lowered toward the bottom dead center as shown in FIG. 28, the pad 9A comes into contact with the coiled material W1 to constrict the coiled material W1 in the first and second processing units 6A, 6B. The upper mold 8D is lowered until piercing is performed in each of the first and second processing units 6A, 6B. In the third processing unit 6C, the punch 8C is further inserted into the die 7C from a state where the plate-like work W is punched out from the coiled material W1 and operates to push out the plate-like works W retained in the inner diameter hole of the die 7C by the retention mechanism 20 to a lower side of the die 7C. The pushed-out plate-like works W are stacked and held on the stacking jig 10.

Figure 29:
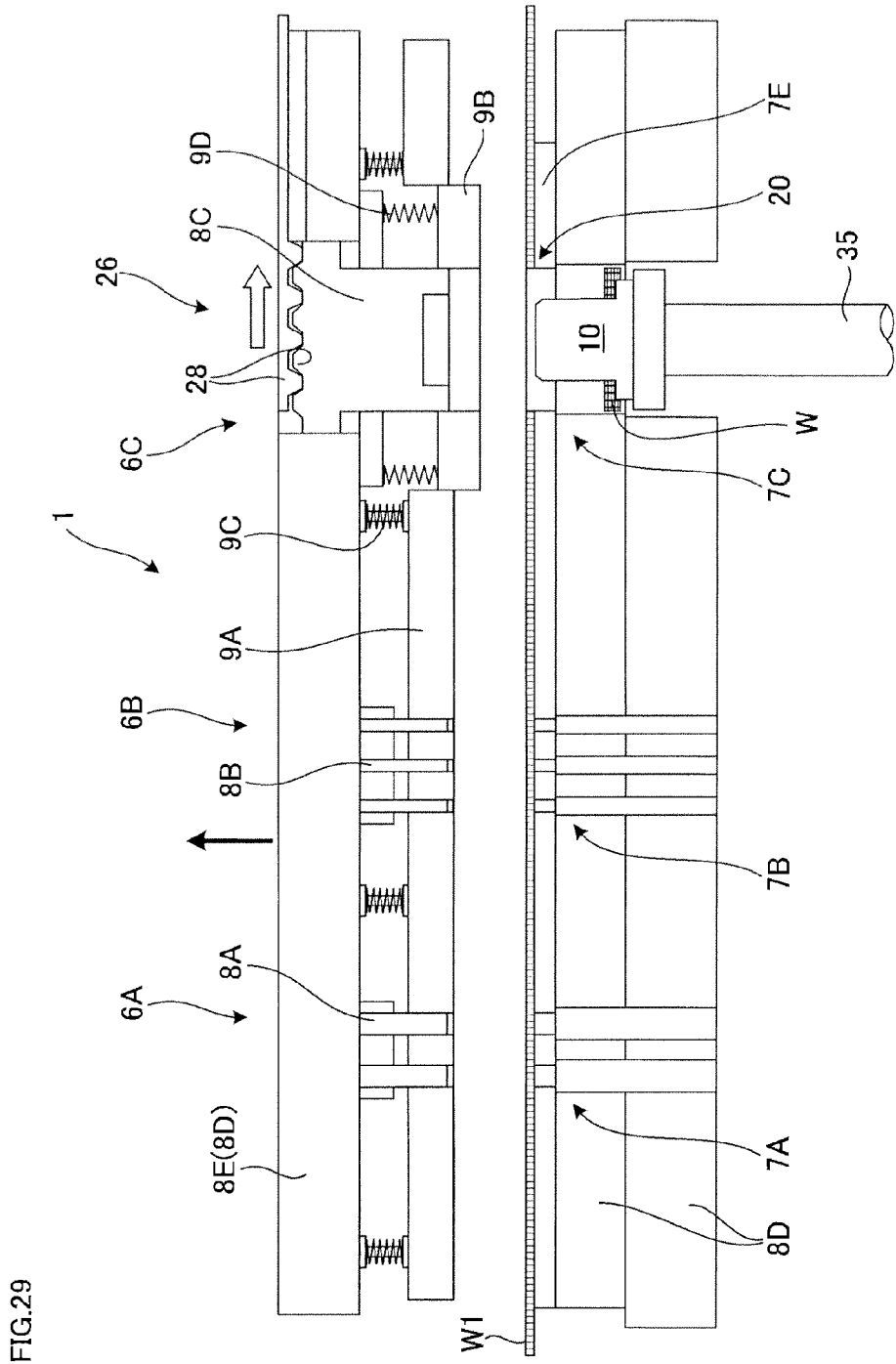
FIG. 29 is a diagram showing an operating state following FIG. 28.

After passing the bottom dead center, the upper mold 8D starts moving upward and, accordingly, the air cylinder 27 of the knockout mechanism 25 operates to return the cam plate 26 to the standby position and the punch 8C is moved back to the normal position by the wavy cams 28 as shown in FIG. 29.

Thereafter, the punch 8C successively punches plate-like works W out from the coiled material W1 at the same normal position as the punches 8A, 8B of the first and second processing units 6A, 6B and causes the plate-like works W to be retained in the retention mechanism 20. The knockout mechanism 25 operates to transfer the plate-like works W to the stacking jig 10 from the retention mechanism 20 every time the number of the plate-like works W retained in the retention mechanism 20 reaches the preset number.

As described above, even if the punch 8C is used both as a blanking punch for the coiled material W1 and as a knockout punch, production of plate-like works W can be continued without stopping the operation of a high-speed progressive press.

It should be noted that although the plate-like works W are stacked to form a stator core of a motor or a generator in the above embodiment, they may be stacked to form a rotor core of a motor or a generator.

In this embodiment, the following effects can be achieved.

(A) The laminated work production apparatus produces a laminated work by punching the plate-like metal material W1 into a plate-like works W of a predetermined shape by the press working device (mold device) 1 and stacking a plurality of the plate-like works W. The production apparatus includes the elevating device 2 as a stacking jig moving mechanism which moves a stacking jig 10, on which a predetermined number of plate-like works W are stacked, to the loading/unloading position B distanced downward from and located before the stacking position A in the punching direction and moves an empty stacking jig 10 from the loading/unloading position B to the stacking position A along the punching direction of the plate-like works W. The production apparatus further includes the retention mechanism 20 for successively retaining the punched plate-like works W on the extension of the punching direction and the knockout mechanism 25 for knocking out a plurality of plate-like works W in the punching direction and stacking them on the stacking jig 10 located at the stacking position A on the extension of the punching direction when the preset number of plate-like works W are retained.

Specifically, the punched plate-like works W retained in the retention mechanism 20 are intermittently stacked on the stacking jig 10 by the knockout mechanism 25 every time the number of the plate-like works W reaches the preset number. Thus, even if punching of the mold device 1 is continued, the stacking jig 10 can be moved from the stacking position A and the exchange of the stacking jig 10 and the like can be performed while the knockout mechanism 25 is stopped. As a result, continuous operation is possible without stopping punching of the mold device and productivity can be improved.

(B) The elevating device 2 as the stacking jig moving mechanism moves the stacking jig 10, on which the predetermined number of plate-like works W are stacked, to the loading/unloading position B distant from the stacking position A in the punching direction. Thus, the stacking jig 10 can be moved from the stacking position A and the exchange of the stacking jig 10 and the like can be performed while the knockout mechanism 25 is stopped even during punching of the mold device 1. As a result, continuous operation is possible without stopping punching of the mold device 1 and productivity can be improved.

(C) The stacking jig moving mechanism includes the elevating device 2 as an elevating mechanism for raising and lowering the stacking jig 10 along the punching direction of the plate-like works W and the rotary servo motor 33 and the elevating table 32 as a rotating mechanism for rotating the stacking jig 10 by a predetermined angle. The stacking jig 10 is lowered from the stacking position A to the rotational stacking position D by the elevating mechanism after the operation of the knockout mechanism 25, rotated by the predetermined angle by the rotating mechanism at the rotational stacking position D and raised to the stacking position A by the elevating mechanism after rotation. Thus, the predetermined number of plate-like works W whose phase is made different in the rotating direction every time the knockout mechanism 25 operates are stacked on the stacking jig 10.

(D) The stacking jig moving mechanism moves the stacking jig 10, on which the predetermined number of plate-like works W are stacked, to the loading/unloading position B distanced downward from and located before the stacking position A in the punching direction by the operation of the knockout mechanism 25 and, subsequently, moves the stacking jig 10 to a position away from the punching direction. Then, an empty stacking jig 10 is introduced to the loading/unloading position B and moved to the stacking position A along the punching direction of the plate-like works W. Thus, even if punching of the mold device is continued, the stacking jig 10 can be moved from the stacking position A and the exchange of the stacking jig 10 and the like can be performed while the knockout mechanism 25 is not in operation.

(E) The retention mechanism 20 shown in FIGS. 7 and 8 is formed by making the inner peripheral diameter of the die 7C or the die retainer smaller or reducing the inner peripheral diameter by the projection projecting from the inner periphery of the die 7C or the die retainer at the axial position at a preset distance from the upper end of the die 7C of the mold device 1 in the punching direction. Thus, the retention of the plate-like works W can be realized by a simple change of the die 7C or the die retainer.

(F) The retention mechanism 20 shown in FIG. 22 is composed of the tapered portion 23A that makes the inner peripheral diameter of the die 7C or the die retainer 7F smaller toward the lower side and the straight portion 23B connected to the lower end of the tapered portion 23A and having a cylindrical shape at the axial position at a preset distance from the upper end of the die 7C of the mold device 1 in the punching direction. In other words, at the time of knockout, the retention mechanism 20 feeds the plate-like works W to the straight portion 23B while elastically deforming them to gradually reduce the outer diameter thereof by the tapered portion 23A. Thus, it is possible to suppress an external force acting in the outer parts of the plate-like works W in the axial direction and reduce warping of the outer peripheral parts of the knocked-out plate-like works W. Further, since the retention mechanism 20 is tapered, the retention mechanism 20 can be easily processed without necessitating the use of a special tool at the time of processing and mold production cost can be reduced.

(G) The knockout mechanism 25 shown in FIG. 6 is composed of the cam plate 26 that is arranged between the upper mold 8D of the mold device 1 and the blanking punch 8C and causes the blanking punch 8C to project relative to the upper mold 8D at the operating position, and the air cylinder 27 that presses the cam plate 26 to the operating position during the punching operation. The blanking punch 8C is caused to project in the punching direction during punching. Thus, the configuration of the knockout mechanism 25 that intermittently operates can be shared with the punch 8C and can be simplified.

(H) The mold device 1 shown in FIGS. 23 to 25 includes the piercing units 6A, 6B for piercing the plate-like metal material W1 before punching and also the strippers 9A, 9B arranged on the upper mold 8D of the mold device 1 and configured to press and constrict the plate-like metal material W1 against the lower mold 7D in piercing and punching the plate-like metal material W1. These strippers 9A, 9B are so arranged on the upper mold 8D that the stripper 9A in the piercing units 6A, 6B and the stripper 9B of the processing unit 6C for performing punching are separated from each other. The stripper 9B of the processing unit 6C for performing punching operates to press the plate-like metal material W1 before the plate-like metal material W1 is pressed by the stripper 9A in the piercing units 6A, 6B. Thus, even if the knockout mechanism 25 is operated and the punch 8C is projected to perform punching earlier than the piercing units 6A, 6B, the plate-like work W can be punched out from the coiled material W1 constricted by the stripper 9B without being strained. Accordingly, even if the punch 8C is used both as the blanking punch for the coiled material W1 and as the knockout punch, production of plate-like works W can be continued without stopping the operation of the high-speed progressive press.

(I) As shown in FIG. 21, the exchange of the stacking jig 10 and the movement thereof from the stacking position A to the rotational stacking position D are performed while the punched plate-like works W are retained on the extension of the punching direction of the mold device 1. Thus, continuous operation is possible without stopping punching of the mold device 1 and productivity can be improved.

(J) As shown in FIG. 19, the stacking jig 10 is positioned in a direction orthogonal to the punching direction by the engagement of the leading end with the retained plate-like works W when being raised from the loading/unloading position B to the stacking position A. Thus, it is possible to improve positioning accuracy of the punched and retained plate-like works W and the stacking jig 10, prevent the interference of the plate-like works W and the stacking jig 10 and prevent the breakage and the like of the stacked plate-like works W.

Second Embodiment

Figure 30:
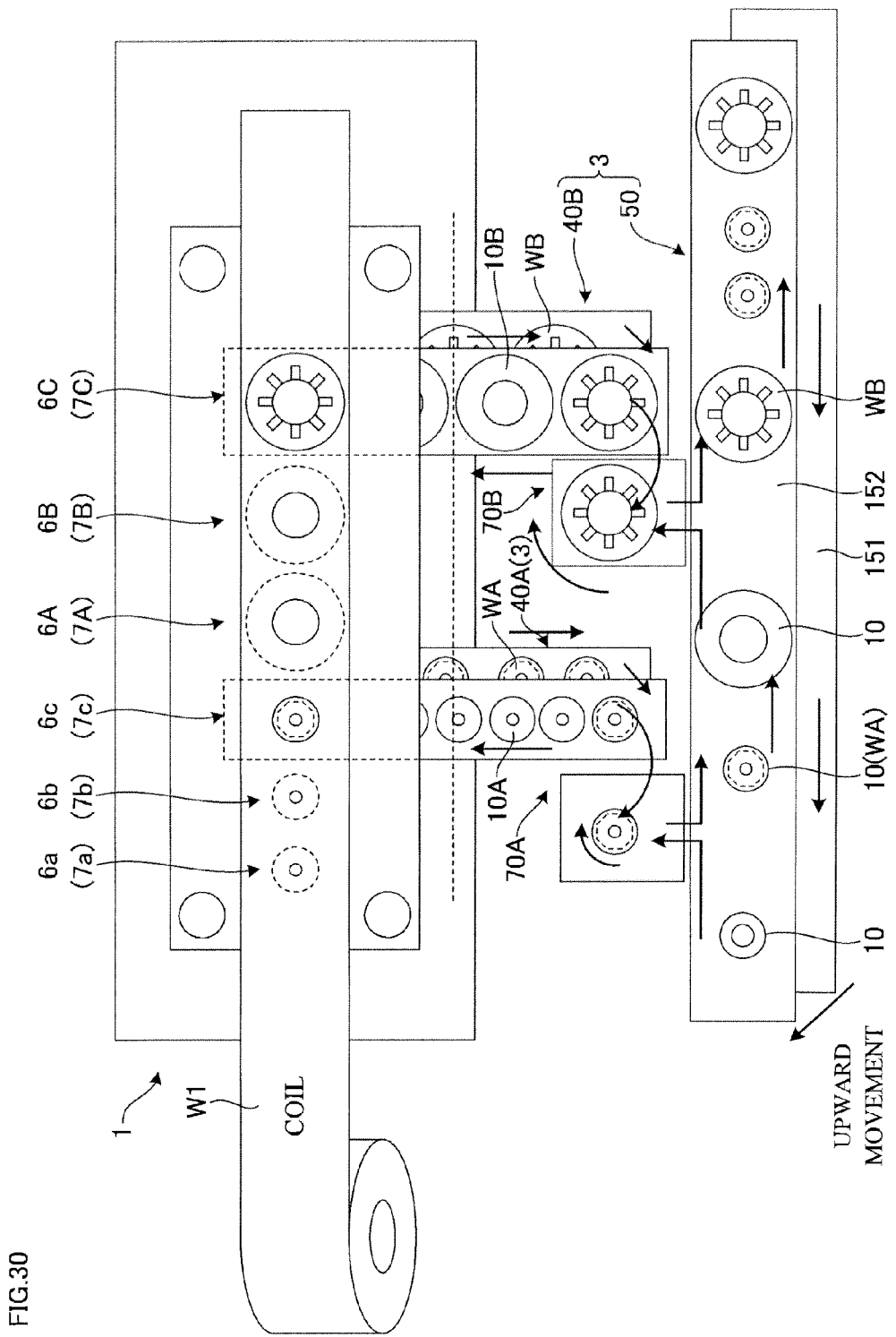
FIG. 30 is a schematic configuration view showing a laminated work production apparatus of a second embodiment of the present invention.
Figure 31:
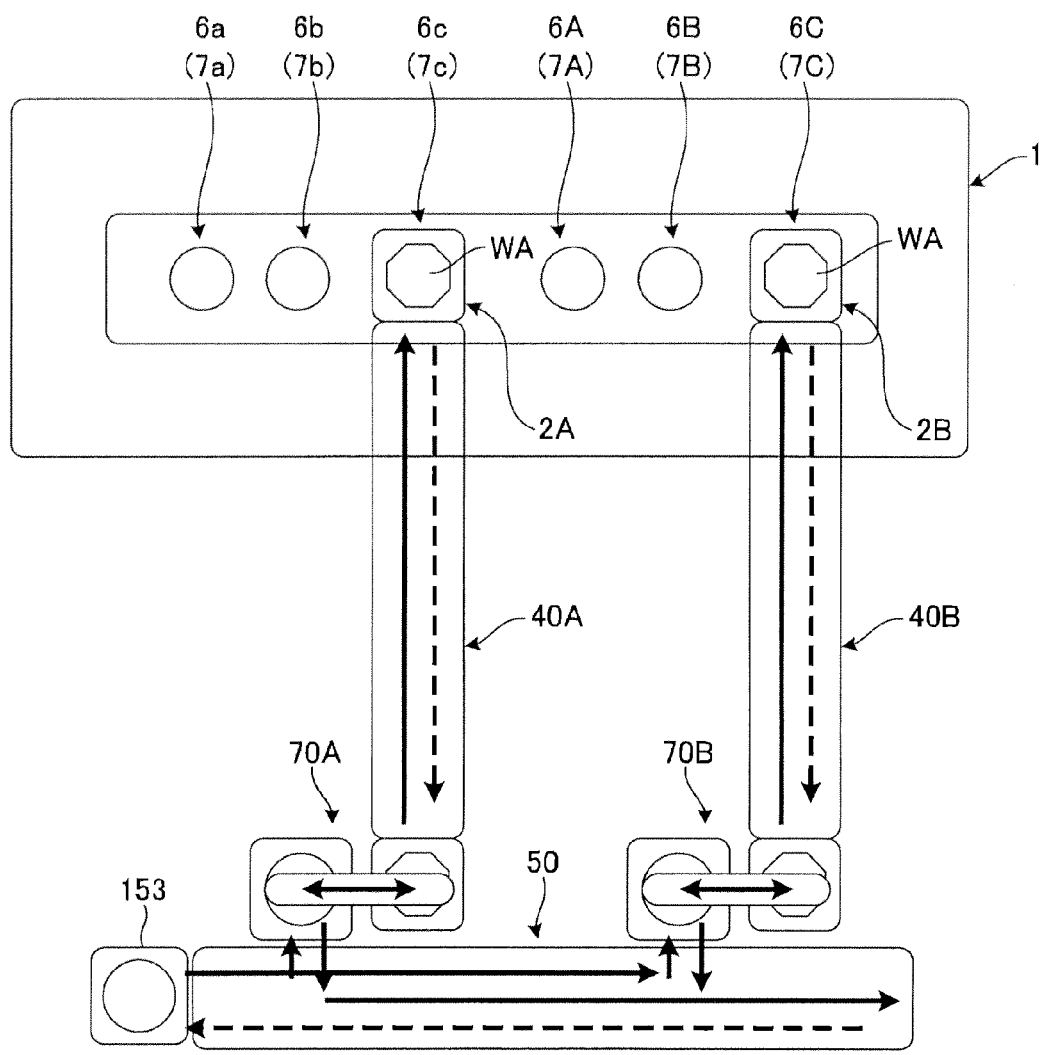
FIG. 31 is a schematic plan view of the laminated work production apparatus of the second embodiment.

FIGS. 30 to 42 show a second embodiment of the laminated work production apparatus to which the present invention is applied. FIG. 30 is a schematic configuration view and FIG. 31 is a schematic plan view. In this embodiment, a configuration for stacking knocked-out plate-like works on a stacking jig outside a press facility is added to the first embodiment. It should be noted that the same devices as the first embodiment are denoted by the same reference signs and not described or only briefly described.

As shown in FIGS. 30, 31, the laminated work production apparatus of this embodiment includes a progressive press working device 1 composed of a plurality of processing units 6a to 6c for punching plate-like works WA of a rotor core for motor and a plurality of processing units 6A to 6C for punching plate-like works WB of a stator core for motor. Specifically, the plate-like metal material W1 is punched into the plate-like works WA for small-diameter rotor core by the plurality of preceding processing units 6a to 6c and into the plate-like works WB for large-diameter stator core by the plurality of succeeding processing units 6A to 6C. Upper and lower molds 8D, 7D, retention mechanisms 20, knockout mechanisms 25 of these plurality of preceding processing units 6a to 6c and succeeding processing units 6A to 6C are configured similarly to those in the first to third processing units 6A to 6C of the first embodiment.

Further, the laminated work production apparatus of this embodiment includes two transfer devices 70A, 70B for stacking the plate-like works WA, WB knocked out by the knockout mechanisms 25 on stacking jigs 10 arranged outside the press working device 1. Thus, conveying jigs 10A, 10B (first stacking jig) are used to hold and carry the knocked-out plate-like works WA, WB and convey them to the transfer devices 70A, 70B. Specifically, the knocked-out plate-like works WA, WB are held on the conveying jigs 10A, 10B, conveyed to the outside of the press working device 1 and conveyed to the respective transfer devices 70A, 70B arranged outside the press working device 1 by a conveying device 3, and transferred to stacking jigs 10 (second stacking jig) from the conveying jigs 10A, 10B and stacked thereon by the transfer devices 70A, 70B.

Thus, two elevating devices 2A, 2B for lowering the conveying jigs 10A, 10B for respectively receiving these plate-like works WA, WB from a stacking position A to an unloading position B2 every time the respective plate-like works WA, WB of the rotor core for motor and the stator core for motor are knocked out by the retention mechanisms 20 are provided in the press working device 1. Further, these two elevating devices 2A, 2B operate to raise empty conveying jigs 10A, 10B supplied to a loading position B1 to the stacking position A and receive newly knocked-out plate-like works WA, WB using the conveying jigs 10A, 10B.

Further, two longitudinal conveying devices 40A, 40B for conveying the conveying jigs 10A, 10B for holding and conveying the plate-like works WA, WB between the loading/unloading positions B1, B2 and the respective transfer devices 70A, 70B arranged at final ends outside the press facility, and a lateral conveying device 50 for loading and unloading the respective stacking jigs 10 for rotor core and stator core to the two transfer devices 70A, 70B are provided as the conveying device 3. Specifically, the two longitudinal conveying devices 40A, 40B operate to load empty conveying jigs 10A, 10B to the loading positions B1 of the press working device 1, unload the conveying jigs 10A, 10B holding the plate-like works WA, WB from the unloading positions B2, and convey them to the transfer devices 70A, 70B arranged at the final ends outside the press facility. Further, the lateral conveying device 50 operates to load the respective empty stacking jigs 10 for rotor core and stator core to the respective transfer devices 70A, 70B and unload the respective stacking jigs 10, on which a preset number of plate-like works WA, WB are stacked by the respective transfer devices 70A, 70B, from the respective transfer devices 70A, 70B.

Figure 32:
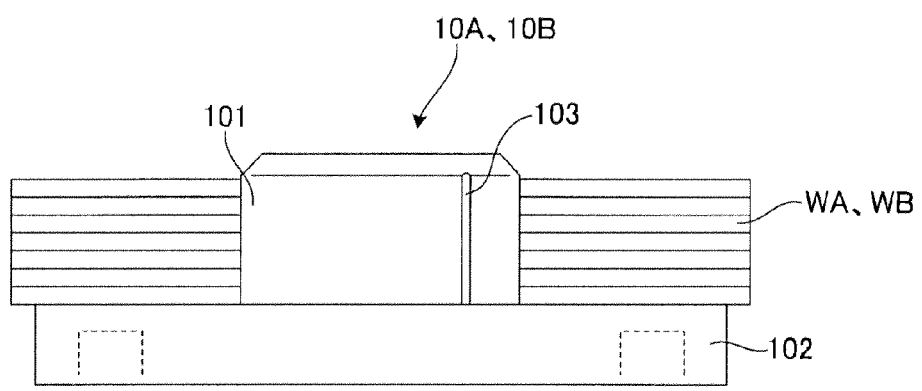
FIG. 32 is a side view of a conveying jig as a first stacking jig.

The conveying jigs 10A, 10B (first stacking jig) are respectively formed such that the conveying jig 10B for plate-like works WB for forming a stator core of a motor or a generator and the conveying jig 10A for plate-like works WA for forming a rotor core of a motor or a generator have different sizes in conformity with the plate-like works WA, WB. Specifically, the conveying jig 10A, 10B is composed of a cylindrical portion 101 and a base 102 as shown in FIG. 32. The cylindrical portion 101 is in the form of a cylinder having such an outer diameter as to be fittable (loose fit) into inner peripheral holes of the plate-like works WA, WB punched by the press working device 1 and an axial dimension thereof is set at such a dimension as to be able to hold a plurality of plate-like works WA, WB stacked from the retention mechanism 20 by one knockout. Keys 13 projecting and extending in an axial direction are arranged at equal angular intervals on the outer periphery of the cylindrical portion 101. Further, a tapered bevel narrowed toward an upper side is formed on an upper end side of the outer periphery of the cylindrical portion 101. This tapered bevel guides the plate-like works WA, WB punched by the press working device 1 so that the plate-like works WA, WB smoothly move onto the outer periphery of the cylindrical portion 101. Further, the base 102 is in the form of a disk having an outer diameter slightly smaller than the outer diameter of the plate-like works WA, WB punched by the press working device 1.

Accordingly, the cylindrical portion 101 of the conveying jig 10B for plate-like works WB to be stacked to form a stator core of a motor or a generator is formed to have external dimensions in conformity with the inner diameter of the stator core. The keys 103 are engaged with inner peripheral openings of slots of the plate-like works WB punched by the press working device 1 and fitted on the outer periphery to position the plate-like works WB in a rotating direction.

Further, the cylindrical portion 101 of the conveying jig 10A for plate-like works WA to be stacked to form a rotor core of a motor or a generator is formed to have external dimensions in conformity with the inner diameter of the rotor core. The keys 103 are engaged with key grooves or the like of the plate-like works WA punched by the press working device 1 and fitted on the outer periphery to position the plate-like works WA in a rotating direction.

Figure 33:
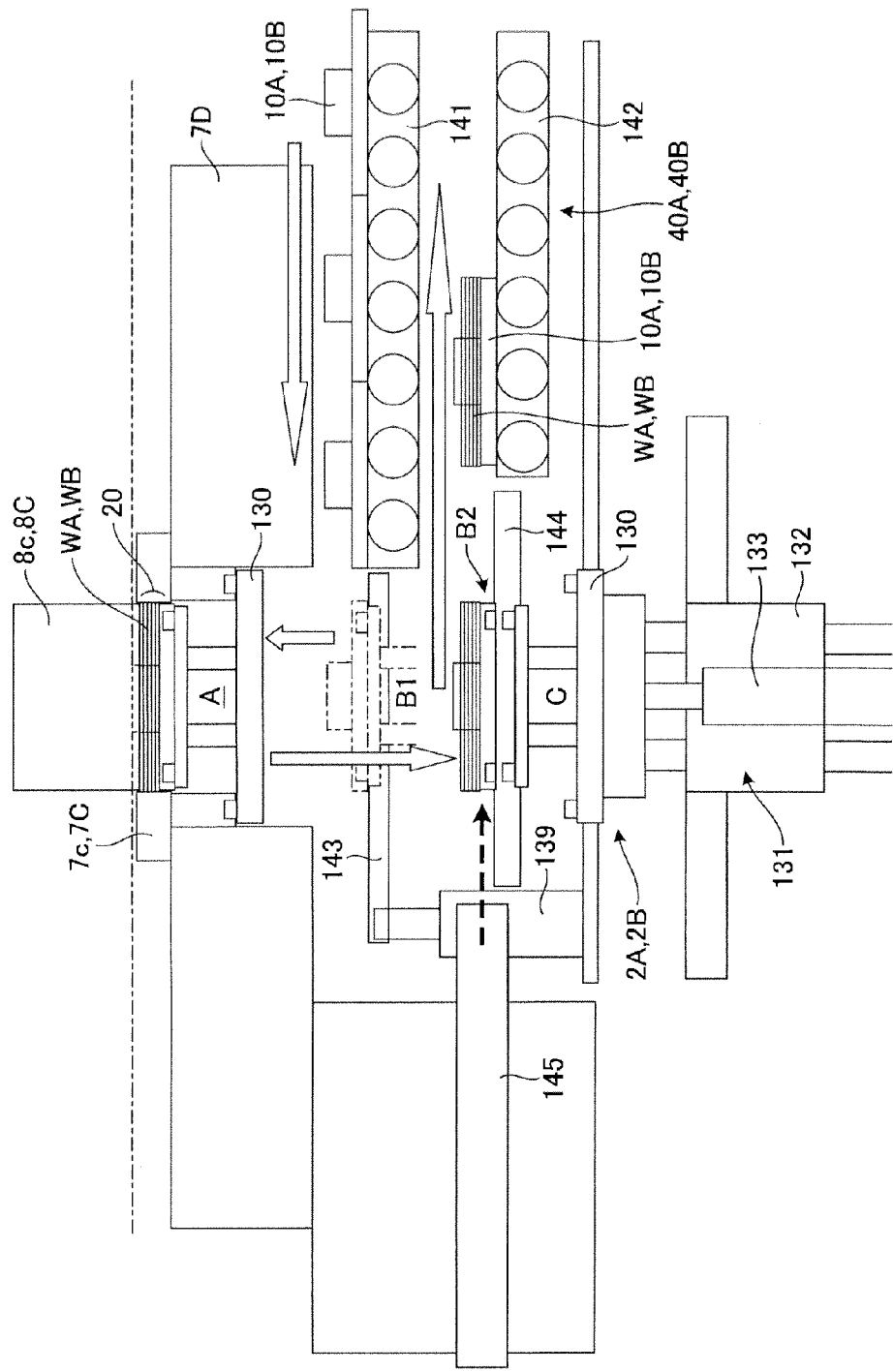
FIG. 33 is a schematic configuration view showing an elevating device.

The elevating device 2A, 2B for raising and lowering the conveying jig is configured as shown in FIG. 33. Since the elevating device 2B for raising and lowering the conveying jig 10B for plate-like works WB for forming a stator core and the elevating device 2A for raising and lowering the conveying jig 10A for plate-like works WA for forming a rotor core have the same configuration, only the one for raising and lowering the conveying jig 10B for plate-like works WB for forming a stator core is described here. Specifically, the elevating device 2B includes an elevating platform 130 capable of moving upward and downward while holding the conveying jig 10B from below, and an elevation drive mechanism 131 for vertically raising and lowering the elevating platform 130.

The elevation drive mechanism 131 is composed of a slider 132 for vertically movably guiding the elevating platform 130 arranged at the upper end and a servo motor 133 for driving the elevating platform 130 guided by the slider 132 to move upward and downward. The elevation drive mechanism 131 vertically raises and lowers and vertically positions the elevating platform 130 by the servo motor 133.

A shaft center of the elevating platform 130 is arranged concentrically with that of the retention mechanism 20. The elevating platform 130 is vertically raised and lowered, comes into contact with a lower part of the base 102 of the conveying jig 10B when being raised from a lower end position, has the conveying jig 10B transferred thereto from the longitudinal conveying device 40B, and is capable of raising and lowering the conveying jig 1013 along the shaft center of the retention mechanism 20. The conveying jig 10B is placed on the elevating platform 130 and raised and lowered and vertically positioned by raising and lowering and vertically positioning the elevating platform 130.

The elevating device 2B includes unillustrated proximity sensors for respectively detecting a standby position C where the elevating platform 130 is lowered to the bottommost end, the loading position B1 where the conveying jig 10B is received from the longitudinal conveying device 40B and the stacking position A where the elevating platform 130 is raised to the uppermost end to receive the knocked-out plate-like work WB. Specifically, when the elevating platform 130 is at the standby position C, the upper end thereof is distanced downward from the conveying jig 10B at the unloading position B2 of the longitudinal conveying device 40B.

Further, when the elevating platform 130 is raised from the standby position C and reaches the loading position B1, the upper surface of the elevating platform 130 and the lower surface of the empty conveying jig 10B on the longitudinal conveying device 40B come into contact in a state where the conveying jig 10B is positioned by a positioning hole provided on the conveying jig 10B and a positioning pin mounted on the elevating platform 130. Thus, the empty conveying jig 10B is received and placed on the elevating platform 130 between the longitudinal conveying device 40B and the elevating platform 130.

Furthermore, when the elevating platform 130 is raised while carrying the conveying jig 10B, the positioning pin mounted on the elevating platform 130 is engaged with a positioning hole provided on the lower surface of the mold. Subsequently, when the elevating platform 130 is brought into contact with the lower surface of the mold, the elevating platform 130 is stopped in a positioned state and positioned at the stacking position A.

No rollers arranged between rails are present at final ends of loading rails 141 and at start ends of unloading rails 142 of the longitudinal conveying device 40B to be described later and final end rails 143 and start end rails 144 are formed separately from the unloading rails 141 and the unloading rails 142. Further, a spacing between pairs of the loading rails 142 and unloading rails 142 of the longitudinal conveying device 40B (spacing in a direction orthogonal to the plane of FIG. 33) is larger than a dimension of the elevating platform 130 in a width direction. Thus, the elevating platform 130 can be raised and lowered between the stacking position A and the standby position C by passing between the final end rails 143 and between the start end rails 144 where no rollers are arranged.

However, the base 102 of the conveying jig 10B is formed to be larger than the rail spacing of the longitudinal conveying device 40B and guided and conveyed by the rails of the longitudinal conveying device 40B. Thus, a rail opening/closing device 135 is provided which prevents interference with the final end rails 143 while the conveying jig 10B passes the final end rails 143 of the loading rails 141 from the stacking position A and is lowered to the starting end rails 144 of the unloading rails 142. Specifically, the final end rails 143 of the loading rails 141 are opened and closed by the rail opening/closing device 135.

Figure 34:
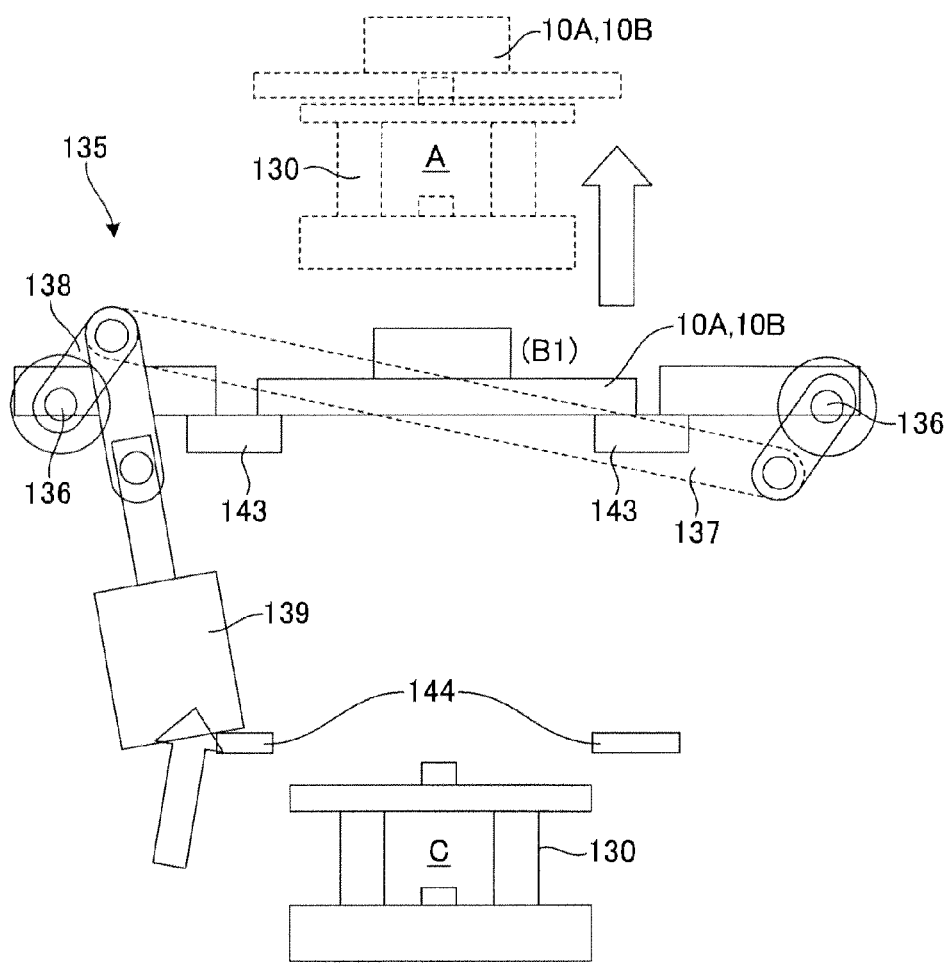
FIG. 34 is a diagram showing a rail opening/closing device.
Figure 35:
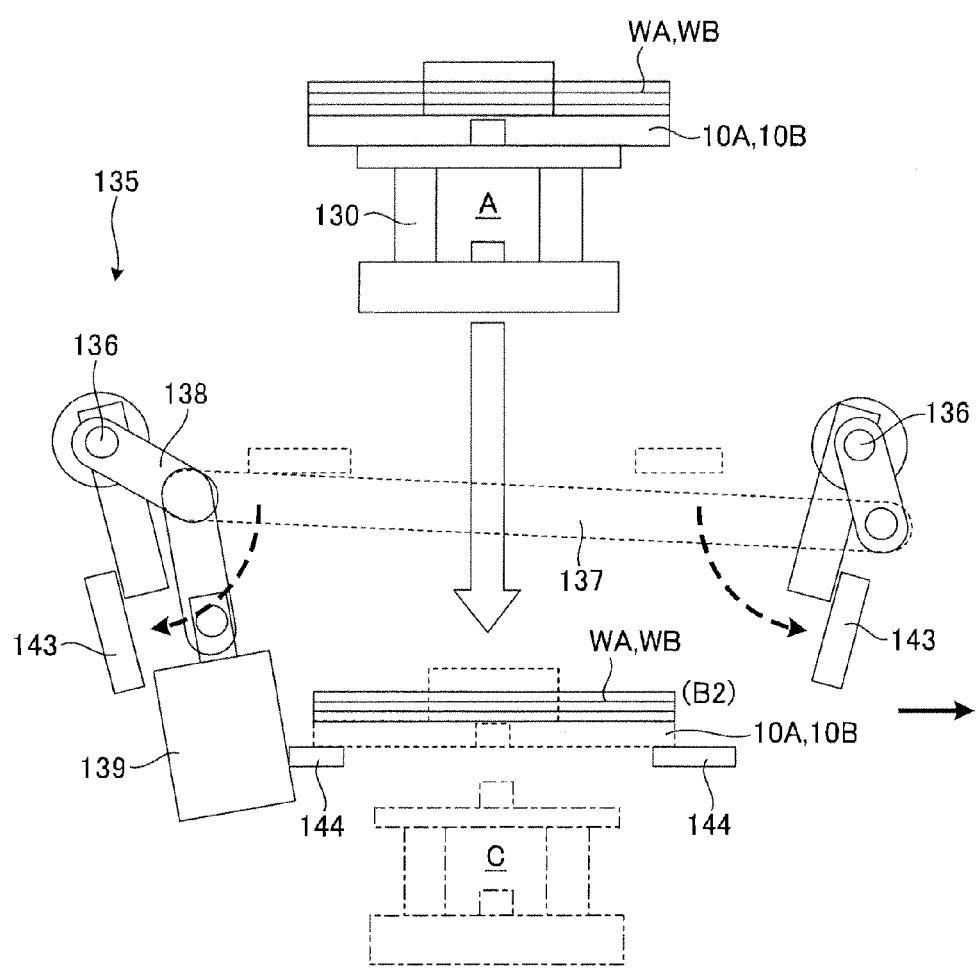
FIG. 35 is a diagram showing an open state of the rail opening/closing device.

The rail opening/closing device 135 is formed as shown in FIG. 34. Specifically, the pair of final end rails 143 are supported by bearings 136 extending in a rail guiding direction at widthwise outer ends thereof and linked by a link mechanism 137 to be pivotable. The pair of final end rails 143 are pivotable between an initial position where they are horizontal as shown in FIG. 34 and a retracted position where they are rotated downward as shown in FIG. 35. Further, the pair of final end rails 143 are fixed at the initial position by pushing up an arm 138 fixed to the bearings 136 by an actuator 139, and rotated to the retracted position due to the weight of the rails 143 themselves by releasing the actuator 139.

Accordingly, when the elevating platform 130 is raised from the standby position C, it can be raised without interfering with the start end rails 144 of the unloading rails 142 and the final end rails 143 of the loading rails 141. When the elevating platform 130 passes the final end rails 143, the conveying jig 10B fed on the final end rails 143 can be transferred and received and raised to the stacking position A shown by broken line.

Further, when the elevating platform 130 is lowered from the stacking position A to the standby position C, the actuator 139 of the rail opening/closing device 135 is released to position the final end rails 143 (loading rails 141) at the retracted position as shown in FIG. 35. When the elevating platform 130 is lowered to the standby position C together with the conveying jig 10B, the elevating platform 130 and the conveying jig 10B pass between the final end rails 143 (loading rails 141) opened at the retracted position without interference. Subsequently, while the conveying jig 10B passes between the start end rails 144 (unloading rails 142), the conveying jig 10B remains on the start end rails 144 and only the elevating platform 130 can pass between the start end rails 144 and be lowered to the standby position C.

It should be noted that the conveying jig 10B, which is placed on the start end rails 144 and on which the plate-like works WB are stacked and held, is pushed out onto the unloading rails 142 provided with rollers by a discharge cylinder 145 arranged on a mold lateral to the start end rails 144 and conveyed to an unloading port by the unloading rails 142. Further, also on the loading rails 141, empty conveying jigs 10B are successively stopped by an unillustrated stopper arranged at the unloading port. These empty conveying jigs 10B are also pushed out one by one onto the final end rails 143 from the loading rails 141 by an unillustrated loading cylinder when the elevating platform 130 is raised from the standby position C to the stacking position A.

Since the longitudinal conveying device 40B for conveying the conveying jig 10B for plate-like works WB for forming a stator core and the longitudinal conveying device 40A for conveying the conveying jig 10A for plate-like works WA for forming a rotor core have the same configuration, only the one for conveying the conveying jig 10B for plate-like works WB for forming a stator core is described here.

Figure 36:
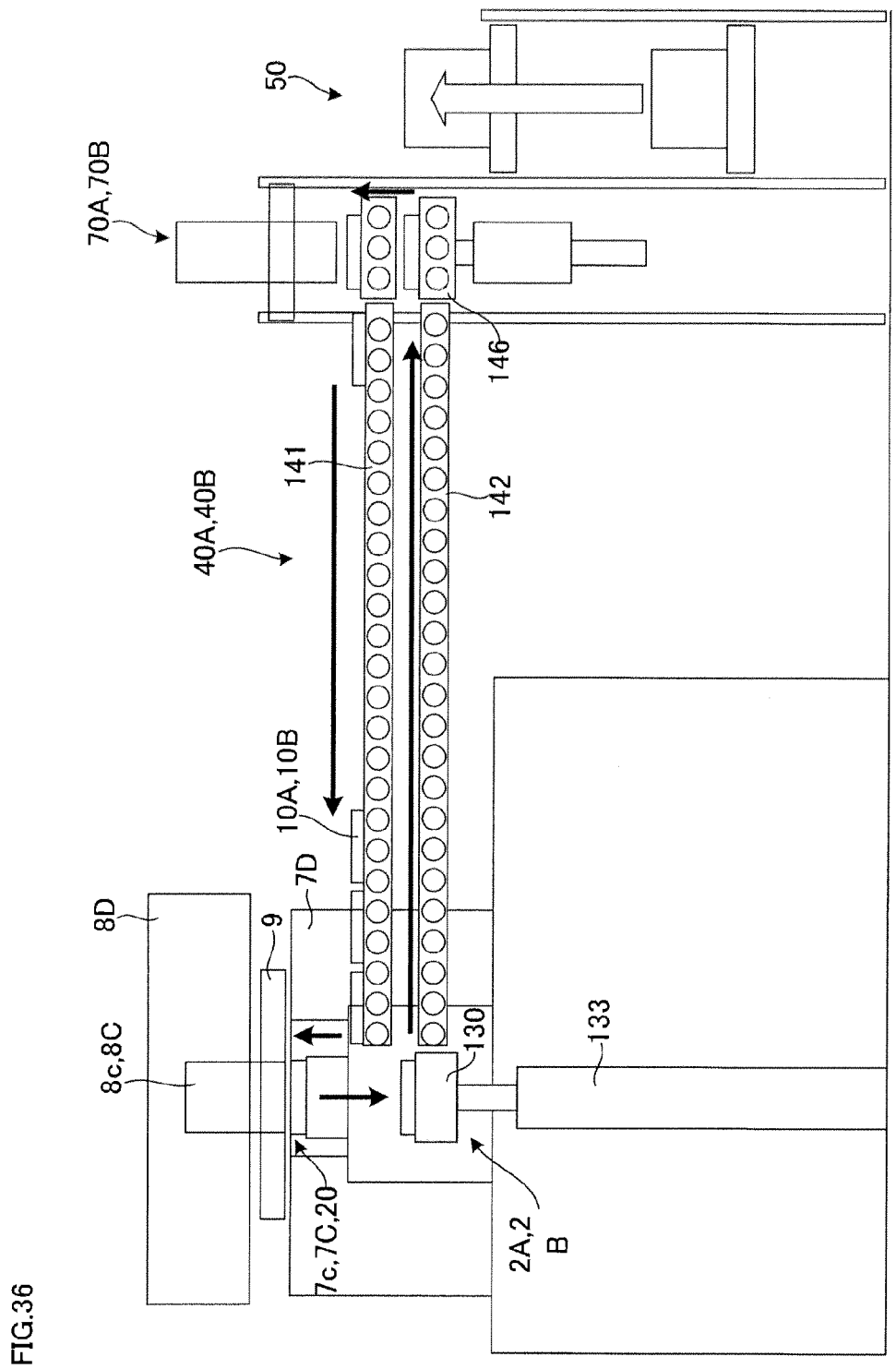
FIG. 36 is a diagram showing a longitudinal conveying device.

As shown in FIG. 36, the longitudinal conveying device 40B includes the unloading rails 142 (first path) arranged at a lower side and the loading rails 141 (second path) arranged at an upper side between the elevating device 2B and the transfer device 70B. The unloading rails 142 arranged at the lower side receive the conveying jig 10B, on which the knocked-out plate-like works WB are stacked and held, from the elevating device 2B, and guide and convey it to the transfer device 70B by a pair of rails. The loading rails 141 arranged at the upper side receive the conveying jig 10B, which became empty due to the transfer of the plate-like works WB, from the transfer device 70B, and guide and convey it to the elevating device 2B by a pair of rails. A multitude of rollers are arranged along and between the pairs of the loading rails 141 and the unloading rails 142, which successively carry and convey the conveying jigs 10B loaded to the entrances of the rails by the rollers.

Figure 37:
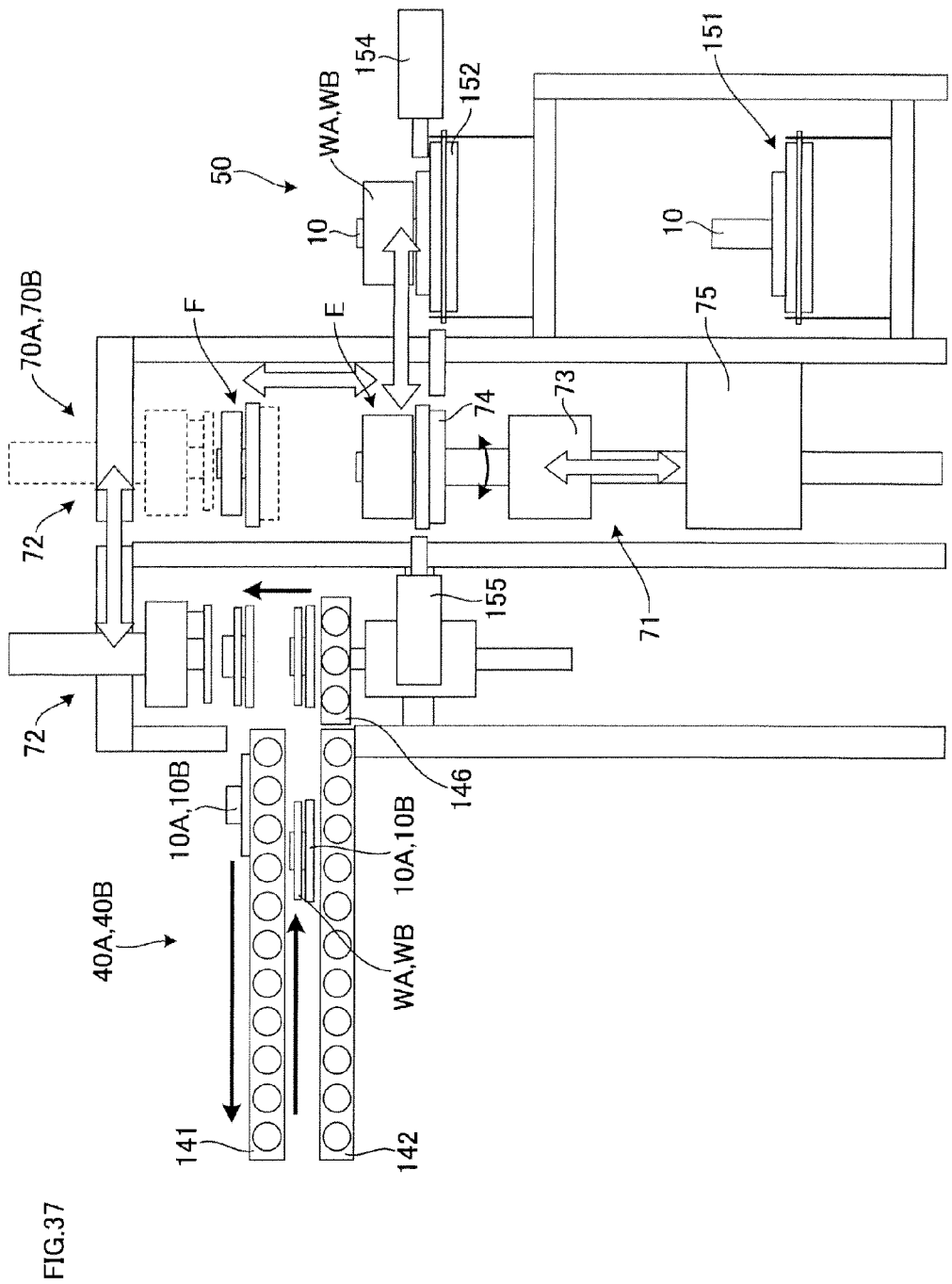
FIG. 37 is a schematic diagram showing a transfer device.

As shown in FIG. 37, elevating rails 146 are arranged at the unloading port of the unloading rails 142. The elevating rails 146 can be raised and lowered by being vertically guided by a slider, and positioned to a raised position and a lowered position by a servo motor. At the lowered position, the elevating rails 146 are located at a height to be continuous with the unloading port of the unloading rails 142 and operate to receive the conveying jig 10B which is conveyed by the unloading rails 142 and on which the plate-like works WB are stacked and held. The elevating rails 146 are raised to the raised position when receiving the conveying jig 10B, on which the plate-like works WB are stacked and held, thereon. At the raised position, the elevating rails 146 are located at a height to be continuous with a loading port of the loading rails 141. Then, the plate-like works WB stacked and held on the conveying jig 10B are removed by the transfer device 70B to be described later and the emptied conveying jig 10B is carried to the loading port of the loading rails 141.

Figure 38:
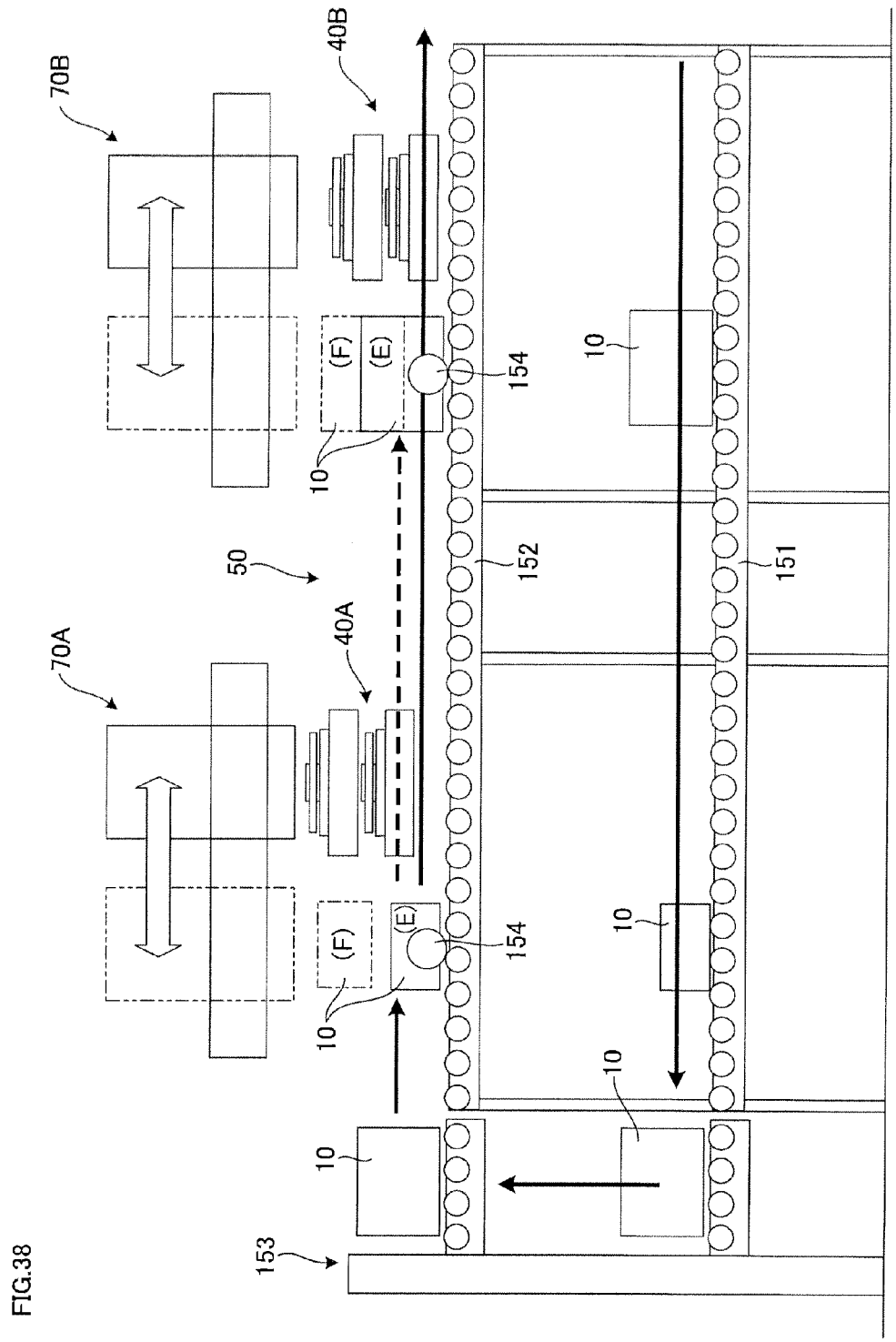
FIG. 38 is a diagram showing a lateral conveying device.

As shown in FIG. 38, the lateral conveying device 50 includes loading rails 151 arranged at a lower side, unloading rails 152 arranged at an upper side and an elevating device 153 coupling an unloading port of the loading rails 151 at the lower side and a loading port of the unloading rails 152 at the upper side. The loading rails 151 successively convey empty stacking jigs 10 (second stacking jig) for rotor core and stator core supplied to the loading port to the unloading port. The elevating device 153 raises the empty stacking jigs 10 conveyed by the loading rails 151 to move them to the unloading rails 152 at the upper side. The unloading rails 152 supply the empty stacking jigs 10 to the corresponding transfer devices 70A, 70B to be described later for rotor core and stator core and discharge the stacking jigs 10 (second stacking jig) on which the plate-like works WA, WB are stacked by the respective transfer devices 70A, 70B.

To supply the empty stacking jigs 10 to the corresponding transfer devices 70A, 70B to be described later for rotor core and stator core, pushers 154 for rotor core and stator core are arranged lateral to the unloading rails 152 and the empty stacking jigs 10 are supplied to exchange positions E of the respective transfer devices 70A, 70B by the respective pushers 154 as shown in FIG. 37. Further, the stacking jigs 10 on which the plate-like works WA, WB are stacked by the respective transfer devices 70A, 70B are returned onto the unloading rails 152 from the exchange positions F by pushers 155 arranged on the respective transfer devices 70A, 70B.

Figure 39:
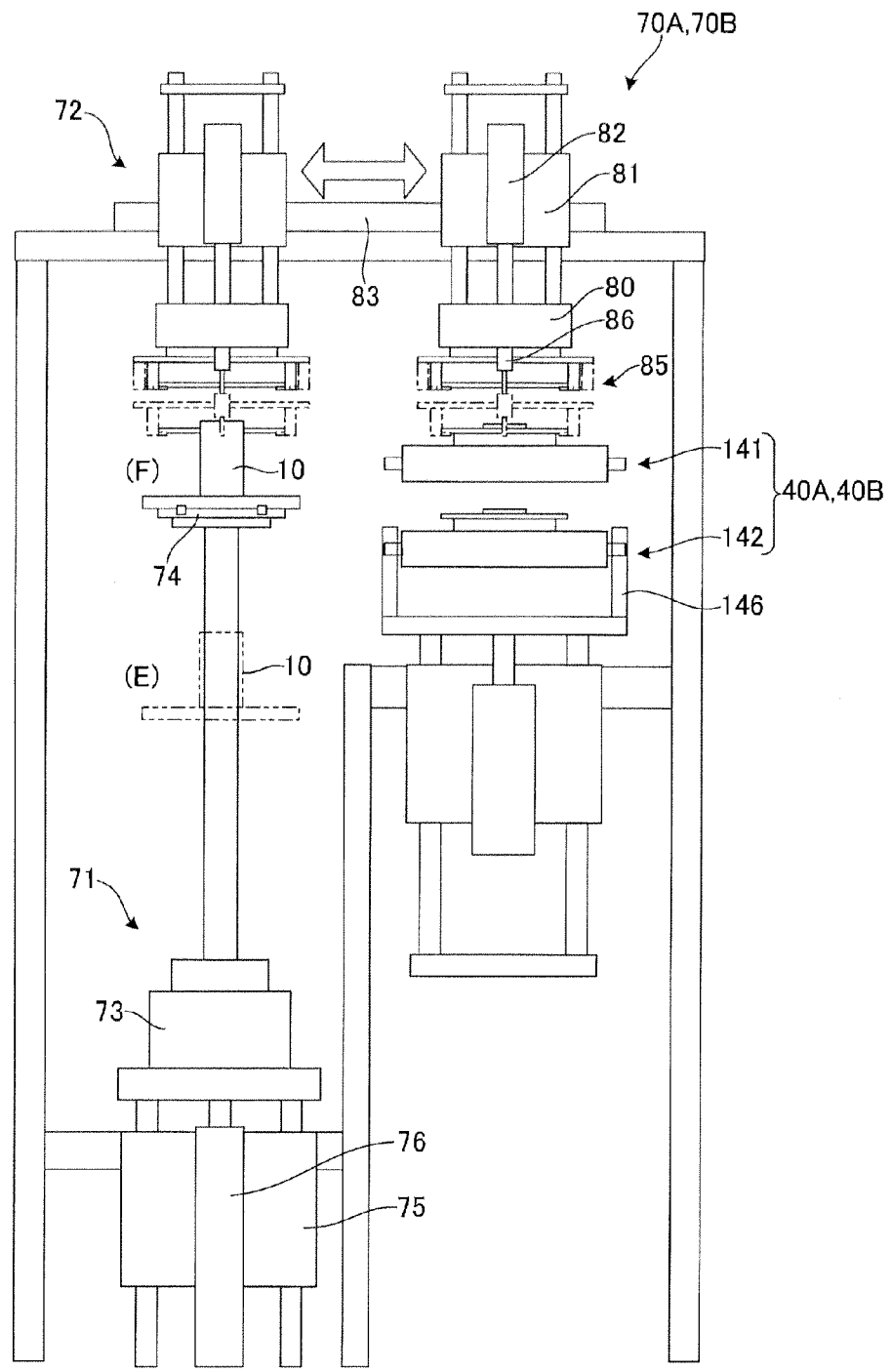
FIG. 39 is a diagram showing the entire shape of the transfer device.

Since the transfer device 70B for transferring plate-like works WB for forming a stator core and the transfer device 70A for transferring plate-like works WA for forming a rotor core have the same configuration, only the one for transferring plate-like works WB for forming a stator core is described here. The transfer devices 70A, 70B are configured to transfer and stack the plate-like works WA, WB stacked and held on the conveying jigs 10A, 10B (first stacking jig) to and on the stacking jigs 10 (second stacking jig) as shown in FIG. 39. Specifically, each of the transfer devices 70A, 70B includes a stacking jig positioning device 71 for positioning the stacking jig 10 at an adjacent stacking position F with respect to the conveying jig 10A, 10B positioned and held on the elevating rails 146 of the longitudinal conveying device 40A, 40B and a transfer mechanism 72 for grabbing the plate-like works WA, WB held on the conveying jig 10A, 10B, transferring them onto the stacking jig 10 at the stacking position and stacking them on the stacking jig 10.

The stacking jig positioning device 71 receives the empty stacking jig 10 from the lateral conveying device 50 at the exchange position E and positions it by raising it to the stacking position F adjacent to the conveying jig 10B on which the plate-like works WB are stacked and held. The stacking jig 10 is successively rotated by a predetermined angle every time the plate-like works WB are stacked by the transfer mechanism 72. Every time a predetermined number of plate-like works WB are stacked, the stacking jig 10 on which the plate-like works WB are stacked is lowered from the stacking position F to the exchange position E and discharged to the lateral conveying device 50 at the exchange position E and an empty stacking jig 10 is received from the lateral conveying device 50.

For the above operation, the stacking jig positioning device 71 includes a table 74 for holding the stacking jig 10 and positioning the stacking jig 10 with a rotational angular position changed by a rotary servo motor 73 every time the plate-like works WB are stacked. The stacking jig positioning device 71 further includes a slider 75 capable of vertically guiding and raising and lowering these rotary servo motor 73 and the table 74 and a servo motor 76 for positioning them at the exchange position E and the stacking position F. At the stacking position F, the rotational angular position of the table 74 holding the stacking jig 10 is changed and positioned by the rotary servo motor 73 every time the plate-like works WB are stacked.

Figure 40:
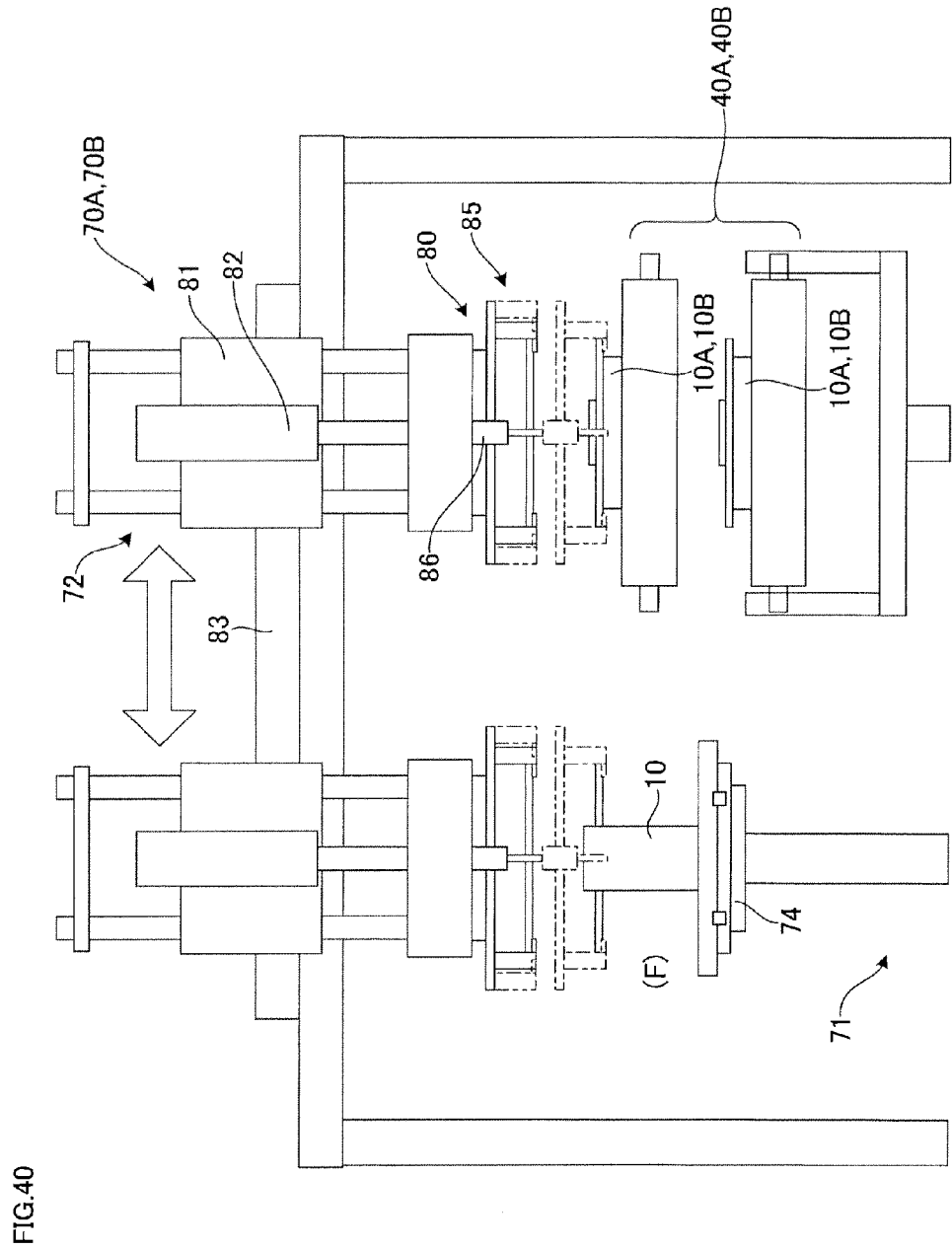
FIG. 40 is a diagram showing a transfer mechanism.

As enlargedly shown in FIG. 40, the transfer mechanism 72 includes a hand 80 which can be vertically raised and lowered by a slider 81 and is driven to be vertically raised and lowered by a servo motor 82, and a laterally moving mechanism 83, which moves this hand 80 between a position above the conveying jig 10B and a position above the stacking jig 10. The hand 80 includes an opening/closing chuck 85 for grabbing the plate-like work WB by being closed and releasing the grabbed plate-like work WB by being opened, and a phase shift preventing pin 86 for preventing a phase shift of the plate-like work WB by inserting a pin into a through hole of the plate-like work WB when the plate-like work WB is grabbed by the opening/closing chuck 85.

Figure 41:
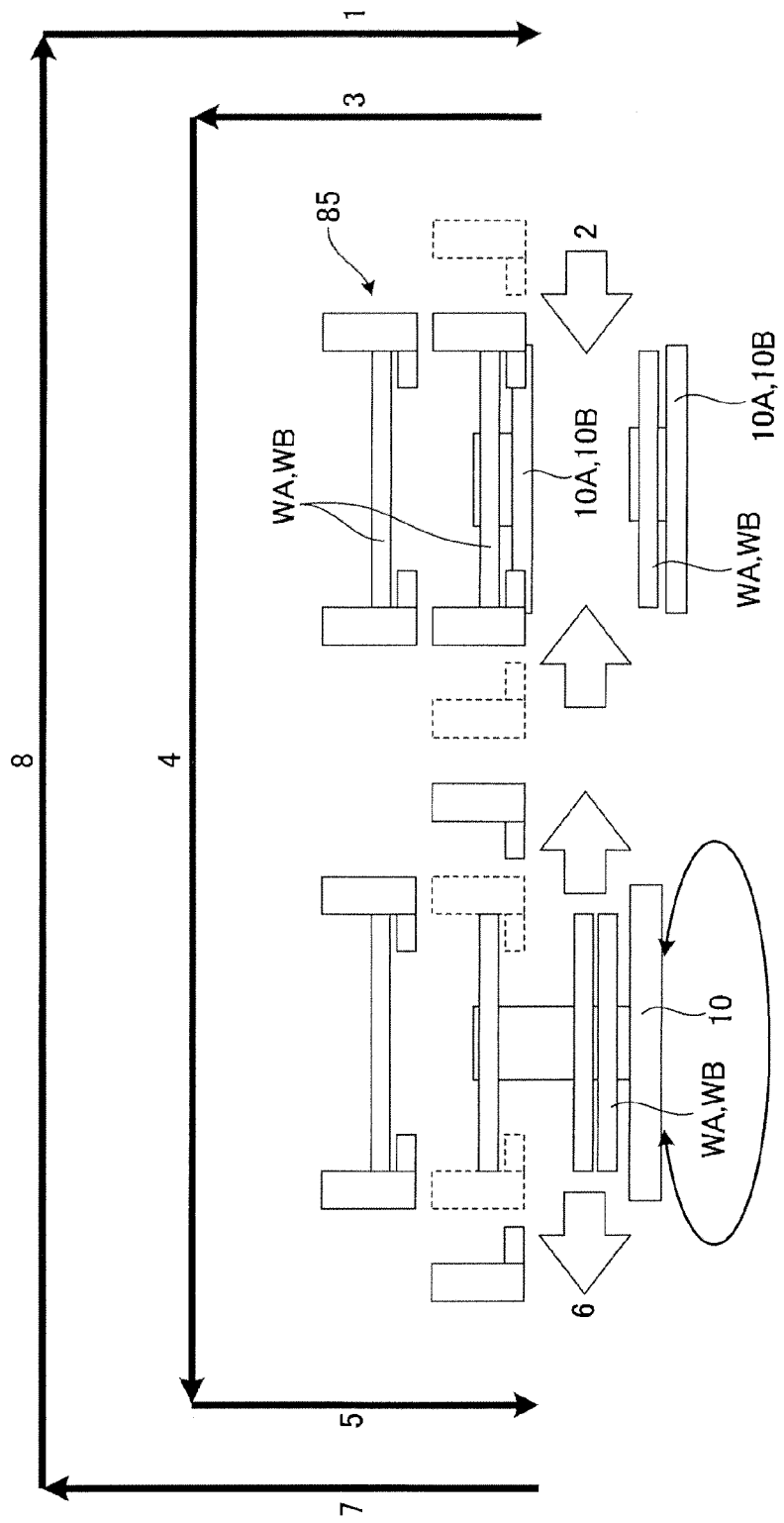
FIG. 41 is a diagram showing an operating state of the transfer device.

This transfer mechanism 72 and the transfer device 70A, 70B are operated as shown in FIG. 41. Specifically, the hand 80 is located above the conveying jig 10B by the laterally moving mechanism 83 and lowered by the servo motor 82 with the chuck 85 opened and a lowering movement is stopped at a position to surround the conveying jig 10B by the chuck 85. Subsequently, at the same time as the chuck 85 is closed to grab the plate-like work WB, the phase shift preventing pin 86 is pushed out and inserted into the plate-like work WB to prevent a phase shill of the plate-like work WB. Following that, the hand 80 is raised by the servo motor 82 to remove the plate-like work WB from the conveying jig 10B.

Subsequently, the hand 80 is moved to a position above the stacking jig 10 by the laterally moving mechanism 83 while grabbing the plate-like work WB, and lowered from the position above the stacking jig 10 by the servo motor 82. A lowering movement is stopped at a position where an inner peripheral hole of the grabbed plate-like work WB is fitted on the cylindrical portion 11 of the stacking jig 10. Subsequently, the chuck 85 is released and the phase shift preventing pin 86 is pulled out, whereby the grabbed plate-like work WB is released. The released plate-like work WB moves downward along the cylindrical portion 11 of the stacking jig 10 and stacked and transferred onto the stacking jig 10. The stacking jig 10 having the plate-like work WB transferred thereto is rotated by an arbitrarily set angle by the rotary servo motor 73 and waits until a plate-like work WB to be transferred next is stacked. This rotating angle can be arbitrarily set by a control board 4.

Thereafter, the chuck 85 is raised by the servo motor 82 while being left in the open state and, subsequently, moved to a position above the conveying jig 10B by the laterally moving mechanism 83. The chuck 85 continues to repeat an operation of grabbing the plate-like work WB of the above conveying jig 10B and stacking it on the stacking jig 10.

The plate-like work WB is repeatedly stacked on the stacking jig 10 by the transfer mechanism 72, and the stacking jig 10 is repeatedly rotated by the arbitrarily set angle by the rotary servo motor 83 every time the plate-like work WB is stacked and waits until a plate-like work WB to be transferred next is stacked. When the number of the plate-like works WB stacked on the stacking jig 10 reaches an arbitrarily set rotational stacking number (rotational stacking number can be arbitrarily set by the control board 4), the stacking jig 10 is lowered to the exchange position E by the servo motor 76 of the stacking jig positioning device 71. At the exchange position E, the stacking jig 10 on which the plate-like works WB are stacked is discharged to the lateral conveying device 50 and an empty stacking jig 10 is received from the lateral conveying device 50. Thereafter, the empty stacking jig 10 is raised to the stacking position F by the stacking jig positioning device 71 and the above stacking operation is repeated again for this stacking jig 10 by the transfer device 70B.

The above operation of the laminated work production apparatus can be summarized as shown in FIG. 42. Specifically, an empty conveying jig 10A, 10B is conveyed along the loading rails 141 of the longitudinal conveying device 40A, 40B and pushed by the actuator to move to a position below the retention mechanism 20. When plate-like works WA, WB retained in the retention mechanism 20 are pushed out by the knockout mechanism 25 to the empty conveying jig 10A, 10B having moved to the position below the retention mechanism 20, the conveying jig 10A, 10B carrying the plate-like works WA, WB is lowered onto the start end rails 144 of the unloading rails 142.

The conveying jig 10A carrying the plate-like works WA, WB is unloaded to the outside of the mold device 1 along the unloading rails 142. An operation of pushing an empty conveying jig 10A, 10B, similarly raising it, having knocked-out plate-like works WA, WB stacked thereon, lowering it and unloading it to the unloading rails 142 is repeated.

On the other hand, the conveying jig 10A, 10B holding the plate-like works WA, WB and unloaded to the outside of the mold device 1 is raised to the loading rails 141 at the upper side and waits at a transfer position after being conveyed to the final ends of the unloading rails 142. The conveying jig 10A, 10B having the plate-like works WA, WB removed by the transfer device 70A, 70B at the transfer position is conveyed to the mold device 1 along the loading rails 141 of the longitudinal conveying device 40A, 40B and, thereafter, the above operations are repeated.

The plate-like work WA, WB grabbed by the chuck 85 from the conveying jig 10A, 10B at the transfer position is moved to a position above the stacking jig 10 on which the plate-like work WA, WB is rotationally stacked, lowered toward the stacking jig 10 and transferred to the stacking jig 10 by releasing the chuck 85. After the transfer, the stacking jig 10 is rotated by the arbitrarily set angle and waits until a plate-like work WA, WB to be transferred next is moved by the chuck 85. An operation of transfer-rotation-transfer is repeated until the arbitrarily set rotational stacking number is reached. When the arbitrarily set rotational stacking number is reached, the stacking jig 10 is sent out to the lateral conveying device 50, a new empty stacking jig 10 is introduced from the lateral conveying device 50 and the next rotational stacking is started. By the above process, an exchange time of the conveying jig 10A, 10B after knockout can be shortened and production can be made without stopping the operation of the high-speed progressive press.

It should be noted that the loading rails 141 and the unloading rails 142 have been described to be arranged on the same side of the mold device in the above embodiment. However, the loading rails 141 may be arranged before (or behind) the mold device and the unloading rails 142 may be arranged behind (or before) the mold device. In this case, the loading rails 141, the unloading rails 142, the mold device and the transfer devices 70A, 70B are arranged in a looped manner.

In this embodiment, the following effects can be achieved in addition to the effects (A), (B), (D) to (H) and (J) in the first embodiment.

(K) As shown in FIG. 33, the elevating device 2A, 2B as the stacking jig moving mechanism first moves the conveying jig 10, on which the predetermined number of plate-like works WA, WB are stacked, to the loading/unloading position B1 and, thereafter, moves it to the position outside the mold device 1, introduces an empty stacking jig 10 to the loading/unloading position B2 and moves it to the stacking position A along the punching direction of the plate-like works W. Thus, even if punching of the mold device 1 is continued, the stacking jig 10 can be moved from the stacking position A and the exchange of the stacking jig 10 and the like can be performed while the knockout mechanism 25 is stopped.

(L) As shown in FIGS. 30, 31, the stacking jig moving mechanism conveys the conveying jig 10A, 10B as the first stacking jig, on which the predetermined number of plate-like works WA, WB are stacked, from the first loading/unloading position B1 to the position outside the mold device 1 via the unloading rails 142 as the first path. At the position outside the mold device 1, the plate-like works WA, WB stacked on the first stacking jig 10A, 1013 are successively transferred to the second stacking jig 10 between the first stacking jig 10A, 1013 and the second stacking jig 10. Then, the first stacking jig 10A, 1013 emptied by the transfer is conveyed to the loading/unloading position B2 via the loading rails 141 as the second path. Thus, the stacking jig 10A, 10B can be exchanged in a short time while the plate-like works WA, WB are retained since the position where the plate-like works are stacked is located outside the mold device 1. As a result, the high-speed progressive press in which plate-like works WA. WB punched in the mold device 1 are retained in the retention mechanisms 20 in the dies 7C of the mold device 1 and a plurality of plate-like works WA, WB are knocked out and stacked can be operated without reducing a production speed, wherefore a highly productive laminated work production apparatus can be obtained.

(M) As shown in FIGS. 39, 42, the stacking jig moving mechanism is characterized as follows. The stacking jig moving mechanism transfers the plate-like works WA, WB stacked on the first stacking jig to the second stacking jig 10 between the conveying jig 10A, 10B as the first stacking jig and the second stacking jig 10 at the position outside the mold device 1. Subsequently, the second stacking jig 10 is rotated by the predetermined angle by the rotary servo motor 73 as a rotating mechanism. Following that, the succeeding plate-like works WA, WB stacked on the conveying jig 10A, 10B as the first stacking jig conveyed to the position outside the mold device 1 via the unloading rails 142 that is the first path are transferred onto the plate-like works WA, WB stacked on the second stacking jig 10. Thus, when a plurality of plate-like works WA, WB retained and knocked out in the mold device 1 are rotated and stacked as a unit, it is possible to obtain the mold device 1 and the transfer devices 70A, 70B independent of stacking height by performing this operation outside the mold device 1.

(N) As shown in FIG. 36, a plurality of the conveying jigs 10A, 10B as the first stacking jigs are arranged on the loading and unloading rails 141, 142 as the first and second paths, and the empty first stacking jigs are caused to wait at the standby position before the loading/unloading position B1 of the loading rails 141 as the second path. When the first stacking jig on which the knocked out plate-like works WA, WB are stacked is unloaded to the unloading rails 142 as the first path from the loading/unloading position B2, an empty first stacking jig located at the standby position on the second path is conveyed to the loading/unloading position B1. Thus, the conveying jig 10A, 10B as the first stacking jig can be exchanged in a short time.

(O) As shown in FIG. 42, the conveying jig 10A, 10B as the stacking jig is exchanged while the punched plate-like works WA, WB are retained on the extension of the punching direction of the mold device 1. Thus, also in exchanging the conveying jig 10A, 10B as the stacking jig, continuous operation is possible without stopping punching of the mold device 1 and productivity can be improved.

Although the embodiments of the present invention have been described above, the above embodiments are merely some of application examples of the present invention and not of the nature to limit the technical scope of the present invention to the specific configurations of the above embodiments.

The present application claims a priority based on Japanese Patent Application No. 2010-279663 filed with the Japan Patent Office on Dec. 15, 2010 and Japanese Patent Application No. 2011-231602 filed with the Japan Patent Office on Oct. 21, 2011, all the contents of which are hereby incorporated by reference.

The invention claimed is:

1. A laminated work production method for producing a laminated work by punching a plate-like metal material into a plate-like work of a predetermined shape and stacking a plurality of the plate-like works, comprising the steps of:
   causing the punched plate-like works to be retained;
   knocking out a plurality of plate-like works in a punching direction and successively stacking the plate-like works on a first stacking jig arranged at a stacking position on an extension of the punching direction of a mold when a preset number of plate-like works are retained;
   moving the first stacking jig, on which a predetermined number of plate-like works are stacked, to a loading/unloading position distant from the stacking position in the punching direction and moving the stacking jig to a position away from the punching direction;
   subsequently introducing an empty first stacking jig to the loading/unloading position and moving the empty stacking jig to the stacking position along the punching direction of the plate-like works; and
   unloading the first stacking jig moved to the position away from the punching direction to the outside of the mold, transferring the plate-like works from the first stacking jig to a second stacking jig outside the mold, and transferring the plate-like work to the second stacking jig while rotationally stacking the plate-like work every time the plate-like work is transferred.

2. The laminated work production method according to claim 1, wherein:
   the first stacking jig is lowered from the stacking position to a rotational stacking position after the operation of a knockout mechanism, rotated by a predetermined angle at the rotational stacking position and raised to the stacking position after rotation.

3. The laminated work production method according to claim 1, wherein:
   the first stacking jig is exchanged or moved from the stacking position to a rotational stacking position while the punched plate-like works are retained on the extension of the punching direction of the mold.

4. The laminated work production method according to claim 1, wherein:

the first stacking jig is positioned in a direction orthogonal to the punching direction by the engagement of a leading end with the retained plate-like works when being raised from the loading/unloading position to the stacking position.

* * * * *